US008918871B1

(12) United States Patent
Yoon et al.

(10) Patent No.: US 8,918,871 B1
(45) Date of Patent: Dec. 23, 2014

(54) BLOCKING/UNBLOCKING ALGORITHMS FOR SIGNALING OPTIMIZATION IN A WIRELESS NETWORK FOR TRAFFIC UTILIZING PROPRIETARY AND NON-PROPRIETARY PROTOCOLS

(71) Applicant: Seven Networks, Inc., San Carlos, CA (US)

(72) Inventors: Sungwook Yoon, San Carlos, CA (US); Rami Alisawi, San Carlos, CA (US); Alexandr Seleznyov, San Carlos, CA (US); Huajie Hu, San Carlos, CA (US); Jie Wei, San Carlos, CA (US)

(73) Assignee: Seven Networks, Inc., San Carlos, CA (US)

( * ) Notice: Subject to any disclaimer, the term of this patent is extended or adjusted under 35 U.S.C. 154(b) by 0 days.

(21) Appl. No.: 14/474,278

(22) Filed: Sep. 1, 2014

Related U.S. Application Data

(63) Continuation of application No. PCT/US2014/040772, filed on Jun. 3, 2014.

(60) Provisional application No. 61/830,570, filed on Jun. 3, 2013, provisional application No. 61/836,096, filed on Jun. 17, 2013.

(51) Int. Cl.
*H04W 28/02* (2009.01)
*H04L 29/02* (2006.01)
*H04L 12/24* (2006.01)
*H04L 29/06* (2006.01)

(52) U.S. Cl.
CPC ............ *H04L 41/0836* (2013.01); *H04L 63/10* (2013.01)
USPC ............. 726/22; 709/223; 709/224; 709/227; 709/228; 709/229; 726/1

(58) Field of Classification Search
CPC ..................... H04L 65/1066; H04L 65/1069
USPC ..................... 726/22; 709/223–225, 227–229
See application file for complete search history.

(56) References Cited

U.S. PATENT DOCUMENTS 6,141,565 A * 10/2000 Feuerstein et al. ............ 455/560
7,289,529 B2 * 10/2007 Sherman ....................... 370/461

(Continued)

OTHER PUBLICATIONS

Examiner Interview Summary and Office Action for Application 13/844,726 dated Jun. 2, 2014.

(Continued)

*Primary Examiner* — Linglan Edwards
(74) *Attorney, Agent, or Firm* — NKK Patent Law, PLLC

(57) ABSTRACT

According to one aspect, the subject matter described herein includes a method for signaling optimization in a wireless network utilizing proprietary and non-proprietary protocols. A first session is established between an application on a mobile device and a local proxy on the mobile device, a second session is established between the local proxy and a proxy server not located on the mobile device, and a third session is established between the proxy server and a content server. A byte stream present within the first and second sessions is monitored to identify patterns within the byte stream. If a pattern is found, the pattern is used to determine a behavior of the application. If that behavior is one that is a candidate for optimization, signaling optimization is performed between the application and the content server. Signaling optimization includes dismantling the second session, replaying the pattern to the application via the first session, and replaying the pattern to the content server via the third session.

19 Claims, 46 Drawing Sheets

(56) References Cited

U.S. PATENT DOCUMENTS

| | | | |
|---|---|---|---|
| 8,023,423 B2* | 9/2011 | Chiang et al. | 370/252 |
| 8,135,384 B2* | 3/2012 | Hassan et al. | 455/410 |
| 2004/0095907 A1* | 5/2004 | Agee et al. | 370/334 |
| 2007/0002759 A1* | 1/2007 | Diaz et al. | 370/252 |
| 2009/0111474 A1* | 4/2009 | Hill et al. | 455/445 |
| 2009/0141660 A1* | 6/2009 | Hassan et al. | 370/310 |
| 2009/0225682 A1* | 9/2009 | Grote-Lopez et al. | 370/255 |
| 2011/0164558 A1* | 7/2011 | Chee et al. | 370/328 |
| 2012/0054661 A1* | 3/2012 | Rados et al. | 715/772 |
| 2012/0110173 A1* | 5/2012 | Luna et al. | 709/224 |
| 2012/0250575 A1* | 10/2012 | Chiang et al. | 370/254 |
| 2013/0031599 A1* | 1/2013 | Luna et al. | 726/1 |
| 2013/0297820 A1* | 11/2013 | Chihara et al. | 709/233 |
| 2013/0308511 A1* | 11/2013 | Ljung | 370/311 |
| 2014/0036697 A1* | 2/2014 | Annan et al. | 370/252 |
| 2014/0280829 A1* | 9/2014 | Kjendal et al. | 709/223 |
| 2014/0282823 A1* | 9/2014 | Rash et al. | 726/1 |

OTHER PUBLICATIONS

Office Action for Application 13/844,726 dated Jan. 6, 2014.

* cited by examiner

| | users | usernames | locations | apps | sendbytes | recbytes | hosts | protocol | prt | occurrences | medianinterval | meaninterval |
|---|---|---|---|---|---|---|---|---|---|---|---|---|
| 1 | 3.52E+14 | A | hangzhou | com.sina.weibo | 8 | 8 | wbapp.mobile.sina.c | ./.unknown::tcp | 5224 | 265 | 181.9555001 | 422.4486275 |
| 2 | 3.52E+13 | B | nyc | com.sina.weibo | 8 | 8 | wbapp.mobile.sina.c | ./.unknown::tcp | 5224 | 237 | 240.9843801 | 365.0355941 |
| 3 | 3.53E+14 | B | nyc | com.tencent.mm | 16 | | tkklong.weixin.qq.cor | ./.unknown::tcp | 443 | 110 | 275.974 | 469.0365413 |
| 4 | 3.53E+14 | B | nyc | com.google.android.inputmethc | 417 | 376 | wccs.google-analytic | ./.http::tcp | 80 | 37 | 0.014999986 | 1826.212194 |
| 5 | 3.53E+14 | B | nyc | com.google.android.inputmethc | 418 | 376 | wccs.google-analytic | ./.http::tcp | 80 | 44 | 0.019999981 | 1523.935256 |
| 6 | 3.53E+14 | B | nyc | com.google.android.inputmethc | 423 | 376 | www.google-analytic | ./.http::tcp | 80 | 76 | 0.001999865 | 876.6963 |
| 7 | 3.53E+14 | B | nyc | com.google.android.inputmethc | 422 | 376 | www.google-analytic | ./.http::tcp | 80 | 84 | 0.022000093 | 792.104570 |
| 8 | 3.53E+14 | B | nyc | com.google.android.inputmethc | 423 | 376 | www.google-analytic | ./.http::tcp | 80 | 32 | 0.046000097 | 2120.797452 |
| 9 | 3.53E+14 | C | espoo | com.spotify.mobile.android.u | 11 | 11 | skype.sto.spotify.cor | ./.unknown::tcp | 4070 | 31 | 70.3405 | 111.3636 |
| 10 | 3.54E+14 | NA | NA | dns | 31 | 123 | p56.badoo.com | ./.dns::udp | 0 | 38 | 0.200999975 | 353.9108378 |
| 11 | 3.54E+13 | NA | NA | dns | 31 | 139 | p26.badoo.com | ./.dns::udp | 0 | 38 | 0.286000686 | 290.9340311 |
| 12 | 3.54E+14 | NA | NA | dns | 31 | 187 | p59.badoo.com | ./.dns::udp | 0 | 34 | 0.453999998 | 399.1469394 |
| 13 | 3.54E+14 | NA | NA | com.okcupid.okcupid | 697 | 353 | www.okcupid.com | ./.http::tcp | 80 | 32 | 989.3840001 | 2604.970418 |
| 14 | 3.54E+14 | NA | NA | com.sec.spp.push | 222 | 1371 | ad.360yield.com | ./.ssl::tcp | 443 | 44 | 1283.032 | 1977.109326 |
| 15 | 3.54E+14 | NA | NA | com.groupon | 1219 | 2036 | api.groupon.com | ./.unknown::tcp | 5223 | 63 | 1083.5166 | 1639.196164 |
| 16 | 3.54E+14 | NA | NA | com.badoo.mobile | 901 | 4054 | ats.criticism.com | ./.http::tcp | 443 | 35 | 901.3809999 | 1509.097235 |
| 17 | 3.54E+13 | NA | NA | com.badoo.mobile | 1309 | 5868 | bma3eu1.badoo.com | ./.unknown::tcp | 443 | 39 | 660.1109998 | 2243.515653 |
| 18 | 3.54E+14 | D | espoo | com.atoma | 865 | 592 | apps-read.facebook.co | ./.unknown::tcp | 443 | 56 | 901.3809999 | 1435.934182 |
| 19 | 3.54E+13 | D | espoo | com.sec.spp.push | 222 | 1370 | eu.sc-proxy.samsun | ./.ssl::tcp | 5223 | 49 | 1201.7455 | 1600.242271 |
| 20 | 3.54E+14 | D | espoo | com.spotify.mobile.android.u | 11 | 11 | bnr2-accesspoint-a5 | ./.unknown::tcp | 4070 | 254 | 77.76799989 | 336.3814111 |
| 21 | 3.54E+14 | E | espoo | com.spotify.mobile.android.u | 11 | 22 | skype.sto.spotify.cor | ./.unknown::tcp | 4070 | 38 | 639.957 | 2143.189351 |
| 22 | 3.54E+14 | E | espoo | jp.naver.line.android | 53 | 69 | enline.naver.com | ./.unknown::tcp | 5228 | 60 | 494.7355 | 963.3473088 |
| 23 | 3.54E+14 | E | espoo | com.viber.voip | 56 | 76 | aloha.viber.com | ./.unknown::tcp | 4244 | 60 | 600.1539999 | 1329.444119 |
| 24 | 3.54E+14 | F | NA | com.sec.spp.push | 222 | 1371 | wch1-man.sessgges | ./.ssl::tcp | 5223 | 66 | 1295.8146 | 1586.889333 |
| 25 | 3.54E+14 | F | atlanta | com.spotify.mobile.android.u | 11 | 11 | brasha.ash.spotify.c | ./.unknown::tcp | 4070 | 451 | 62.44500005 | 183.1780378 |
| 26 | 3.54E+13 | F | atlanta | com.spotify.mobile.android.u | 11 | 22 | tractas.ash.spotify.c | ./.unknown::tcp | 4070 | 103 | 202.6169999 | 764.4671073 |
| 27 | 3.54E+14 | G | espoo | com.accuweather.android | 240 | 98 | focde-sphotos-a-a.xx | ./.unknown::tcp | 1237 | 91 | 132.3875 | 888.3795333 |
| 28 | 3.54E+14 | G | espoo | com.android.exchange | 441 | 341 | wex.seven.com | ./.unknown::tcp | 443 | 120 | 0.680000657 | 666.2443866 |
| 29 | 3.55E+14 | G | espoo | com.android.exchange | 468 | 341 | wex.seven.com | ./.ssl::tcp | 443 | 271 | 0.277500033 | 293.5432 |
| 30 | 3.55E+14 | G | espoo | org.kp.solar_activity_monitor | 184 | 1911 | boxoffice.urbanairsh | ./.http::tcp | 443 | 64 | 145.112 | 1422.087132 |
| 31 | 3.55E+14 | G | espoo | com.accuweather.android | 931 | 2231 | boxoffice.urbanairsh | ./.unknown::tcp | 443 | 92 | 172.802 | 883.4443846 |
| 32 | 3.55E+14 | G | espoo | com.accuweather.android | 1171 | 2323 | boxoffice.urbanairsh | ./.unknown::tcp | 443 | 208 | 84.7650001 | 391.895135 |
| 33 | 3.55E+14 | H | espoo | com.android.exchange | 453 | 367 | wex.seven.com | ./.ssl::tcp | 443 | 139 | 0.420000076 | 34.42988596 |
| 34 | 3.57E+14 | I | nev | ru.yandex.yandexnavi | 194 | 310 | mt.android.appspot.r | ./.http::tcp | 80 | 43 | 0.812000036 | 1669.083333 |
| 35 | 3.57E+14 | I | nev | ru.yandex.yandexnavi | 409 | 415 | mobile.maxi.yandex.r | ./.http::tcp | 80 | 38 | 25.16199994 | 1762.267135 |
| 36 | 3.57E+14 | I | nyc | com.google.android.gsf.login | 503 | 3923 | mtalk.google.com | ./.ssl::tcp | 5228 | 102 | 326.1900001 | 850.527901 |
| 37 | 3.58E+14 | J | nyc | com.android.email | 474 | 101 | wex.seven.com | ./.ssl::tcp | 443 | 52 | 676.448 | 1660.385226 |
| 38 | 3.58E+14 | J | nyc | com.android.email | 480 | 101 | wex.seven.com | ./.ssl::tcp | 443 | 71 | 338.1333999 | 1215.535871 |
| 39 | 3.58E+14 | J | nyc | com.android.email | 487 | 101 | wex.seven.com | ./.ssl::tcp | 443 | 33 | 677.0425 | 2483.23109 |
| 40 | 3.58E+14 | J | nyc | com.android.email | 488 | 101 | wex.seven.com | ./.ssl::tcp | 443 | 41 | 285.6074999 | 1870.418775 |

FIG. 1A-4

| | users | usernames | locations | apps | sendbytes | recbytes | hosts | protocol | port | occurrences | medianinterval | meaninterval |
|---|---|---|---|---|---|---|---|---|---|---|---|---|
| 41 | 3.58E+14 | K | espoo | com.igat.ci | 216 | 74 | sc.log-recbeer.seven.l.http:tcp | | 8111 | 45 | 31.3983999 | 50.25431818 |
| 42 | 3.60E+14 | L | los angeles | dns | 45 | 51 | bank71.m.ads.rrp.s./.dns/udp | | 0 | 36 | 27.55780015 | 1720.303143 |
| 43 | 3.60E+14 | L | los angeles | com.igat.ci | 216 | 74 | sc.log-recbeer.seven./.http:tcp | | 8111 | 34 | 5.33299645 | 12.66786867 |
| 44 | 3.60E+14 | L | los angeles | com.ea.jamdat.flight.scrabblefree | 746 | 242 | a.jumptap.com | ./.http:tcp | 80 | 37 | 26.63549995 | 1572.548639 |
| 45 | 3.60E+14 | L | los angeles | com.facebook.katana | 1540 | 762 | api-read.facebook.co./.http:ssl:tcp | | 443 | 33 | 1.100008923 | 1935.281625 |
| 46 | 3.60E+14 | L | los angeles | com.yahoo.mobile.client.android | 373 | 973 | android.connector.pa./.unknown:tcp | | 8596 | 41 | 1164.662 | 2107.050175 |
| 47 | 3.60E+14 | L | los angeles | com.yahoo.mobile.client.android | 373 | 1013 | android.connector.pa./.unknown:tcp | | 8596 | 40 | 1369.674 | 2071.76841 |
| 48 | 3.60E+14 | L | los angeles | com.ea.jamdat.flight.scrabblefree | 717 | 1120 | androidsdk.ads.mp.r./.http:tcp | | 80 | 36 | 26.35999997 | 1720.258643 |
| 49 | 3.60E+14 | M | nyc | com.pandora.android | 221 | 396 | tt.andomedia.com | ./.http:tcp | 80 | 33 | 60.65480003 | 352.0108438 |
| 50 | 3.60E+14 | N | nyc | com.tencent.mm | 18 | 16 | hklong.wexin.qq.co./.unknown:tcp | | 443 | 178 | 270.9779999 | 454.1836124 |
| 51 | 3.60E+14 | N | nyc | com.kakao.talk | 52 | 52 | story.kakao.com | ./.unknown:tcp | 443 | 35 | 1200.6026 | 1552.529862 |
| 52 | 3.60E+14 | N | nyc | com.viber.voip | 68 | 76 | aloha.viber.com | ./.unknown:tcp | 4244 | 86 | 900.6539999 | 953.4056471 |
| 53 | 3.60E+14 | N | nyc | com.yahoo.mobile.client.android | 372 | 973 | android.connector.pa./.unknown:tcp | | 8596 | 39 | 1255.8566 | 2192.604421 |
| 54 | 3.60E+14 | N | nyc | com.yahoo.mobile.client.android | 372 | 1013 | android.connector.pa./.unknown:tcp | | 8596 | 48 | 1224.468 | 1318.380651 |
| 55 | 3.60E+14 | O | nyc | dns | 31 | 47 | swix.seven.com | ./.dns/udp | 0 | 68 | 1015.599 | 1526.121085 |
| 56 | 3.60E+14 | O | nyc | dns | 41 | 57 | ping-showcase.revel./.dns/udp | | 0 | 34 | 1610.399 | 2799.899879 |
| 57 | 3.60E+14 | O | nyc | dns | 44 | 71 | 21.204.87.203.in-add./.dns/udp | | 0 | 68 | 951.3898882 | 1139.758785 |
| 58 | 3.60E+14 | O | nyc | dns | 33 | 81 | api.twitter.com | ./.dns/udp | 0 | 32 | 3541.357 | 2905.510355 |
| 59 | 3.60E+14 | O | nyc | dns | 42 | 84 | 55.77.13.31.in-addr.i./.dns/udp | | 0 | 128 | 902.9300001 | 738.040792 |
| 60 | 3.60E+14 | O | nyc | dns | 36 | 94 | graph.facebook.com | ./.dns/udp | 0 | 81 | 604.3265001 | 1149.436037 |
| 61 | 3.60E+14 | O | nyc | dns | 60 | 138 | android.connector.com./.http:ssl:tcp | | 0 | 46 | 1201.445 | 1955.596284 |
| 62 | 3.60E+14 | O | nyc | com.facebook.katana | 2931 | 953 | graph.facebook.com | ./.http:ssl:tcp | 443 | 86 | 301.494 | 462.1219284 |
| 63 | 3.60E+14 | O | nyc | com.facebook.katana | 2112 | 953 | graph.facebook.com | ./.http:ssl:tcp | 443 | 53 | 302.7105 | 957.0198269 |
| 64 | 3.60E+14 | O | nyc | com.yahoo.mobile.client.android | 372 | 973 | android.connector.pa./.unknown:tcp | | 8596 | 50 | 1211.878 | 1759.152531 |
| 65 | 3.60E+14 | O | nyc | com.yahoo.mobile.client.android | 372 | 1013 | android.connector.pa./.unknown:tcp | | 8596 | 53 | 1209.6195 | 1592.231366 |
| 66 | 9.90E+13 | P | nyc | com.google.android.gsf.login | 914 | 470 | android.clients.googl./.http:ssl:tcp | | 443 | 87 | 912.0135001 | 812.0977791 |
| 67 | 9.90E+13 | P | nyc | com.etsy.mobile | 503 | 1430 | mobiles.ebay.com | ./.ssl:tcp | 443 | 169 | 908.0534999 | 496.3175238 |
| 68 | A100017 | Q | nyc | com.yahoo.mobile.client.android | 29 | 29 | android.connector.pa./.unknown:tcp | | 8596 | 51 | 908.9079001 | 1843.49772 |
| 69 | A100001B | R | nyc | com.skype.raider | 5 | 5 | 4.401.6.99.99.20703.n./.unknown:tcp | | 12356 | 109 | 617.697 | 865.1553426 |
| 70 | A100001B | R | nyc | com.skype.raider | 49 | 13 | dsn16.d.skype.net | ./.unknown:tcp | 40007 | 39 | 862.2129999 | 235.711868 |
| 71 | A100001B | R | nyc | com.skype.raider | 49 | 180 | SKMSG101021.g./.unknown:tcp | | 443 | 52 | 910.620001 | 902.0048627 |
| 72 | A100001B | R | nyc | com.skype.raider | 60 | 184 | SNMSG39108622.g./.unknown:tcp | | 443 | 44 | 921.0409999 | 2172.956814 |
| 73 | A100001B | R | nyc | com.livemobile.thescore | 367 | 319 | api.thescore.com.pr./.http:tcp | | 80 | 36 | 8.265008032 | 2411.921 |
| 74 | A100001B | R | nyc | com.facebook.katana | 539 | 3993 | orcart.facebook.com./.ssl:tcp | | 8593 | 32 | 33.07208000 | 2740.932742 |

*FIG. 1A-5*

| Traffic Category/Application Category 1100 ||
|---|---|
| Interactive traffic | Background traffic |
| User waiting for response | User not waiting for response |
| Application in foreground | Application in background |
| Backlight on | Backlight off |

*FIG. 11*

| Content Category 1200 ||
|---|---|
| High priority | Low priority |
| Time critical | Non-time critical |

*FIG. 12*

| Mobile Application/Widget 1355 | Local Proxy 1365 | Host server 1385 Server Cache 1335 or Caching Proxy 1375 | Application Server/ Content Provider 1395 |
|---|---|---|---|
| Polls application server/provider 1332 | Poll intercepted 1334 | | |
| | Proxy detects that cache content is available for the polled content and is valid and thus retrieves a response to satisfy the poll 1336 | | |
| Receives a response to the poll from a cache entry 1338 | | | |
| Polls application server/provider 1340 | Poll intercepted 1342 | | |
| | Proxy detects that cache content is unavailable and decides to setup the polled source for caching 1344 | | |
| | Poll request forwarded to the source 1346 | | Receives the poll request from the application and provides a response to satisfy the current request 1348 |
| Receives the response to satisfy the request from the application server/provider 1350 | | | |
| | Tracks polling frequency of the application and sets up a polling schedule for the host server 1352 | | |
| | Sends the cache setup to the host server 1354 | Receives the cache setup including an identification of the application server/provider to be polled and a polling schedule 1356 | |
| | | Polls the Application server/provider to monitor the response to the request 1358 | Receives poll from host server and sends the response 1360 |
| | | Same response received, pulls the application based on the polling schedule 1362 | Receives poll from host server and sends the response 1364 |
| | | Detects changed or new response; notifies the local proxy 1366 | |
| | | Changed or new response stored in the server cache or the caching proxy 1368 | |
| | Receives notification that new or changed data is available; invalidates relevant cache entries 1370 | | |
| Polls application server/content provider 1372 | Determines that no valid cache entry is available and retrieves the response from the server cache 1374 | Receives request for the new response and sends the response to the local proxy 1376 | |
| Request satisfied from the server cache or caching proxy 1378 | | | |
| Polls application server/content provider 1380 | Determines that no valid cache entry is available and forwards the poll to the application server/provider 1382 | | Receives poll from and sends the response 1384 |
| Request satisfied from the application server/provider 1386 | | | |

*FIG. 13*

| Mobile Application/Widget 1455 | Local Proxy 1465 | Host server 1485 Server Cache 1435 or Caching Proxy 1475 | Application Server/ Content Provider 1495 |
|---|---|---|---|
| Polls application server/ provider 1432 | Poll intercepted and proxy determines that a cache defeating mechanism is employed by the server/provider 1434 | | |
| | Proxy detects that cache content is available for the polled content and decides to retrieve a response to satisfy the poll 1436 | | |
| Receives a response to the poll from a cache entry 1438 | | | |
| Polls application server/ provider 1440 | Poll intercepted and proxy determines that a cache defeating mechanism is employed by the server/provider 1442 | | |
| | Proxy detects that cache content is unavailable and decides to setup the polled source for caching 1444 | | |
| | Extracts a pattern of an identifier of the request and tracks polling frequency of the application and sets up a polling schedule for the host server 1446 | | |
| | Poll request forwarded to the source 1448 | | Receives the poll request from the application and provides a response to satisfy the current request 1450 |
| Receives the response to satisfy the request from the application server/provider 1452 | Cache the response and store a normalized version of the identifier in association with the received response for future identification and retrieval 1454 | | |
| | Sends the cache setup to the host server, including the identifier or a normalized version of the identifier 1456 | Receives the cache setup including an identification of the application server/provider to be polled and a polling schedule 1458 | |
| | | Polls the Application server/provider to monitor the response to the request 1460 | Receives poll from host server and sends the response 1462 |
| | | Same response received, pulls the application based on the polling schedule 1464 | Receives poll from host server and sends the response 1466 |
| | | Detects changed or new response; notifies the local proxy 1468 | |
| | | Changed or new response stored in the server cache or the caching proxy 1470 | |
| | Receives notification that new or changed data is available; invalidates relevant cache entries 1472 | | |
| Polls application server/content provider 1474 | Determines that no valid cache entry is available and retrieves the response from the server cache 1476 | Receives request for the new response and sends the response to the local proxy 1478 | |
| Request satisfied from the server cache or caching proxy 1480 | | | |
| Polls application server/content provider 1482 | Determines the poll to the application server/provider 1484 | | Receives poll from and sends the response 1486 |
| Request satisfied from the application server/provider 1488 | | | |

*FIG. 14*

BLOCKING/UNBLOCKING ALGORITHMS FOR SIGNALING OPTIMIZATION IN A WIRELESS NETWORK FOR TRAFFIC UTILIZING PROPRIETARY AND NON-PROPRIETARY PROTOCOLS

PRIORITY CLAIM

This application is a continuation of International Patent Application Serial No. PCT/US14/40772, filed Jun. 3, 2014, which claims the benefit of U.S. Provisional Patent Application Ser. No. 61/830,570, filed Jun. 3, 2013 and U.S. Provisional Patent Application Ser. No. 61/836,096, filed Jun. 17, 2013; the disclosures of each of which are incorporated herein by reference in their entireties.

TECHNICAL FIELD

This disclosure relates to signaling optimization in a wireless network. More specifically, it relates to blocking/unblocking algorithms for signaling optimization in a wireless network for traffic utilizing proprietary and non-proprietary protocols.

BACKGROUND

An increasing amount of mobile traffic is moving to vendor-specific proprietary protocols. Examples include Google's traffic over TCP port 5228, WhatsApp, Urban Airship push notifications used by various application vendors, Skype, Yahoo Mail 2.0 etc. This means that more and more of the application traffic that causes signaling now includes significant contribution from proprietary protocols on top of traffic utilizing standardized protocols such as HTTP/HTTPS. Conventional optimization of signaling relies upon some understanding of the protocol being used. Thus, there is a clear need for the ability to optimize signaling even for arbitrary, proprietary, and/or non-standard protocols, e.g., where the underlying protocol definition may be unknown.

SUMMARY

The subject matter disclosed herein includes an architecture (e.g., the distributed system comprised of the local proxy and/or the proxy server) to optimize signaling for arbitrary, proprietary, and/or non-standard protocols, in addition to standard protocols such as HTTP or HTTPS via blocking and/or unblocking algorithms.

According to one aspect, the subject matter described herein includes a method for signaling optimization in a wireless network utilizing proprietary and non-proprietary protocols. The method includes establishing a first session between an application on a mobile device and a local proxy on the mobile device, establishing a second session between the local proxy and a proxy server not located on the mobile device, and establishing a third session between the proxy server and a content server. The method also includes monitoring a byte stream present within the first and second sessions to identify patterns within the byte stream, and, in response to identifying a pattern within the byte stream, determining a behavior of the application based on the pattern, determining whether the behavior of the application is a candidate behavior for optimization, and, if so, performing signaling optimization between the application and the content server, where performing signaling optimization includes dismantling the second session, replaying the pattern to the application via the first session, and replaying the pattern to the content server via the third session.

According to another aspect, the subject matter described herein includes a system for signaling optimization in a wireless network utilizing proprietary and non-proprietary protocols. The system includes a mobile device that includes an application and a local proxy, a proxy server not located on the mobile device, and a content server. A first session is established between the application and the local proxy, a second session is established between the local proxy and the proxy server, and a third session between the proxy server and the content server. A byte stream present within the first and second sessions is monitored to identify patterns within the byte stream. If a pattern is identified, the behavior of the application is determined based on that pattern. If that behavior is a candidate for optimization, then a signaling optimization is performed between the application and the content server, including dismantling the second session, replaying the pattern to the application via the first session, and replaying the pattern to the content server via the third session.

According to another aspect, the subject matter described herein includes a computer program product for signaling optimization in a wireless network utilizing proprietary and non-proprietary protocols. The computer program product includes a non-transitory computer readable storage medium having computer readable code embodied therewith, the computer readable code configured for establishing a first session between an application on a mobile device and a local proxy on the mobile device, establishing a second session between the local proxy and a proxy server not located on the mobile device, establishing a third session between the proxy server and a content server, monitoring a byte stream present within the first and second sessions to identify patterns within the byte stream, and, in response to identifying a pattern within the byte stream, determining a behavior of the application based on the pattern, determining whether the behavior of the application is a candidate behavior for optimization, and, if so, performing signaling optimization between the application and the content server, where performing signaling optimization includes dismantling the second session, replaying the pattern to the application via the first session, and replaying the pattern to the content server via the third session.

BRIEF DESCRIPTION OF THE DRAWINGS

Embodiments of the subject matter described herein will now be explained with reference to the accompanying drawings, wherein the like reference numerals represent like parts, of which:

FIG. 1A-2 depicts a diagram of an example pattern showing periodic 8/8 byte transactions, extracted from byte streams from an application that utilizes a proprietary or non-standard protocol;

FIG. 1A-3 depicts a diagram of an example pattern showing recurring transaction inside a Secure Socket Layer (SSL) stream, extracted from byte streams from an application that utilizes a proprietary or non-standard protocol;

FIG. 1A-4 and FIG. 1A-5 depict first and second halves, respectively, of an exemplary table listing example transaction data and patterns determined from analyzing of byte streams going to and/or received from applications utilizing proprietary, non-proprietary and/or encrypting protocols according to an embodiment of the subject matter described herein;

FIG. 11 depicts a table showing examples of different traffic or application category types which can be used in implementing network access and content delivery policies according to an embodiment of the subject matter described herein;

FIG. 12 depicts a table showing examples of different content category types which can be used in implementing network access and content delivery policies according to an embodiment of the subject matter described herein;

FIG. 13 depicts an interaction diagram showing how polls having data requests from a mobile device (e.g., any wireless device) to an application server/content provider over a wireless network (or broadband network) can be can be cached on the local proxy and managed by the distributed caching system according to an embodiment of the subject matter described herein;

FIG. 14 depicts an interaction diagram showing how polls for content from an application server/content provider which employs cache-defeating mechanisms in identifiers (e.g., identifiers intended to defeat caching) over a wireless network (or broadband network) can be detected and locally cached according to an embodiment of the subject matter described herein;

DETAILED DESCRIPTION

Figures 1, 1A:
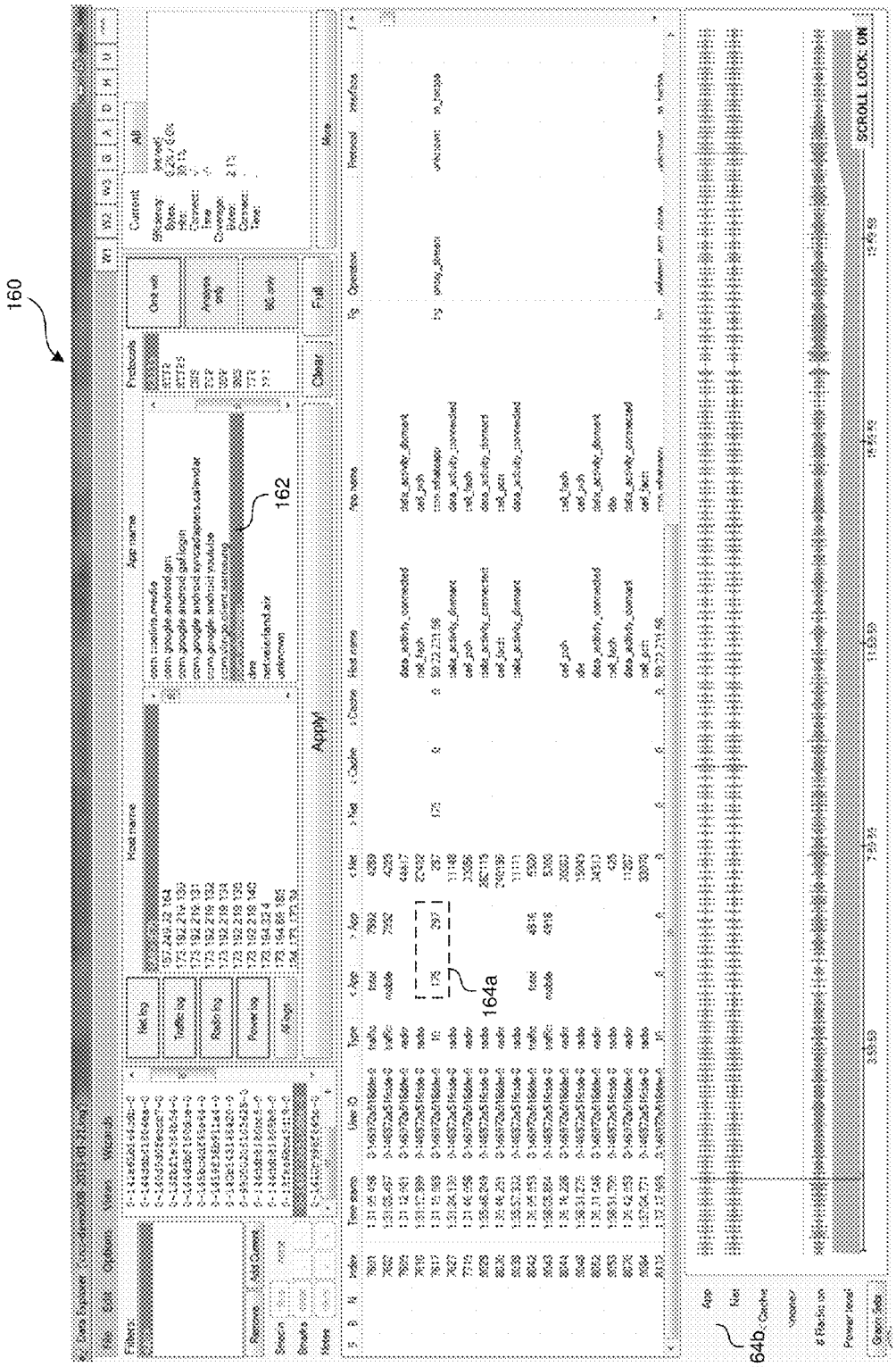
FIG. 1A-1 depicts a diagram of an example pattern showing recurring 175 bytes upstream and 297 bytes downstream, extracted from an application that utilizes a proprietary or non-standard protocol.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Existing signaling optimization systems and methods for reducing mobile network congestion can optimize mobile traffic over standard and non-proprietary application level protocols including, but not limited to: Hypertext Transfer Protocol (HTTP), Hypertext Transfer Protocol Secure (HTTPS), File Transfer Protocol (FTP), Simple Mail Transfer Protocol (SMTP), Internet Message Access Protocol (IMAP), Post Office Protocol (POP), and the like. However, many mobile applications are moving away from the standard protocols towards vendor specific proprietary protocols. For example, Google utilizes a non-standard Transmission Control Protocol (TCP) port 5228. By way of another example, the "WhatsApp" mobile application uses a customized version of the Extensible Messaging and Presence Protocol (XMPP). Similarly, some applications such as Skype and Yahoo mail use their own proprietary protocols, while others such as Urban Airship's push notifications protocol is used by various vendors.

Existing signaling optimization systems and methods replay or replicate entire transaction as instructed by a client, which means that the server performing the signal optimization needs to establish any session (TCP socket and any application level handshakes, Secure Sockets Layer (SSL), etc.) autonomously. However, to do so, the protocols must be well understood. For example, the header and other protocol specific data must be known before any optimization can be performed. As proprietary protocols are not standardized and not well understood, mobile traffic over such proprietary protocols cannot be optimized by existing optimization systems and methods.

Embodiments of the present disclosure include application blocking/unblocking algorithms for signaling optimization in a wireless network for traffic utilizing both proprietary and non-proprietary protocols. The disclosed technology includes an architecture (e.g., a distributed system comprised of a local proxy and/or a proxy server) that optimizes signaling for arbitrary, proprietary, and/or non-standard protocols, in addition to standard protocols such as HTTP, HTTPS, FTP, SMTP, IMAP, POP, XMPP, and the like in one embodiment. In a further embodiment, the disclosed technology provides a protocol agnostic systems and methods for signaling optimization for any traffic in a wireless network.

In one embodiment, a Transmission Control Protocol (TCP) stream is passed as a byte stream from an application to a local proxy over a first session, from the local proxy to a proxy server over a second TCP session, and from the proxy server to a content server over a third TCP session. The local proxy observes and identifies patterns within the byte stream, without being aware of the underlying protocol. Once a pattern is identified, the second TCP session is torn down such that the first TCP session replays the pattern to the application, and third TCP session replays the pattern to the content server. Once either side detects a change in the pattern, the second TCP session is re-established to deliver the changed content to the other end.

When it is not possible to identify a pattern within a byte stream and perform a direct replay of the binary transactions, and/or in addition to the TCP stream optimization, the disclosed innovation herein provides application blocking/unblocking strategies that can optimize signaling in the wireless network for traffic utilizing various proprietary and non-proprietary protocols.

Embodiments of the present disclosure include systems and methods for optimizing signaling in a wireless network for traffic utilizing proprietary and/or non-proprietary protocols by blocking/unblocking various types of applications and/or traffic and triggering reconnecting of applications. These keepalive strategies facilitate management of traffic and/or resource conservation between mobile devices (e.g., wireless devices) and a remote server such as an application server, content provider or a messaging server (e.g., Google Cloud Messaging (GCM) server, Exchange ActiveSync (EAS) server) via the distributed proxy system.

FIG. 1A-1 depicts a screen shot 160 of an application for capturing and/or analyzing network traffic, showing the detection of an example pattern produced by an application "Whatsapp" 162, which utilizes a proprietary or non-standard protocol. Screen shot 160 shows the detection of a recurring pattern 164a that includes 175 bytes upstream (to the application) and 297 bytes downstream (from the application.) This pattern occurs periodically, as can be seen in the activity graph 164b.

FIG. 1A-2 depicts another screen shot 166 of an application for capturing and/or analyzing network traffic, showing the detection of an example pattern produced by another application, "com.sina.weibo" 168, which also uses a proprietary or non-standard protocol. Screen shot 166 shows the detection of a recurring pattern showing periodic 8/8 byte transactions 170a and 170b. This pattern also occurs periodically, as can be seen in the activity graph 170c.

FIG. 1A-3 depicts yet another screen shot 172 of an application for capturing and/or analyzing network traffic, showing the detection of an example pattern detected within a Secure Socket Layer (SSL) stream extracted from byte streams from an application "com.google.android.gms" 174 that utilizes a proprietary or non-standard protocol. Screen shot 172 shows the detection of a recurring pattern (176a, 176b) that includes 680 bytes upstream and 1268 bytes downstream. This pattern also occurs periodically, as can be seen in the activity graph 176d.

FIG. 1A-4 and FIG. 1A-5 depict the top and bottom portions, respectively, of a table 178 listing example transaction data and patterns determined from analyzing of byte streams going to and/or received from applications utilizing proprietary, non-proprietary and/or encrypting protocols according to an embodiment of the subject matter described herein. As can be seen in FIG. 1A-4, a system implementing the concepts described herein can identify and process various protocols, including an unknown protocol operating over TCP 178a, http over TCP 178b, and SSL over TCP 178c. Other protocols listed in table 178 include DNS over TCP.

Figure 1B:
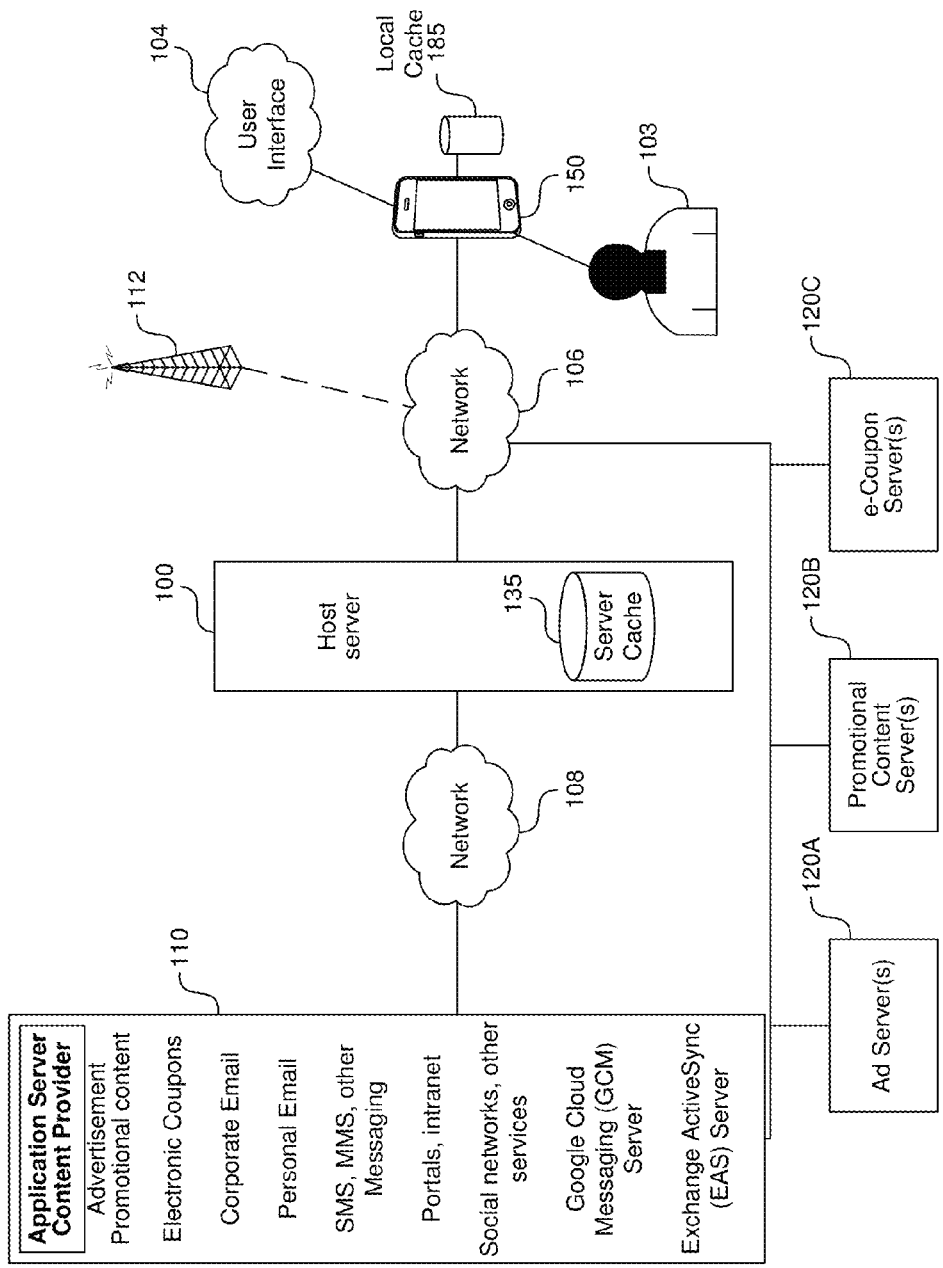
FIG. 1B illustrates an example diagram of a system for implementing blocking/unblocking algorithms for signaling optimization in a wireless network for traffic utilizing proprietary and non-proprietary protocols according to an embodiment of the subject matter described herein.

FIG. 1B illustrates an exemplary system for implementing blocking/unblocking algorithms for signaling optimization in a wireless network for traffic utilizing proprietary and non-proprietary protocols according to an embodiment of the subject matter described herein. In the embodiment illustrated in FIG. 1B, a system includes a host server 100 that facilitates management of traffic, content caching, and/or resource conservation between mobile devices (e.g., wireless devices), an application server or content provider 110, or other servers such as an ad server 120A, a promotional content server 120B, an e-coupon server 120C, or messaging servers such as the Google Cloud Messaging (GCM) server and the Exchange ActiveSync (EAS) server in a wireless network (or broadband network) 108 for resource conservation. Host server 100 can further optimize signaling in a wireless network 106 for traffic utilizing proprietary (non-standard) and non-proprietary (e.g., HTTP) protocols.

In the embodiment illustrated in FIG. 1B, host server 100 includes a server cache 135 for storing periodic and/or often-used signaling messages, for example. In one embodiment, a network subscriber 103 may use a mobile device 150 that includes its own local cache 185 for storing periodic or often-used signaling messages. Mobile device 150 may include a user interface 104 by which subscriber 103 may use to configure mobile device 150 appropriately. In the embodiment illustrated in FIG. 1B, for example, mobile device 150 may connect to mobile network 106 through a cell phone tower 112 or other network access equipment.

Figure 1C:
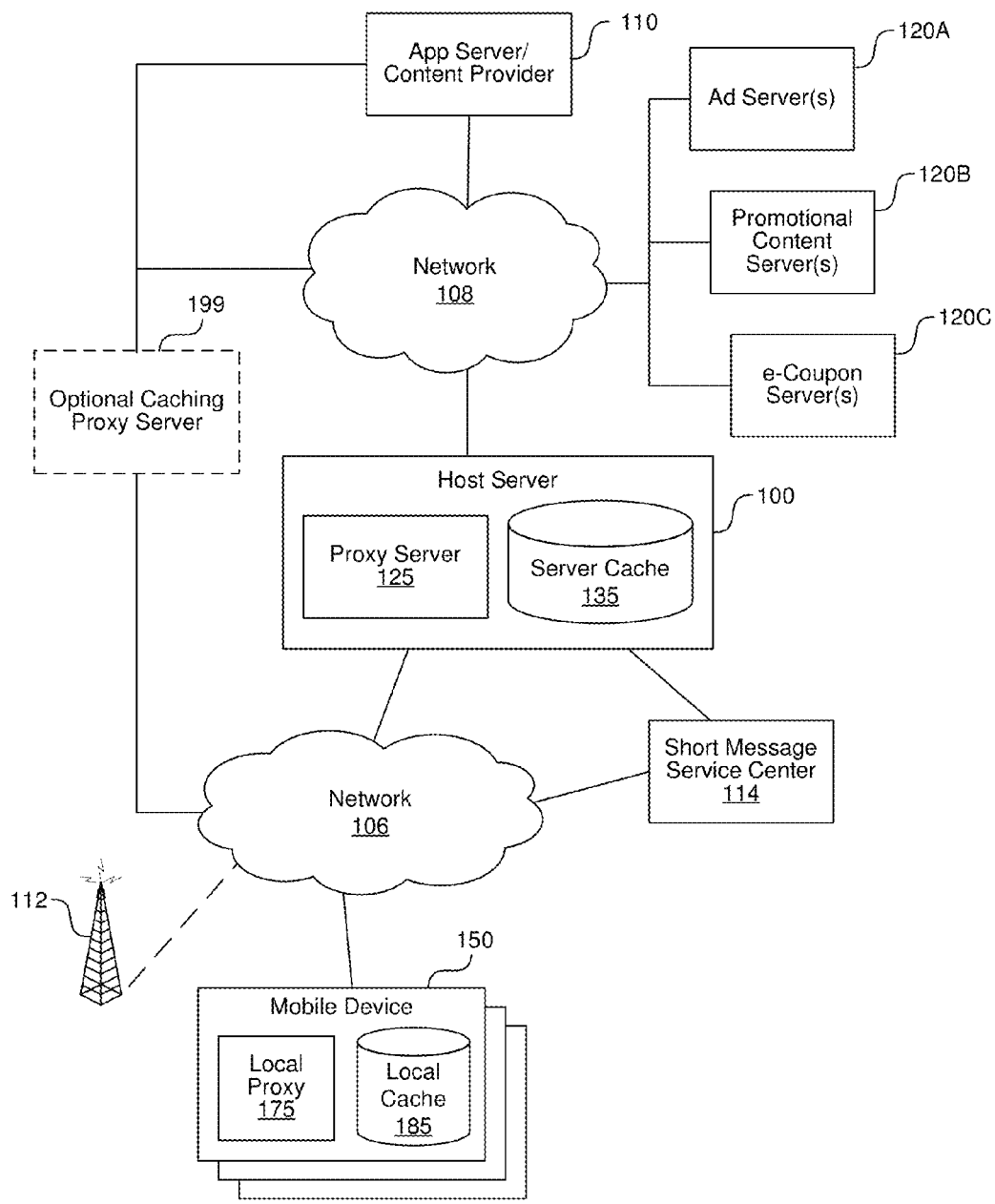
FIG. 1C illustrates an example diagram of a proxy and cache system distributed between the host server and device which facilitates network traffic management between a device, an application server or content provider, or other servers such as an ad server, promotional content server, an e-coupon server or messaging servers such as the GCM server and the EAS server for resource conservation and content caching according to an embodiment of the subject matter described herein.

FIG. 1C illustrates an exemplary system for implementing blocking/unblocking algorithms for signaling optimization in a wireless network for traffic utilizing proprietary and non-proprietary protocols according to another embodiment of the subject matter described herein. In the embodiment illustrated in FIG. 1C, host server 100 includes not only server cache 135 but also a proxy server 125. Likewise, mobile device 150 includes not only local cache 185 but also a local proxy 175. In one embodiment, network 108 may include an optional caching proxy server 199. The proxy system distributed among the host server and the device can further optimize signaling in a wireless network for traffic utilizing proprietary (non-standard) and non-proprietary (e.g., HTTP) protocols. An example of optimization by the proxy system will be described in more detail below.

Figure 1D:
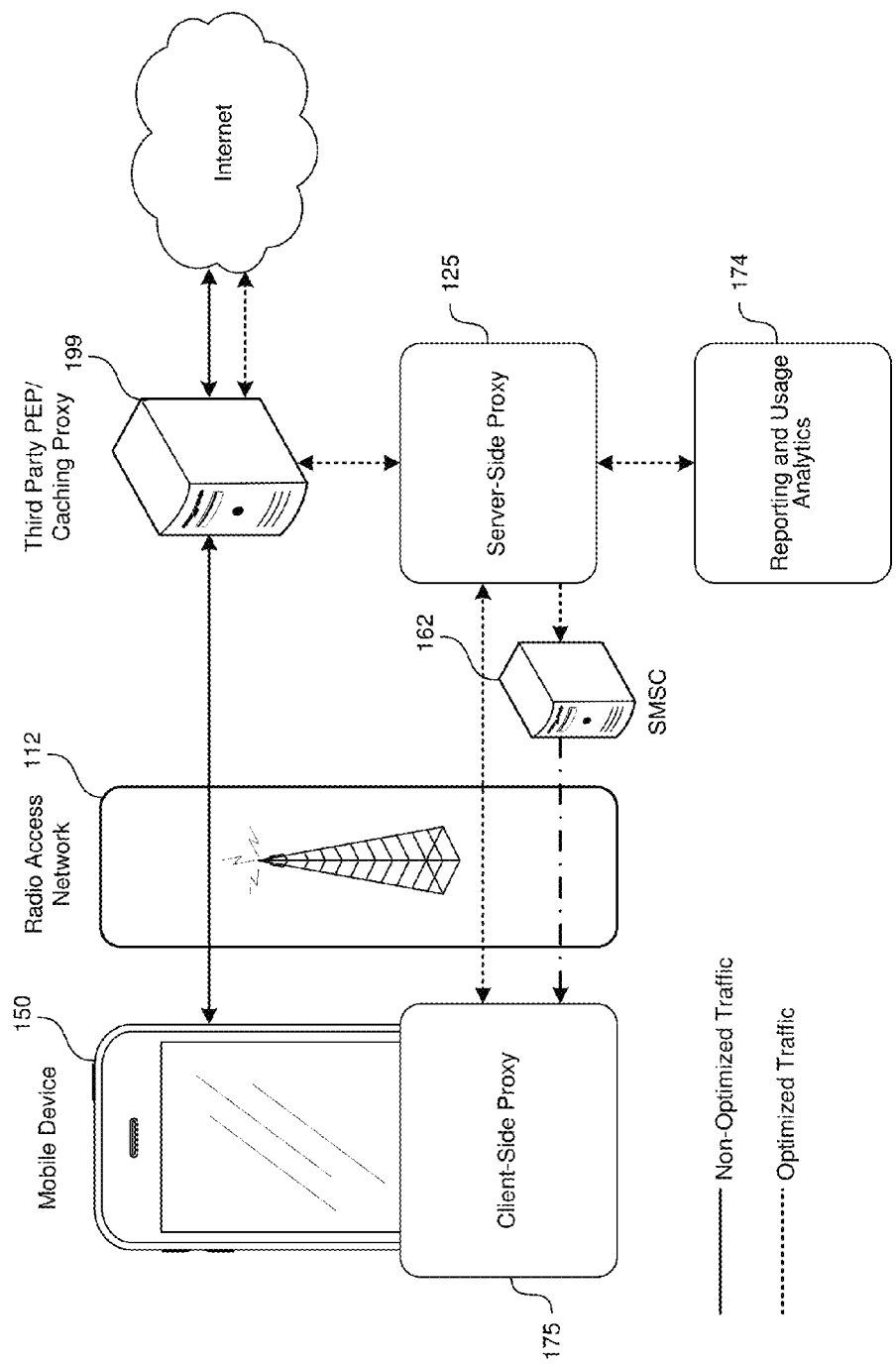
FIG. 1D illustrates an example diagram of the logical architecture of a distributed proxy and cache system according to an embodiment of the subject matter described herein.

FIG. 1D illustrates an exemplary system for implementing blocking/unblocking algorithms for signaling optimization in a wireless network for traffic utilizing proprietary and non-proprietary protocols according to yet another embodiment of the subject matter described herein. FIG. 1D illustrates an example diagram of the logical architecture of a distributed proxy and cache system. In the embodiment illustrated in FIG. 1D, a radio access network 112 allows mobile device 150 to access the Internet or other data and/or telecommunications network via third party PEP/caching proxy 199. The solid lines represent non-optimized signaling traffic, while dotted lines represent optimized traffic. A client-side proxy 175 located on or within mobile device 175 communicates with a server-side proxy 125. In the embodiment illustrated in FIG. 1D, server-side proxy 125 may communicate optimized traffic with a Short Message Service Center (SMSC) 162, which communicates in either an optimized or non-optimized manner to client side proxy 175. In one embodiment, a reporting and usage analytics entity 174 may communicate with server-side proxy 125.

Figure 1E:
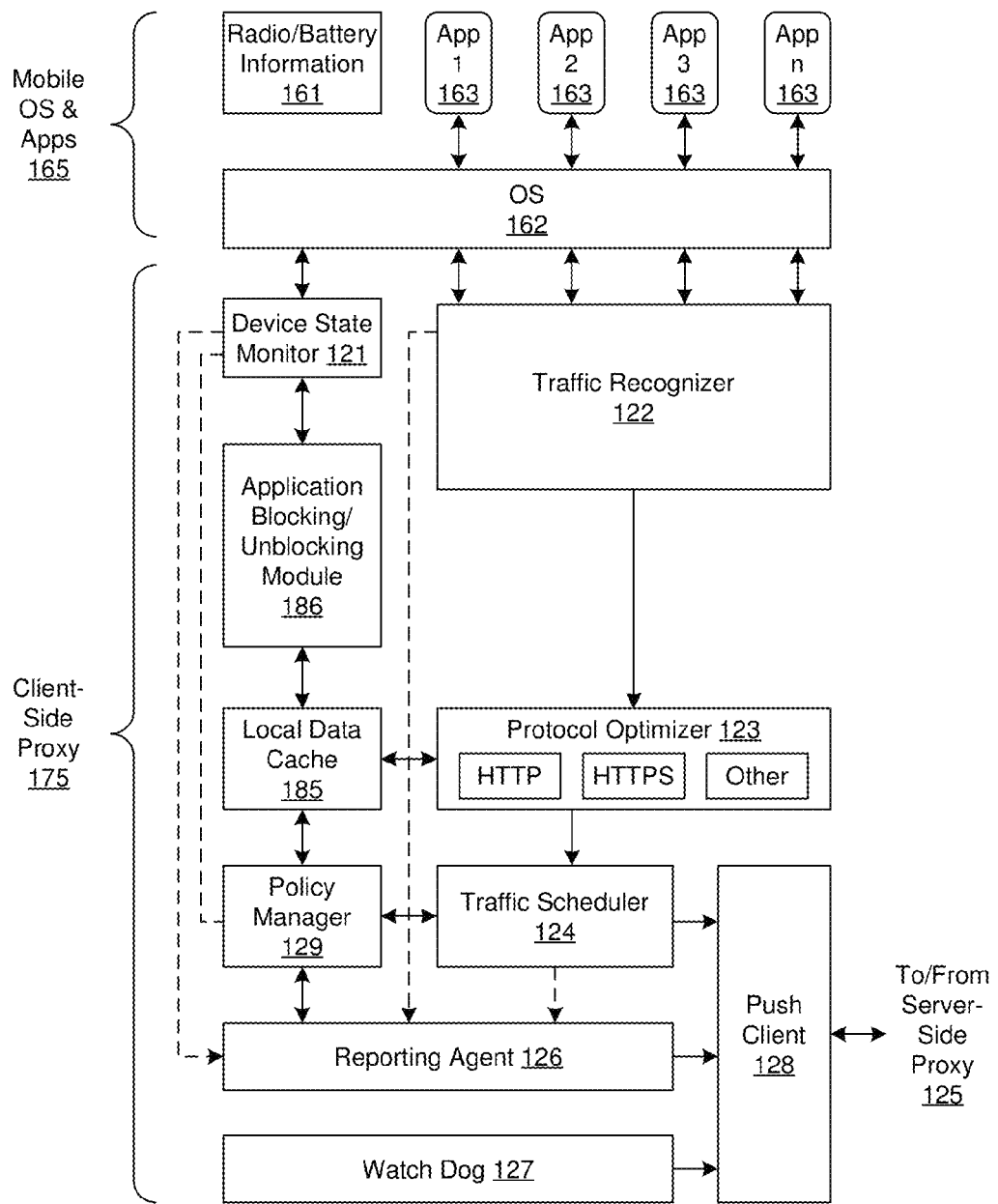
FIG. 1E illustrates an example diagram showing the architecture of client side components in a distributed proxy and cache system having an application/server stabilizer component for optimizing signaling in a wireless network for traffic utilizing proprietary (non-standard) and non-proprietary (e.g., HTTP) protocols according to an embodiment of the subject matter described herein.

FIG. 1E illustrates in more detail a portion of an exemplary system for implementing blocking/unblocking algorithms for signaling optimization in a wireless network for traffic utilizing proprietary and non-proprietary protocols according to yet another embodiment of the subject matter described herein. FIG. 1E illustrates an example diagram showing the architecture of client side components in a distributed proxy and cache system having an application/server stabilizer component for optimizing signaling in a wireless network for traffic utilizing proprietary (non-standard) and non-proprietary (e.g., HTTP) protocols. In the embodiment illustrated in FIG. 1E, a mobile device, such as mobile device 150, includes a radio/battery information module 161, a mobile operating system 162, and multiple applications 163, collectively referred to as "mobile OS and apps" 165. In one embodiment, client side proxy 175 includes a device state monitor 121, a traffic recognizer 122, a protocol optimizer 123, a traffic scheduler 124, a policy manager 129, a reporting agent 126, a watchdog module 127, and a push client 128 that communicates with a server side proxy 128 via the network. In the embodiment illustrated in FIG. 1E, client side proxy 175 includes local data cache 185 and an application blocking/unblocking module 186.

Figure 1F:
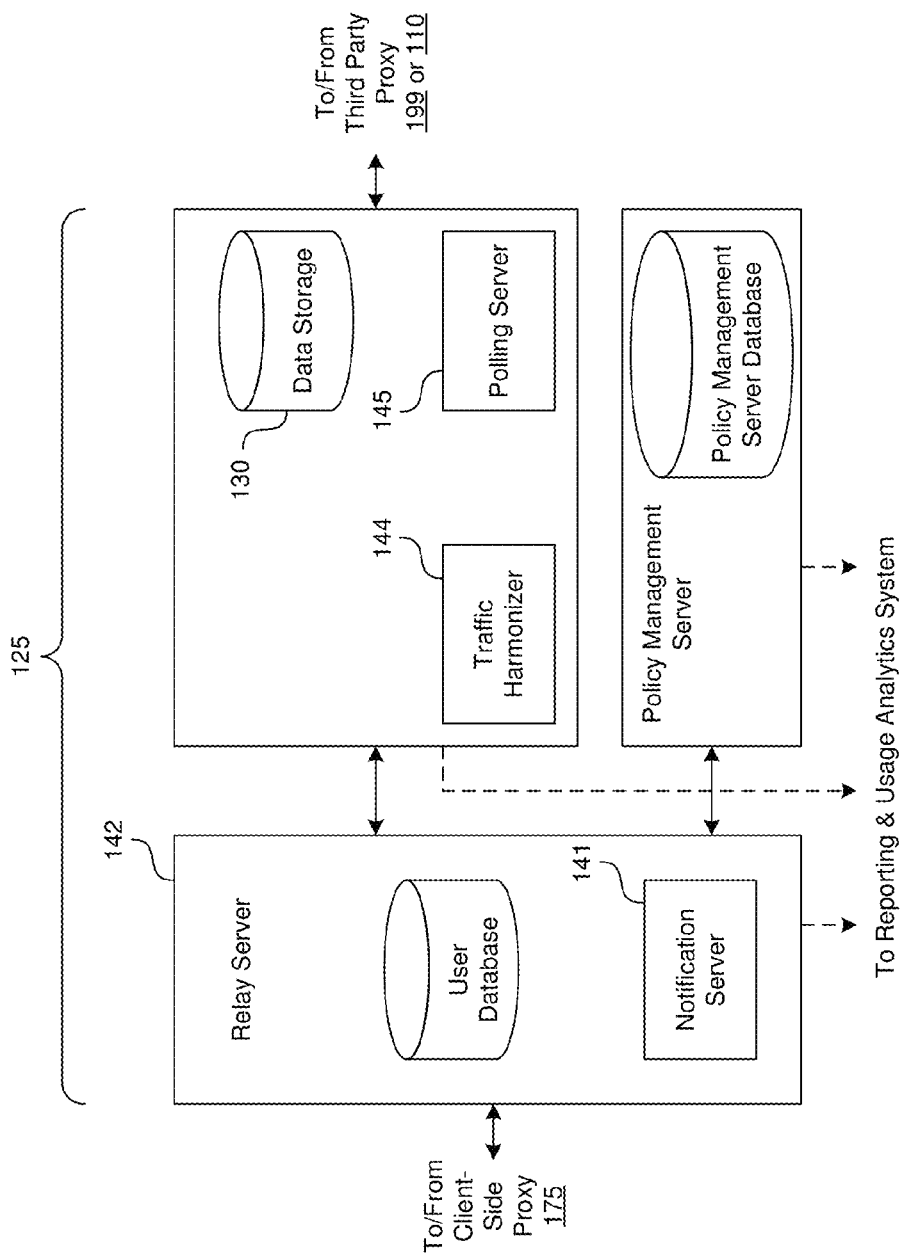
FIG. 1F illustrates a diagram of the example components on the server side of the distributed proxy and cache system according to an embodiment of the subject matter described herein.

FIG. 1F illustrates in more detail a portion of an exemplary system for implementing blocking/unblocking algorithms for signaling optimization in a wireless network for traffic utilizing proprietary and non-proprietary protocols according to yet another embodiment of the subject matter described herein. FIG. 1F illustrates a diagram of the example components on the server side of the distributed proxy and cache system. In the embodiment illustrated in FIG. 1F, proxy server 125 includes a relay server 142 that communicates with client side proxy 175. In one embodiment, relay server 142 includes a user database and a notification server 141. In the embodiment illustrated in FIG. 1F, proxy server 125 also includes local data storage 130, a traffic harmonizer 144, and a polling server 145. A policy management server that includes a policy management server database is also included. Some or all of the various components within proxy server 125 may communicate information to and from reporting and usage analytics system 174.

Figure 2A:
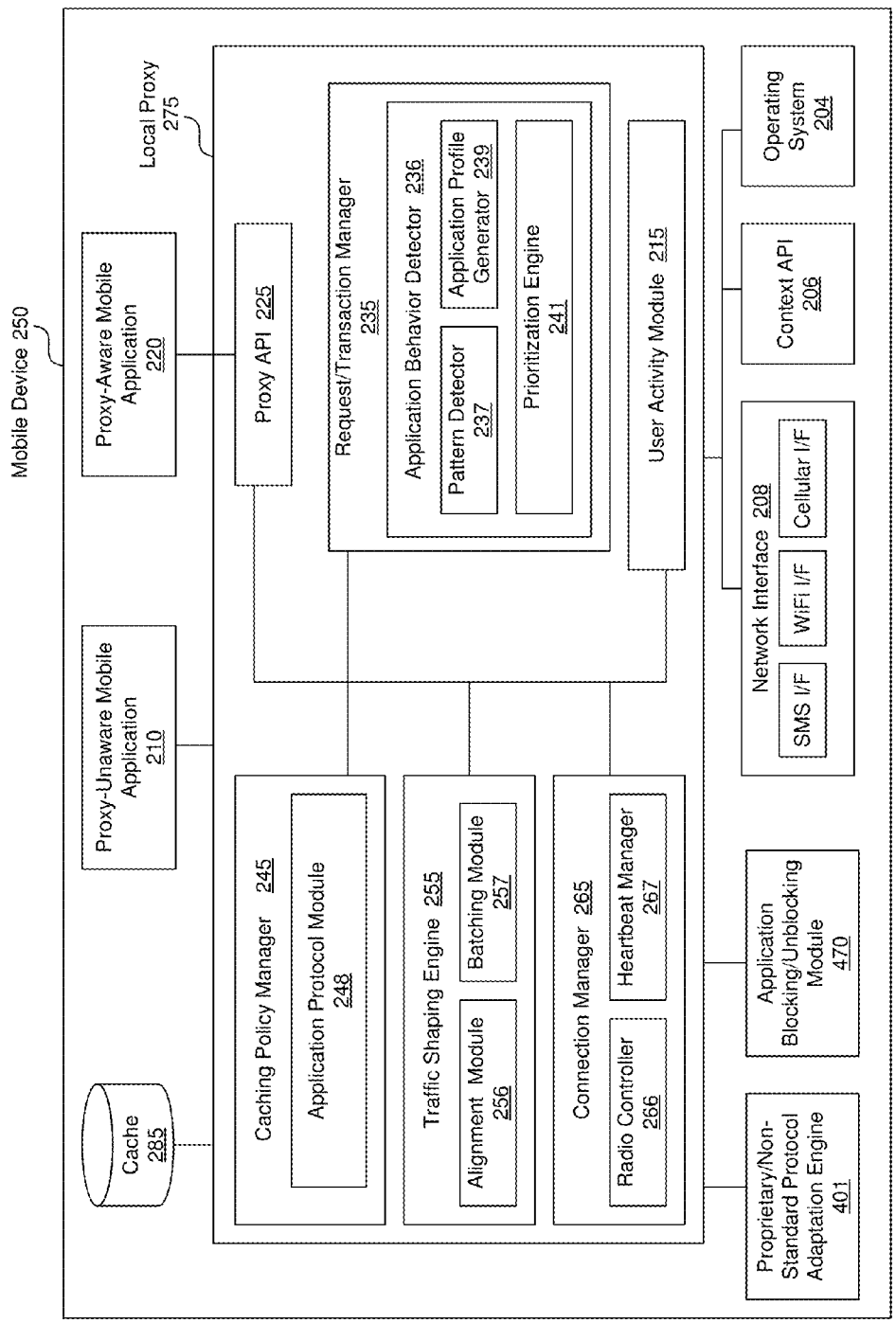
FIG. 2A depicts a block diagram illustrating another example of client-side components in a distributed proxy and cache system, further including a proprietary/non-standard protocol adaptation engine and an application blocking/unblocking module according to an embodiment of the subject matter described herein.
Figure 2B:
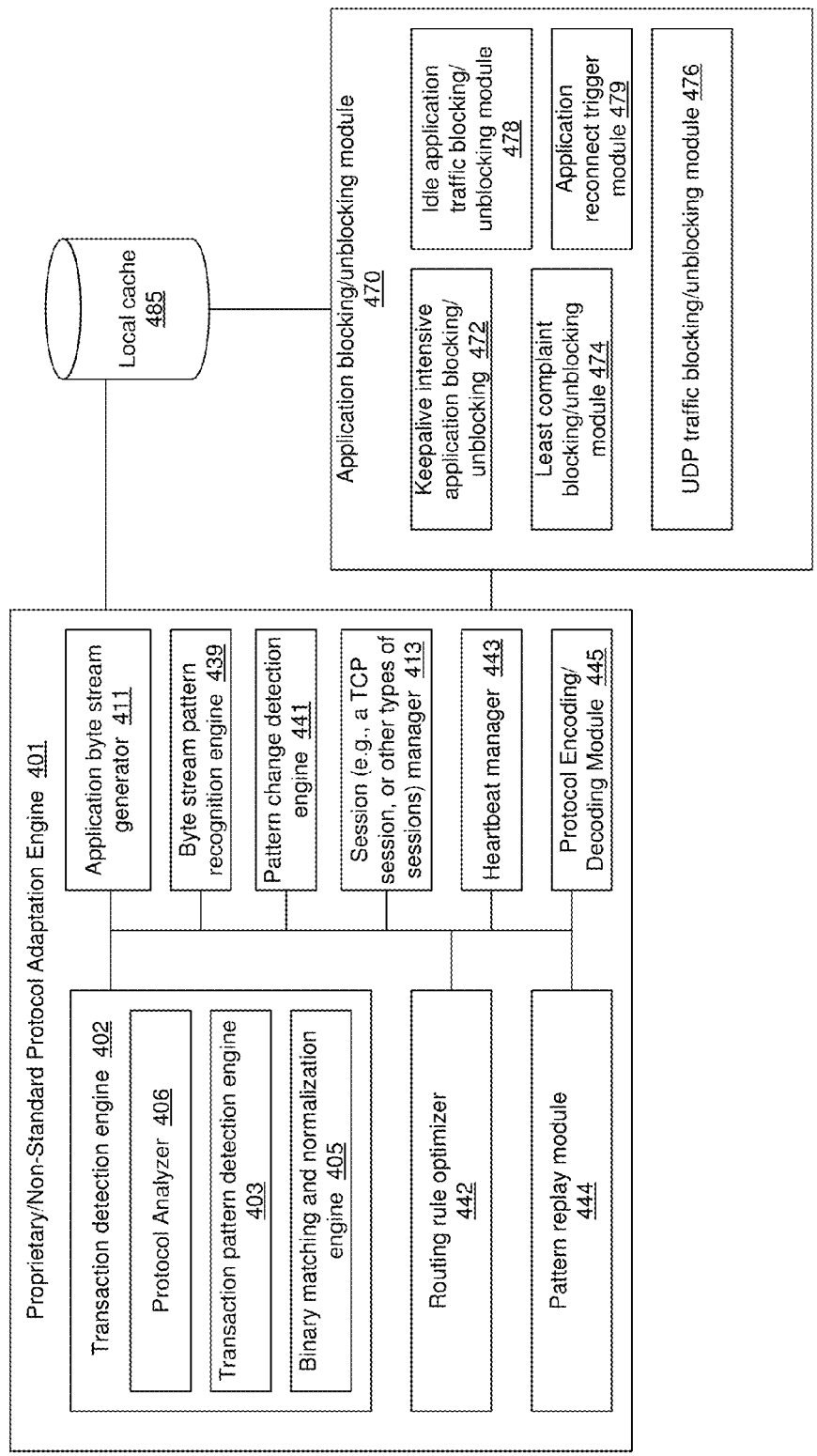
FIG. 2B depicts a block diagram illustrating additional components in the proprietary/non-standard protocol adaptation engine and the application blocking/unblocking module shown in the example of FIG. 2.

FIGS. 2A and 2B illustrate in more detail a portion of an exemplary system for implementing blocking/unblocking algorithms for signaling optimization in a wireless network for traffic utilizing proprietary and non-proprietary protocols according to yet another embodiment of the subject matter described herein. FIG. 2A depicts a block diagram illustrating another example of client-side components in a distributed proxy and cache system, further including a proprietary/non-standard protocol adaptation engine and an application blocking/unblocking module.

In the embodiment illustrated in FIG. 2A, mobile device 250 includes both a proxy-unaware mobile application 210 and a proxy-aware mobile application 220. The proxy aware mobile application 220 communicates with local proxy 275 via a proxy application programming interface (API) 225. In the embodiment illustrated in FIG. 2A, mobile device 250 also includes an OS 204, a context API 206, a network interface 208 that includes interface modules for SMS, WiFi, cellular, etc., and a cache 285.

In the embodiment illustrated in FIG. 2A, local proxy 275 includes a user activity module 215, a caching policy manager 245 that includes a application protocol module 248, a traffic shaping engine 255 that includes an alignment module 256 and a batching module 257, a connection manager 265 that includes a radio controller 266 and a heartbeat manager 267, and a request transaction manager 235 that includes an application behavior detector 236. In one embodiment, application behavior detector 236 includes a pattern detector 237, an application profile generator 239, and a prioritization engine 241.

In the embodiment illustrated in FIG. 2A, mobile device 250 includes a proprietary/non-standard protocol adaptation engine 401 and an application blocking/unblocking module 470, which are are described in more detail in FIG. 2B.

FIG. 2B depicts a block diagram illustrating additional components in the proprietary/non-standard protocol adaptation engine and the application blocking/unblocking module shown in the example of FIG. 2A.

In the embodiment illustrated in FIG. 2B, adaptation engine 401 includes a transaction detection engine 402 that includes a protocol analyzer 406, a transaction pattern detection engine 403, and a binary matching an normalization engine 405. Adaptation engine 401 also includes a routing rule optimizer 442, a pattern replay module 444, an application byte stream generator 411, a byte stream pattern recognition engine 439, a pattern change detection engine 441, a session manager 413, a heartbeat manager 443, and a protocol encoding/decoding module 445.

In the embodiment illustrated in FIG. 2B, application blocking/unblocking module 470 includes a keepalive intensive application blocking/unblocking module 472, a least complaint blocking/unblocking module 474, a UDB traffic blocking/unblocking module 476, an idle application traffic blocking/unblocking module 478, and an application reconnect trigger module 479. The operation of application blocking/unblocking module 470 will be described in more detail, below.

In the embodiment illustrated in FIG. 2B, both adaptation engine 401 and application blocking/unblocking module 470 communicate with each other and both have access to local cache 485.

Figure 3A:
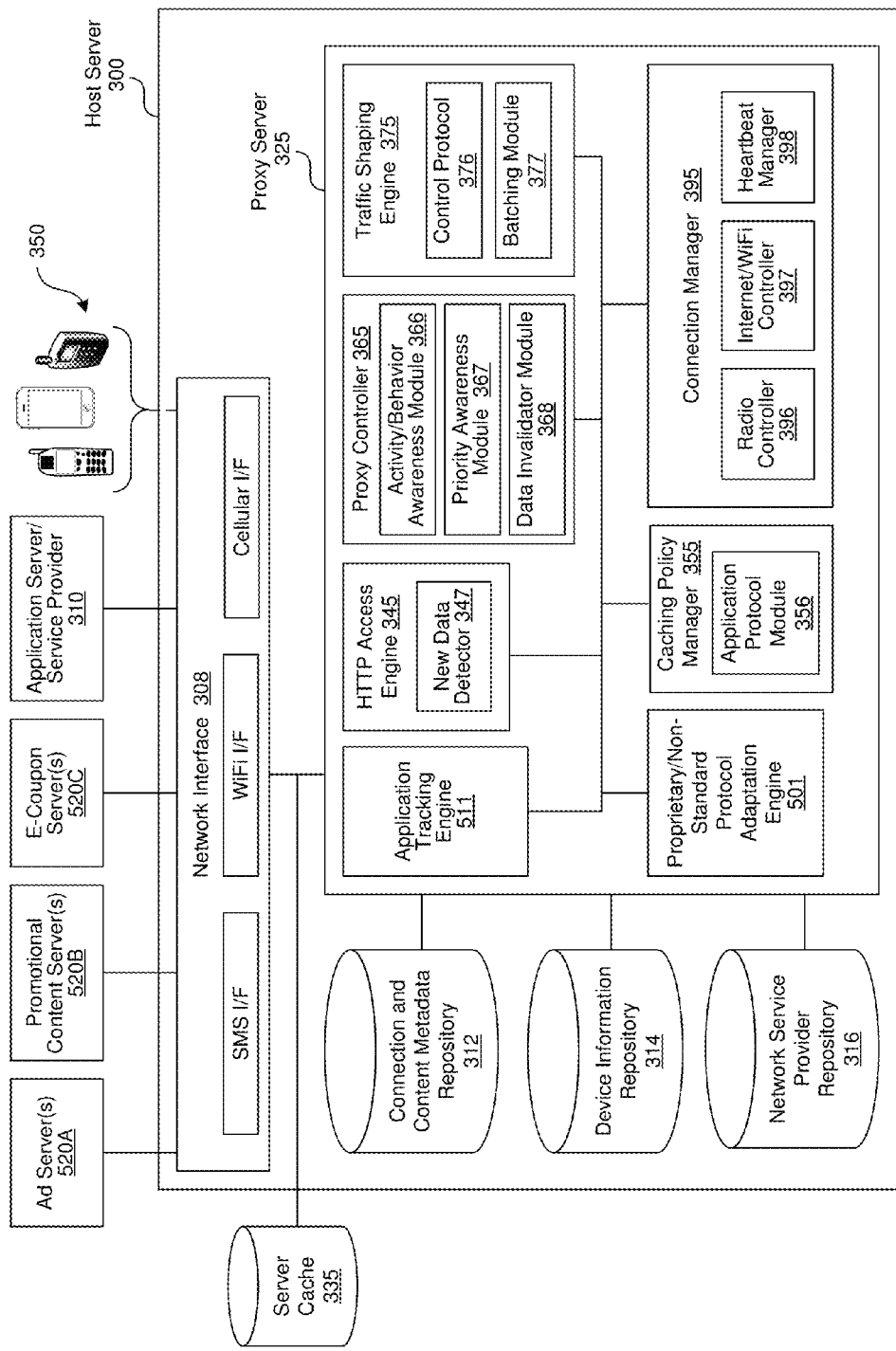
FIG. 3A depicts a block diagram illustrating an example of server-side components in a distributed proxy and cache system, further including a proprietary/non-standard protocol adaptation engine according to an embodiment of the subject matter described herein.
Figure 3B:
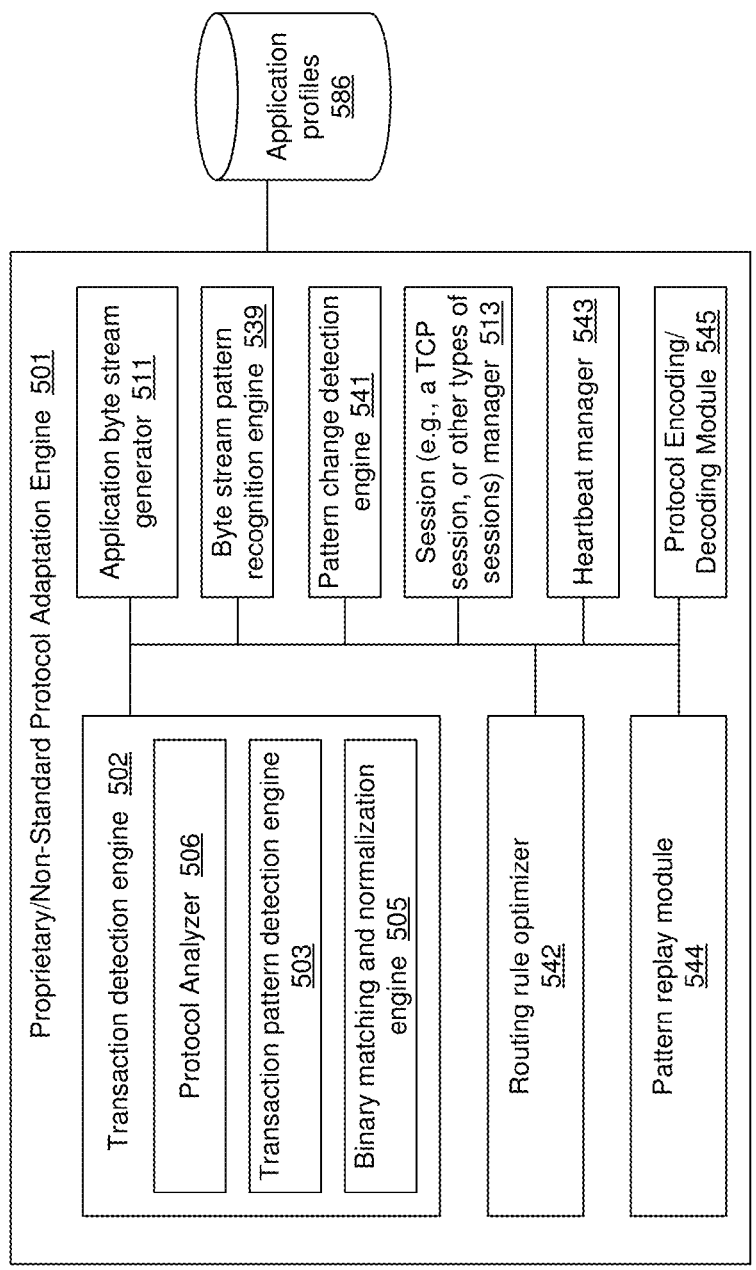
FIG. 3B depicts a block diagram illustrating additional components in the proprietary/non-standard protocol adaptation engine shown in the example of FIG. 3A.

FIGS. 3A and 3B illustrate an exemplary system for implementing blocking/unblocking algorithms for signaling optimization in a wireless network for traffic utilizing proprietary and non-proprietary protocols according to another embodiment of the subject matter described herein. FIG. 3A depicts a block diagram illustrating an example of server-side components in a distributed proxy and cache system, further including a proprietary/non-standard protocol adaptation engine.

In the embodiment illustrated in FIG. 3A, a host server 300 provides and controls access between mobile devices 350 and various service providers, such as an ad server 520A, a promotional content server 520B, an e-coupon server 520, and the like, as well as other application server/service provider(s) 310. Host server 300 may also have access to a server cache 335.

In the embodiment illustrated in FIG. 3A, host server 300 includes a network interface 308, a connection and content metadata repository 312, a device information repository 314, a network service provider repository 316, and a proxy server 325. In the embodiment illustrated in FIG. 3A, network interface 308 includes interface modules for various networks/network protocols, including, for example, an SMS interface, a WiFi interface, and a cellular interface.

In the embodiment illustrated in FIG. 3A, proxy server 325 includes an application tracking engine 511, an HTTP access engine 345, a proxy controller 365, a traffic shaping engine 375, a proprietary/non-standard protocol adaptation engine 501, a caching policy manager 355, and a connection manager 395. In one embodiment, HTTP access engine 345 includes a new data detector module 347. In one embodiment, proxy controller 365 includes an activity/behavior awareness module 365, a priority awareness module 367, and a data invalidator module 368. In one embodiment, traffic shaping engine 375 includes a control protocol module 376 and a batching module 377. In one embodiment, caching policy manager 355 includes an application protocol module 356. In one embodiment, connection manager 395 includes a radio controller 396, an internet/WiFi controller 397, and a heartbeat manager 398.

FIG. 3B depicts a block diagram illustrating additional components in the proprietary/non-standard protocol adaptation engine shown in the example of FIG. 3A. In the embodiment illustrated in FIG. 3B, adaptation engine 501 includes a transaction detection engine 502, a routing rule optimizer 542, a replay module 544, an application byte stream generator 511, a byte stream pattern recognition engine 539, a pattern change detection engine 541, a session manager 513, a heartbeat manager 543, and a protocol encoding/decoding module 545. In one embodiment, transaction detection engine 502 includes a protocol analyzer 506, a transaction pattern detection engine 503, and a binary matching and normalization engine 505. In the embodiment illustrated in FIG. 3B, adaptation engine 501 has access to an application profiles database 586.

Figure 4A:
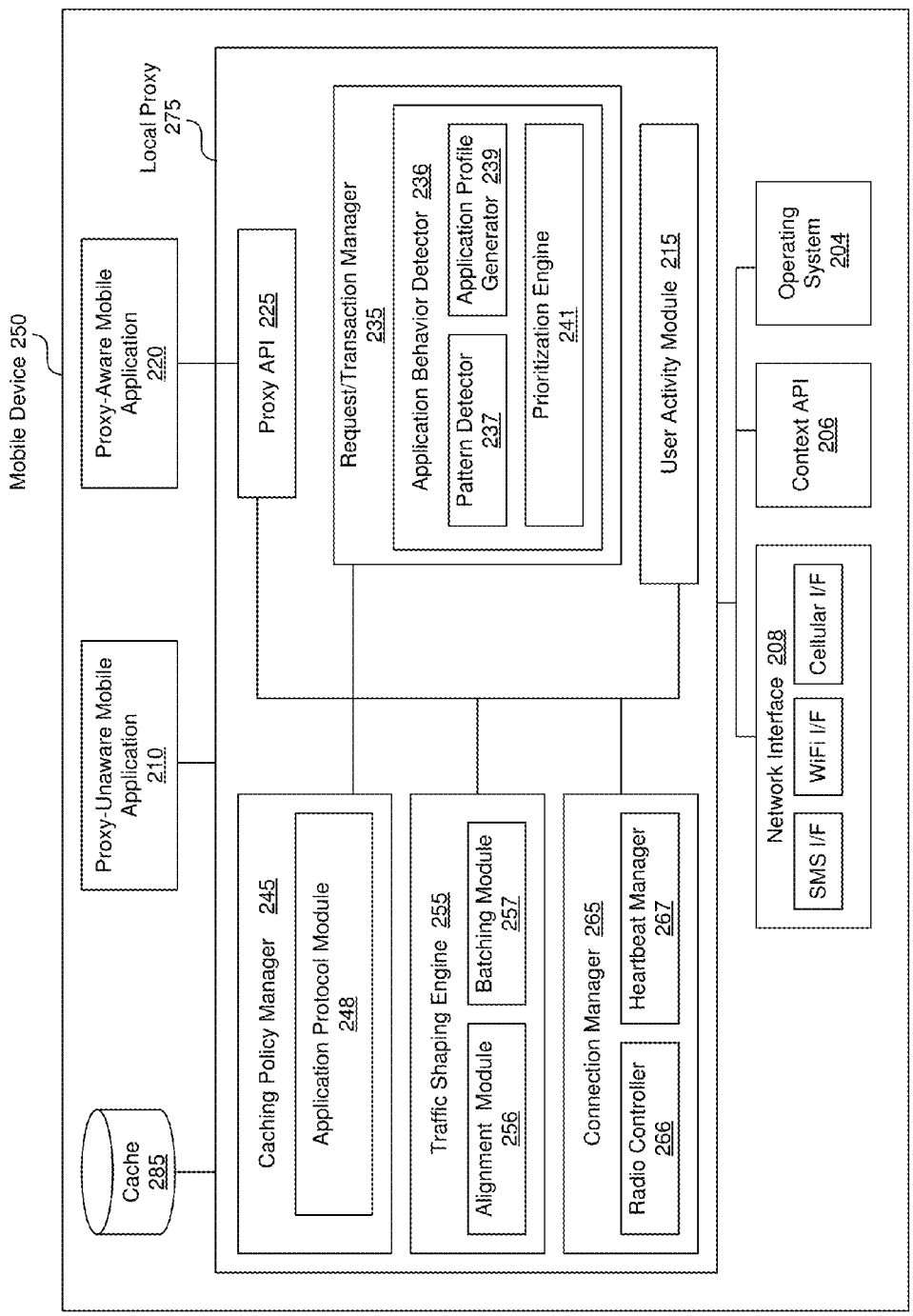
FIG. 4A depicts a block diagram illustrating an example of client-side components in a distributed proxy and cache system residing on a mobile device (e.g., wireless device) that manages traffic in a wireless network (or broadband network) for resource conservation, content caching, and/or traffic management according to an embodiment of the subject matter described herein.

FIGS. 4A through 4D illustrate in detail a portion of an exemplary system for implementing blocking/unblocking algorithms for signaling optimization in a wireless network for traffic utilizing proprietary and non-proprietary protocols according to another embodiment of the subject matter described herein. FIGS. 4A through 4D depict components of an exemplary mobile device. The mobile device 250 depicted in FIG. 4A is essentially the same as the like-numbered element illustrated in FIG. 2A, but without the adaptation engine 401 and application blocking/unblocking module 470 shown in FIG. 2A.

FIG. 4A depicts a block diagram illustrating an example of client-side components in a distributed proxy and cache system residing on a mobile device (e.g., wireless device) that manages traffic in a wireless network (or broadband network) for resource conservation, content caching, and/or traffic management. The client-side proxy (or local proxy) can further categorize mobile traffic and/or implement delivery policies based on application behavior, content priority, user activity, and/or user expectations.

Figure 4B:
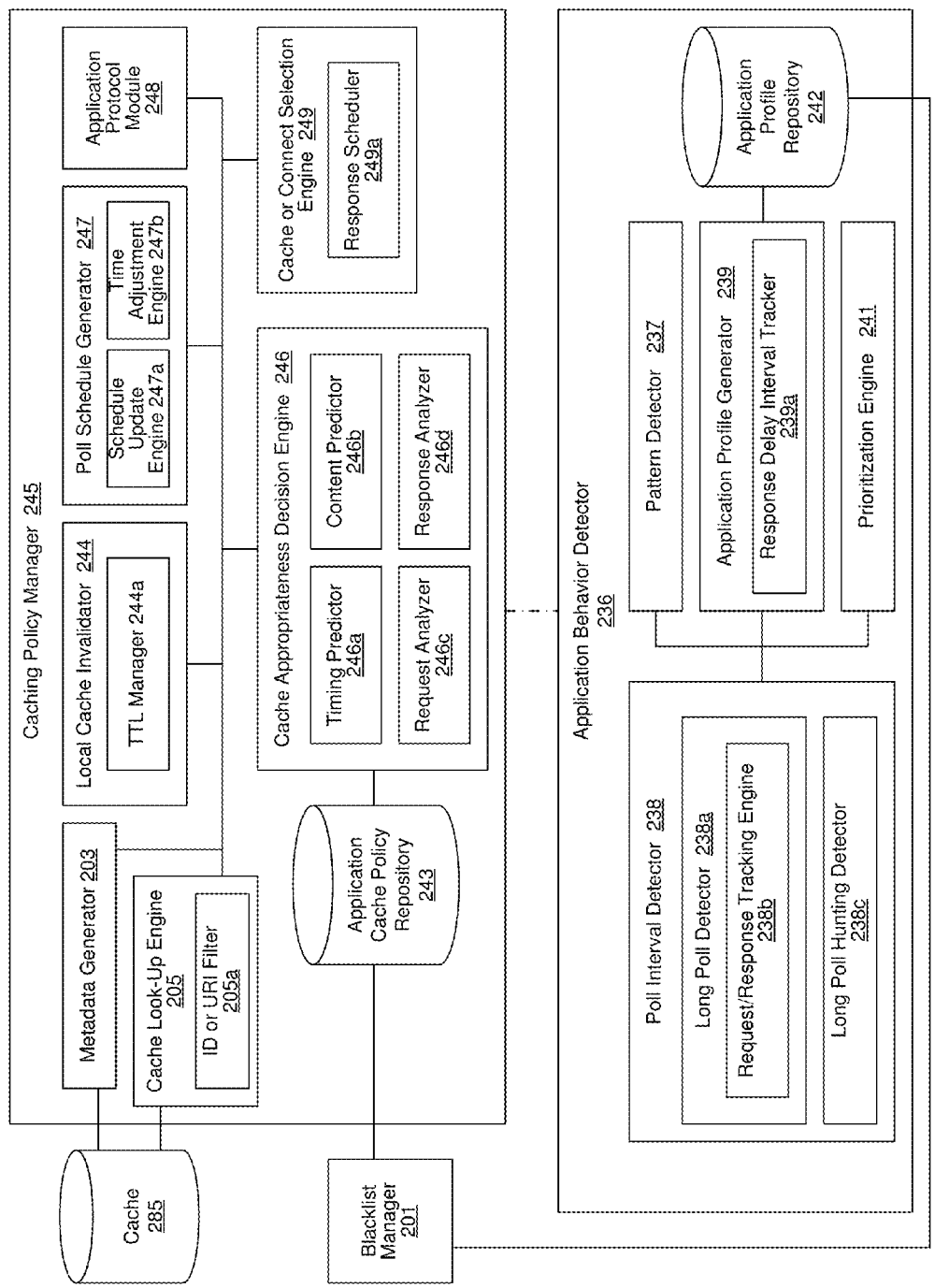
FIG. 4B depicts a block diagram illustrating a further example of components in the cache system shown in the example of FIG. 4A which is capable of caching and adapting caching strategies for mobile application behavior and/or network conditions according to an embodiment of the subject matter described herein, including components capable of detecting long poll requests and managing caching of long polls.

FIG. 4B depicts a block diagram illustrating a further example of components in the cache system shown in the example of FIG. 4A which is capable of caching and adapting caching strategies for mobile application behavior and/or network conditions. Components capable of detecting long poll requests and managing caching of long polls are also illustrated.

In the embodiment illustrated in FIG. 4B, caching policy manager 245 includes a metadata generator 203, a local cache invalidator 244, a poll schedule generator 247, an application protocol module 248, a cache look-up engine 205, an application cache policy repository 243, a cache appropriateness decision engine 246, and a cache or connect selection engine 249. In one embodiment, local cache invalidator 244 includes a time to live (TTL) manager 244A. In one embodiment, poll schedule generator 247 includes a schedule update engine 247A and a time adjustment engine 247B. In one embodiment, cache appropriateness decision engine 246 includes a timing predictor 246A, a content predictor 246B, a request analyzer 246C, and a response analyzer 246D. In one embodiment, cache or connect selection engine 249 includes a response scheduler 249A. In the embodiment illustrated in FIG. 4B, metadata generator 203 and cache look-up engine 205 within caching policy manager 245 access cache 285.

In the embodiment illustrated in FIG. 4B, application behavior detector 236 includes a poll interval detector 238, a pattern detector 237, an application profile generator 239, a prioritization engine 241, and an application profile repository 242. In one embodiment, poll interval detector 238 includes a long poll detector 238A, which may include a request/response tracking engine 238B, and a long poll hunting detector 238C. In one embodiment, application profile generator 239 includes a response delay interval tracker 239A.

In the embodiment illustrated in FIG. 4B, caching policy manager 245 and application behavior detector 236 communicate with a blacklist manager 201, which has access to both the application cache policy repository 243 within caching policy manager 245 and the application profile repository 242 within application behavior detector 236.

Figure 4C:
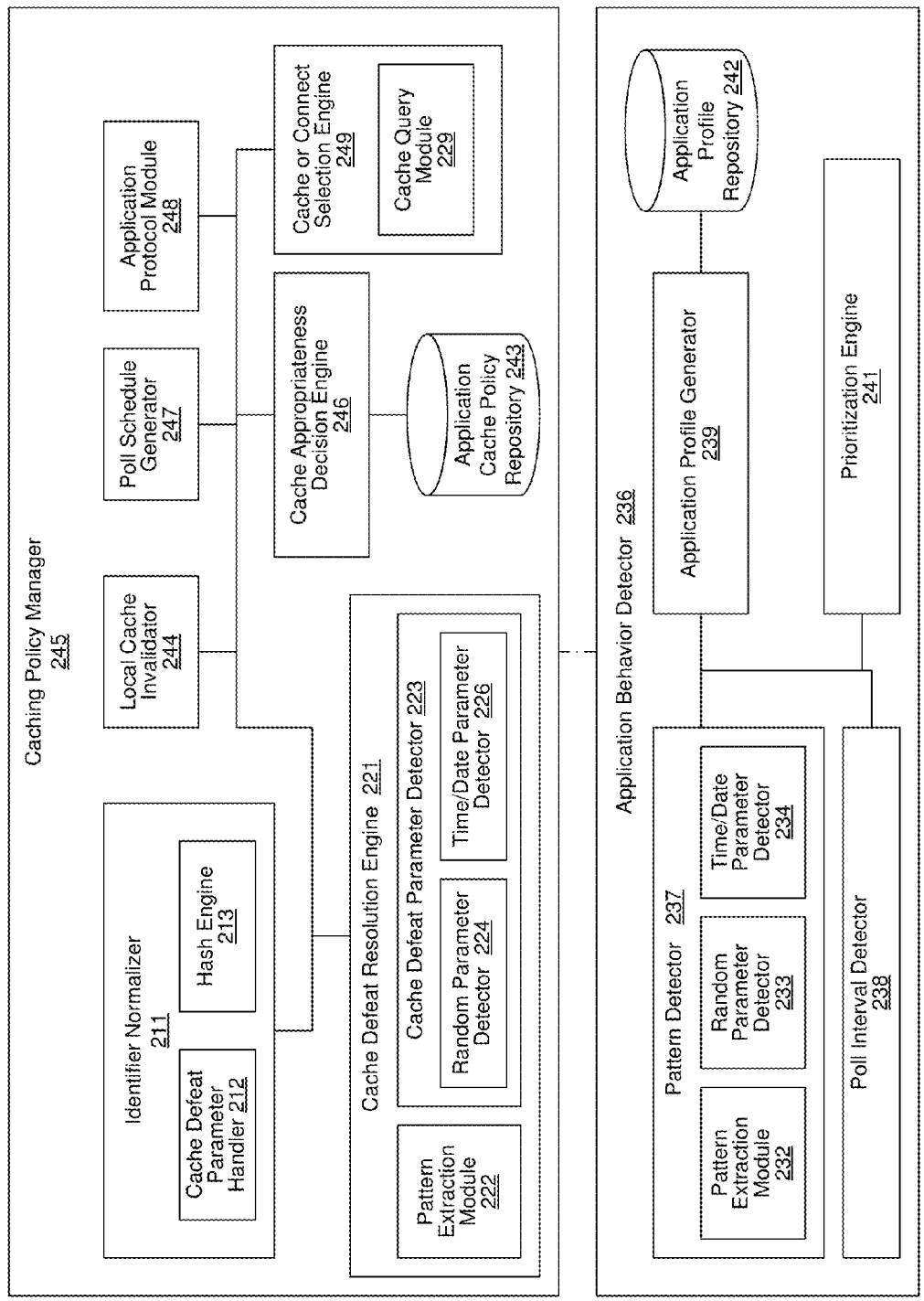
FIG. 4C depicts a block diagram illustrating additional components in the application behavior detector and the caching policy manager in the cache system shown in the example of FIG. 4A, which is further capable of detecting cache defeat and perform caching of content addressed by identifiers intended to defeat cache.

FIG. 4C depicts a block diagram illustrating additional components in the application behavior detector and the caching policy manager in the cache system shown in the example of FIG. 4A, which is further capable of detecting cache defeat and perform caching of content addressed by identifiers intended to defeat cache.

In the embodiment illustrated in FIG. 4C, caching policy manager 245 includes an identifier normalizer 211 and a cache defeat resolution engine 211. In one embodiment, identifier normalizer 211 includes a cache defeat parameter handler 212 and a hash engine 213. In one embodiment, cache defeat resolution engine 221 includes a pattern extraction module 222 and a cache defeat parameter detector 223. In one embodiment, cache defeat parameter detector 223 includes a random parameter detector 224 and a time/date parameter detector 226.

In the embodiment illustrated in FIG. 4C, application behavior detector 236 includes a pattern detector 237. In one embodiment, pattern detector 237 includes a pattern extraction module 232, a random parameter detector 233, and a time/date detector 234.

Figure 4D:
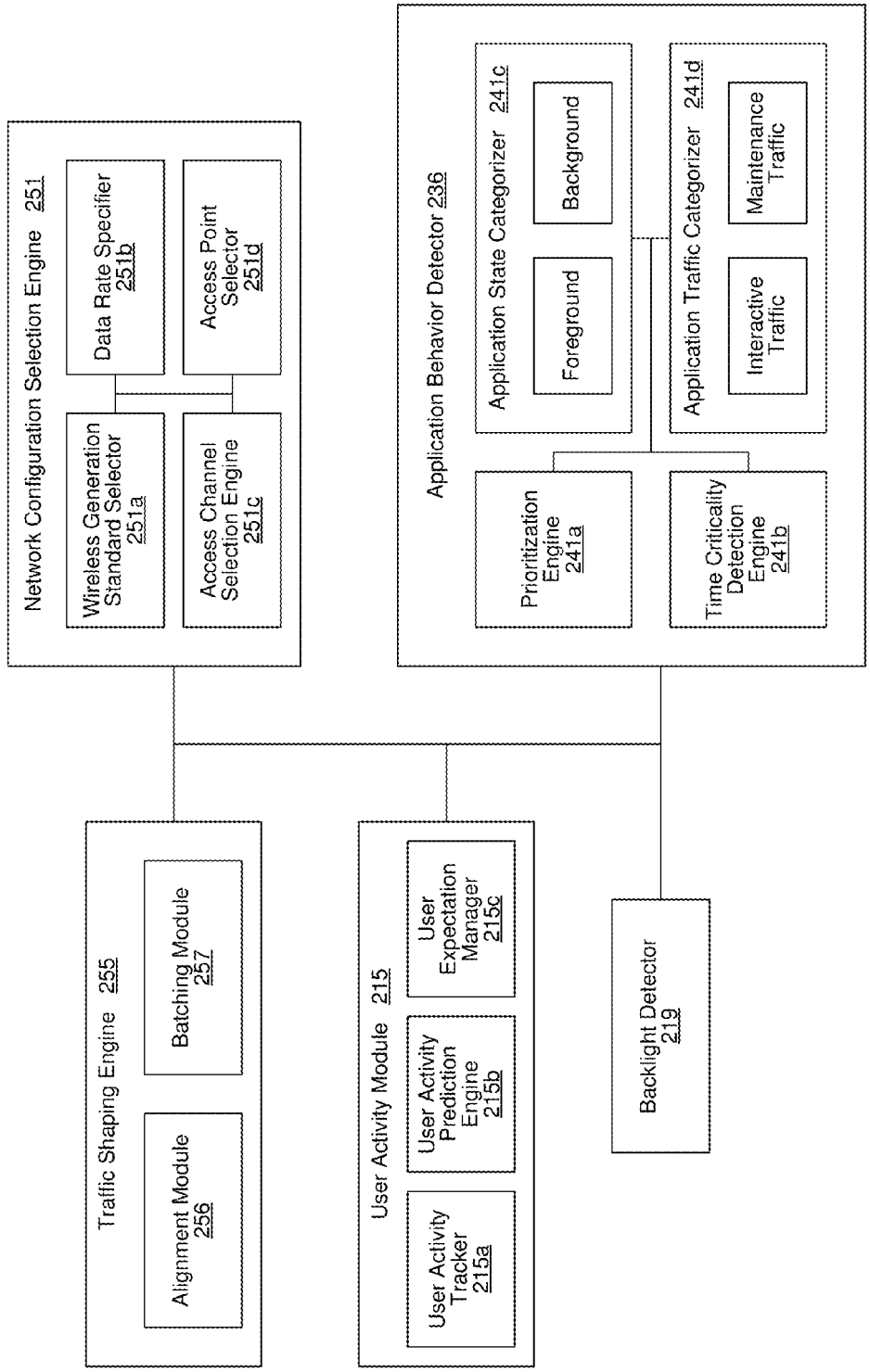
FIG. 4D depicts a block diagram illustrating examples of additional components in the local cache shown in the example of FIG. 4A which is further capable of performing mobile traffic categorization and policy implementation based on application behavior and/or user activity.

FIG. 4D depicts a block diagram illustrating examples of additional components within mobile device 250 shown in the example of FIG. 4A, which is further capable of performing mobile traffic categorization and policy implementation based on application behavior and/or user activity. In the embodiment illustrated in FIG. 4D, mobile device 250 also includes a backlight detector 219, which is used to determine whether the user of the mobile device is actively accessing the mobile device, and a network configuration selection engine 251.

In the embodiment illustrated in FIG. 4D, network configuration engine 251 includes a wireless generation standard selector 251A, a data rate specifier 251B, an access channel selection engine 251C, and an access point selector 251D.

In the embodiment illustrated in FIG. 4D, user activity module 215 includes a user activity tracker 215A, a user activity prediction engine 215B, and a user expectation manager 215C. In the embodiment illustrated in FIG. 4D, application behavior detector 236 includes a prioritization engine 241A, a time criticality detection engine 241B, an application state categorizer 241C, and an application traffic categorizer 241D. In one embodiment, application state categorizer 241C includes modules for detecting the state of both foreground and background applications. In one embodiment, application traffic categorizer 241D includes modules for categorizing both interactive traffic and maintenance traffic.

Figure 5A:
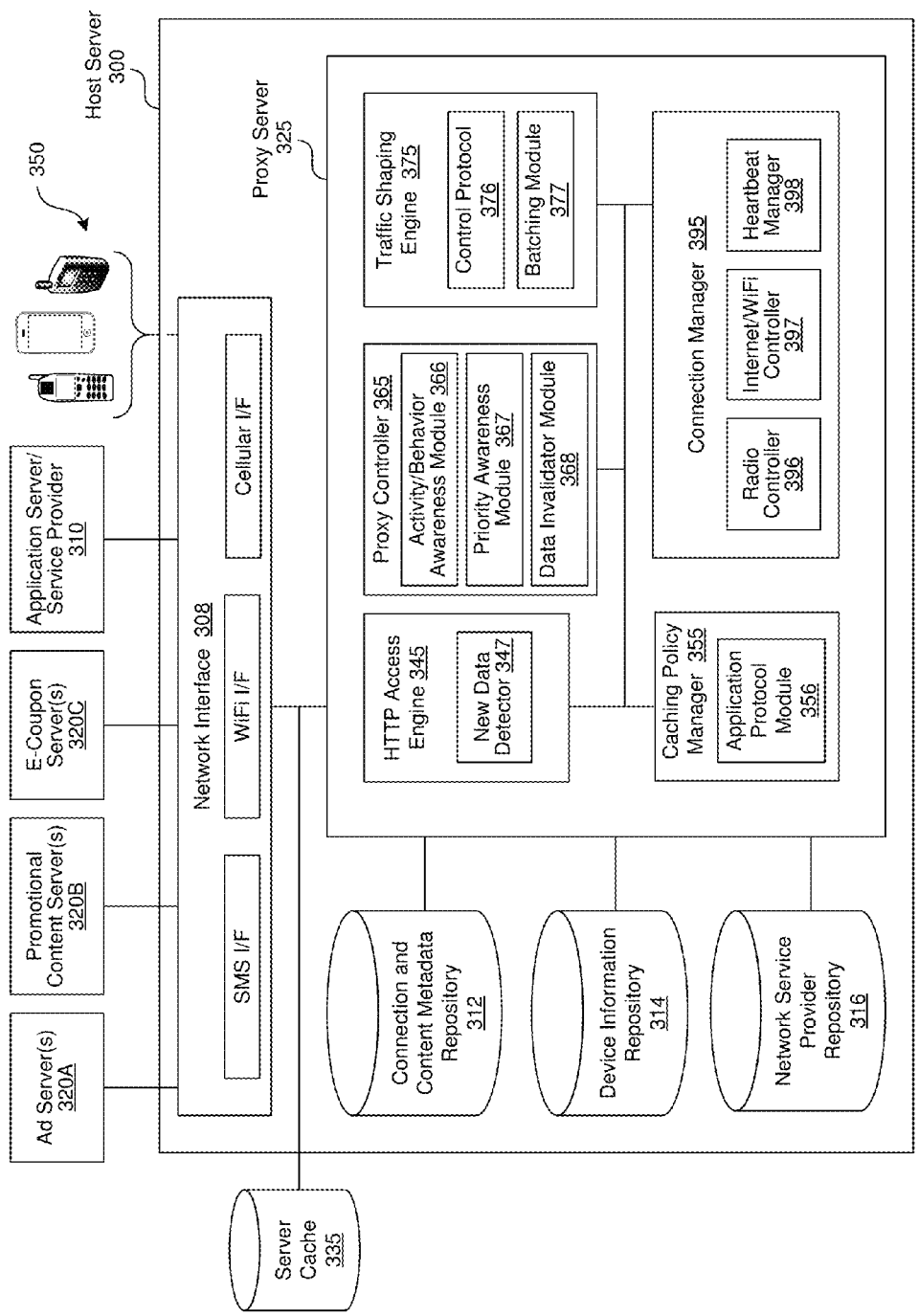
FIG. 5A depicts a block diagram illustrating an example of server-side components in a distributed proxy and cache system that manages traffic in a wireless network (or broadband network) for resource conservation, content caching, and/or traffic management according to an embodiment of the subject matter described herein.

FIGS. 5A through 5D illustrate in detail a portion of an exemplary system for implementing blocking/unblocking algorithms for signaling optimization in a wireless network for traffic utilizing proprietary and non-proprietary protocols according to another embodiment of the subject matter described herein. FIG. 5A depicts a block diagram illustrating an example of server-side components in a distributed proxy and cache system that manages traffic in a wireless network (or broadband network) for resource conservation, content caching, and/or traffic management. The server-side proxy (or proxy server) can further categorize mobile traffic and/or implement delivery policies based on application behavior, content priority, user activity, and/or user expectations. The host server 300 depicted in FIG. 5A is essentially the same as the like-numbered element illustrated in FIG. 3A, but without the adaptation engine 501 and application tracking engine 511 shown in FIG. 3A.

Figure 5B:
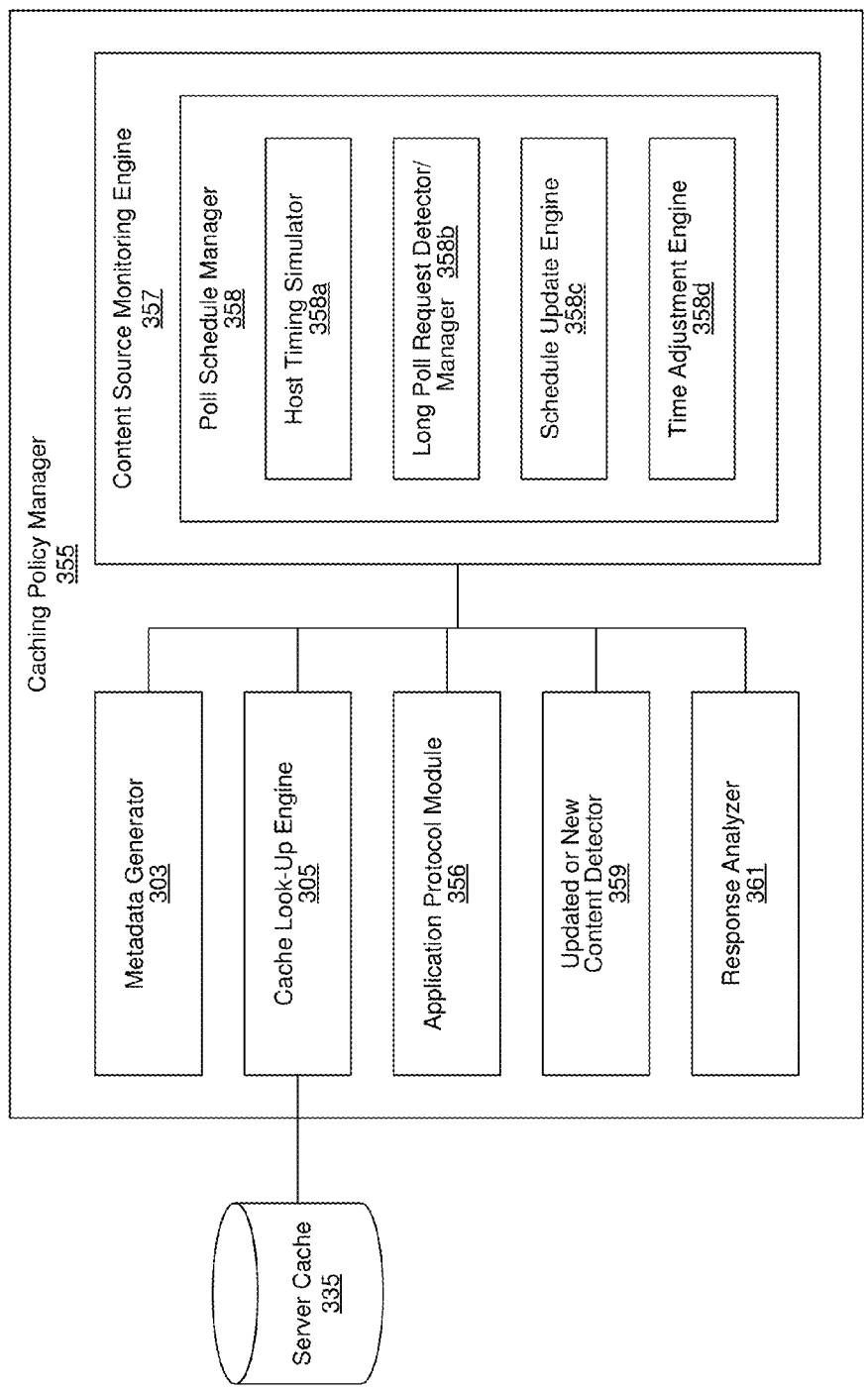
FIG. 5B depicts a block diagram illustrating a further example of components in the caching policy manager in the cache system shown in the example of FIG. 5A which is capable of caching and adapting caching strategies for mobile application behavior and/or network conditions according to an embodiment of the subject matter described herein, including components capable of detecting long poll requests and managing caching of long polls.

FIG. 5B depicts a block diagram illustrating a further example of components in the caching policy manager in the cache system shown in the example of FIG. 5A which is capable of caching and adapting caching strategies for mobile application behavior and/or network conditions. Components capable of detecting long poll requests and managing caching of long polls are also illustrated. In the embodiment illustrated in FIG. 5B, caching policy manager 355 includes a metadata generator 303, a cache look-up engine 305, an application protocol module 356, an updated or new content detector 359, a response analyzer 361, and a content source monitoring engine 357. In the embodiment illustrated in FIG. 5B, content source monitoring engine 357 includes a poll schedule manager 358 that includes a host timing simulator 358A, a long poll request detector/manager 358B, a schedule update engine 358C, and a time adjustment engine 358D.

Figure 5C:
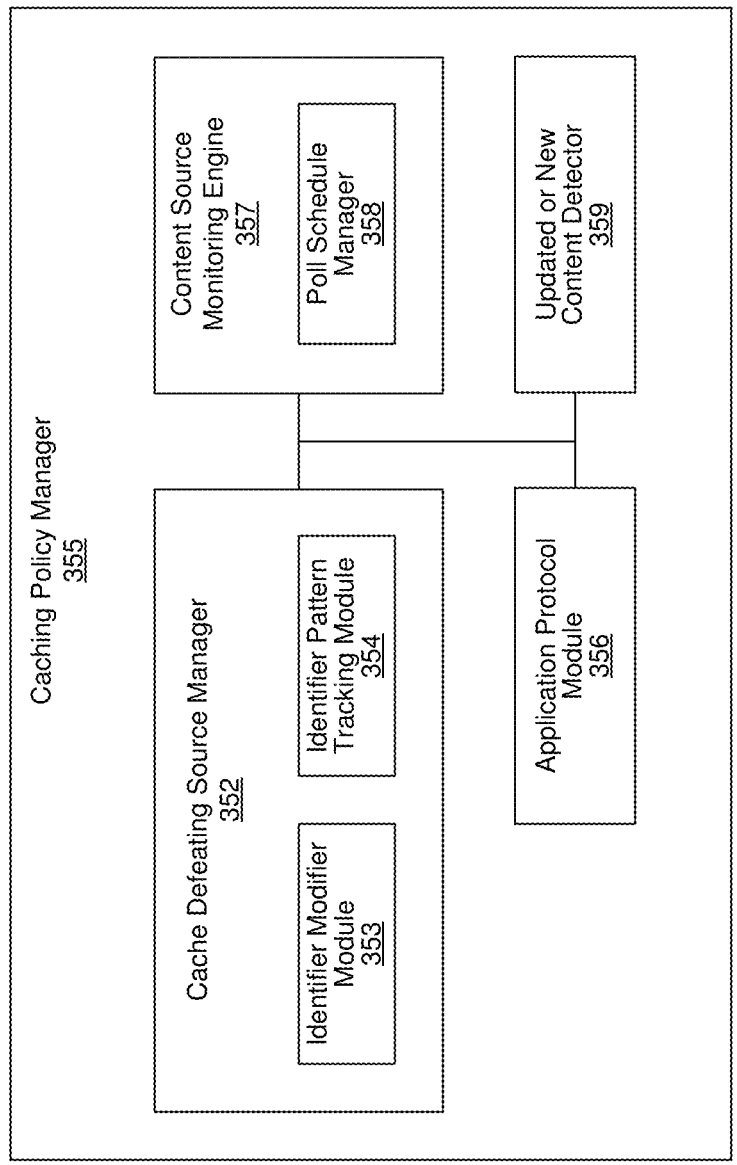
FIG. 5C depicts a block diagram illustrating another example of components in the proxy system shown in the example of FIG. 5A which is further capable of managing and detecting cache defeating mechanisms and monitoring content sources according to an embodiment of the subject matter described herein.

FIG. 5C depicts a block diagram illustrating another example of components in the proxy system shown in the example of FIG. 5A which is further capable of managing and detecting cache defeating mechanisms and monitoring content sources. In the embodiment illustrated in FIG. 5C, caching policy manager 355 additionally includes a cache defeating source manager 352 that includes an identifier modifier module 353 and an identifier pattern tracking module 354.

Figure 5D:
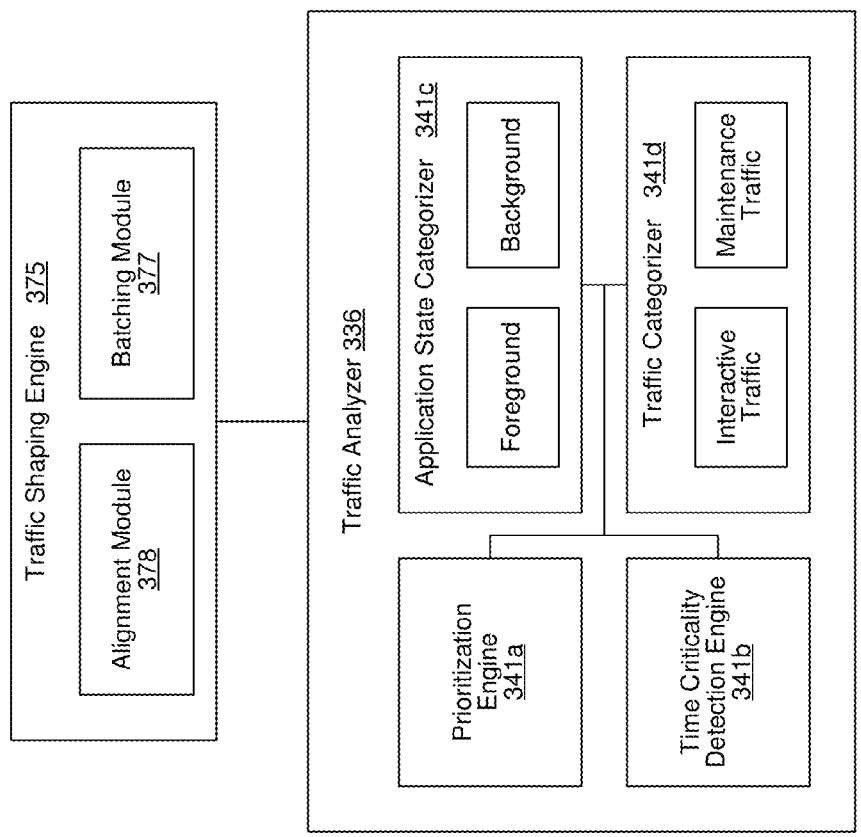
FIG. 5D depicts a block diagram illustrating examples of additional components in proxy server shown in the example of FIG. 5A which is further capable of performing mobile traffic categorization and policy implementation based on application behavior and/or traffic priority according to an embodiment of the subject matter described herein.

FIG. 5D depicts a block diagram illustrating examples of additional components in proxy server 325 shown in the example of FIG. 5A which is further capable of performing mobile traffic categorization and policy implementation based on application behavior and/or traffic priority. In the embodiment illustrated in FIG. 5D, traffic shaping engine 375 additionally includes an alignment module 378. In the embodiment illustrated in FIG. 5D, proxy server 325 includes a traffic analyzer 336 that includes a prioritization engine 341A, a time criticality detection engine 341B, an application state categorizer 341C, and a traffic categorizer 341D. In one embodiment, application state categorizer 341C includes modules for detecting the state of both foreground and background applications. In one embodiment, application traffic categorizer 341D includes modules for categorizing both interactive traffic and maintenance traffic.

Figure 6:
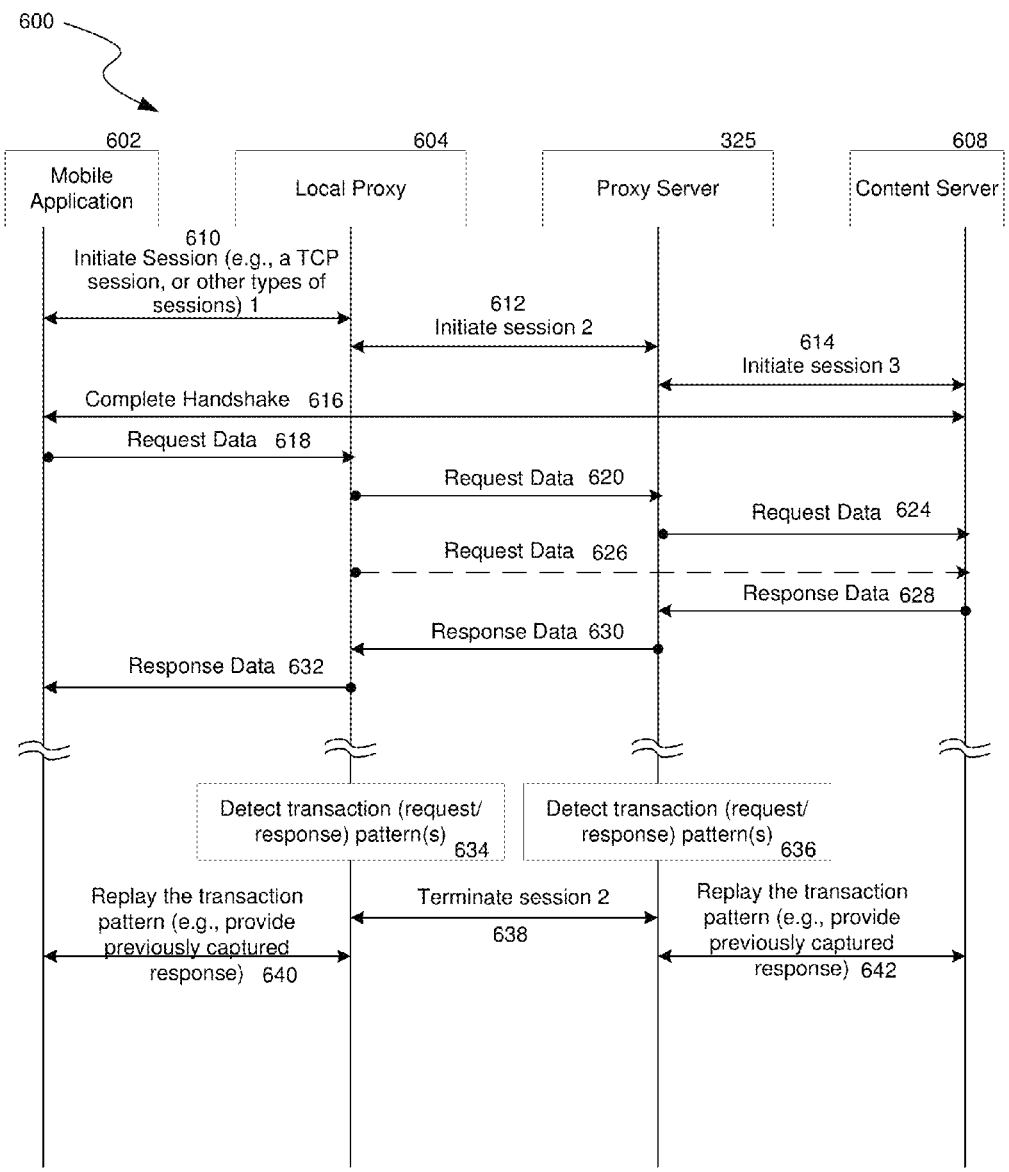
FIG. 6 depicts a flow diagram illustrating an example data flow between a mobile application, a content server, a local proxy and a proxy server for optimizing signaling in a wireless network for traffic utilizing proprietary (non-standard) and non-proprietary (standard) protocols according to an embodiment of the subject matter described herein.

FIG. 6 depicts a flow diagram illustrating an example data flow between a mobile application, a content server, a local proxy and a proxy server for optimizing signaling in a wireless network for traffic utilizing proprietary (non-standard) and non-proprietary (standard) protocols according to an embodiment of the subject matter described herein. In the embodiment illustrated in FIG. 6, system 600 includes a mobile application 602, a local proxy 604, a proxy server 325, and a content server 608. The process begins with establishment of a first session 610 between mobile application 610 and local proxy 604. Local proxy 604 then establishes a second session 612 with proxy server 325. Proxy server 325 establishes a third session 614 with content server 608. Mobile application 602 then communicates with content server 608 via the established sessions 610, 612, and 614, starting with completion of a handshake 616.

When mobile application 602 needs data from content server 608, it sends a data request 618 to local proxy 604, which forwards the request or generates a new request 620 to proxy server 325, which forwards that request or generates its own new request 624 to content server 608. Alternatively, local proxy 604 can send a request 626 directly to content server 608, bypassing proxy server 325. Content server 608 sends a response 628, which passes back to mobile application 602 as messages 628, 630, and 632.

After one or more transactions have occurred, local proxy 604 may detect a transaction (request/response) pattern (block 634). In the embodiment illustrated in FIG. 4A, for example, these transaction patterns may be detected by pattern detector module 237 within request/transaction manager 235, or by another component within local proxy 604. Likewise, proxy server 325 may detect a transaction pattern (block 366.) In the embodiment illustrated in FIG. 5A, for example, these patterns may be detected by activity/behavior awareness module 366 within proxy controller 365 or by another component with proxy server 325.

In response to detecting these transaction patterns, the second session is terminated 638. From this point on, local proxy 604 continues to replay the transaction response (e.g., provide the previously captured response) 604 to mobile application 602, and proxy server 325 continues to replay the transaction pattern (e.g. provide the previously captured request) 642 to content server 608. In this manner, the interactions across the first session between mobile application 602 and local proxy 604 will be replicated, as will the interactions across the third session between proxy server 325 and content server 308, without the need for the second session between local proxy 604 and proxy server 325.

Figure 7:
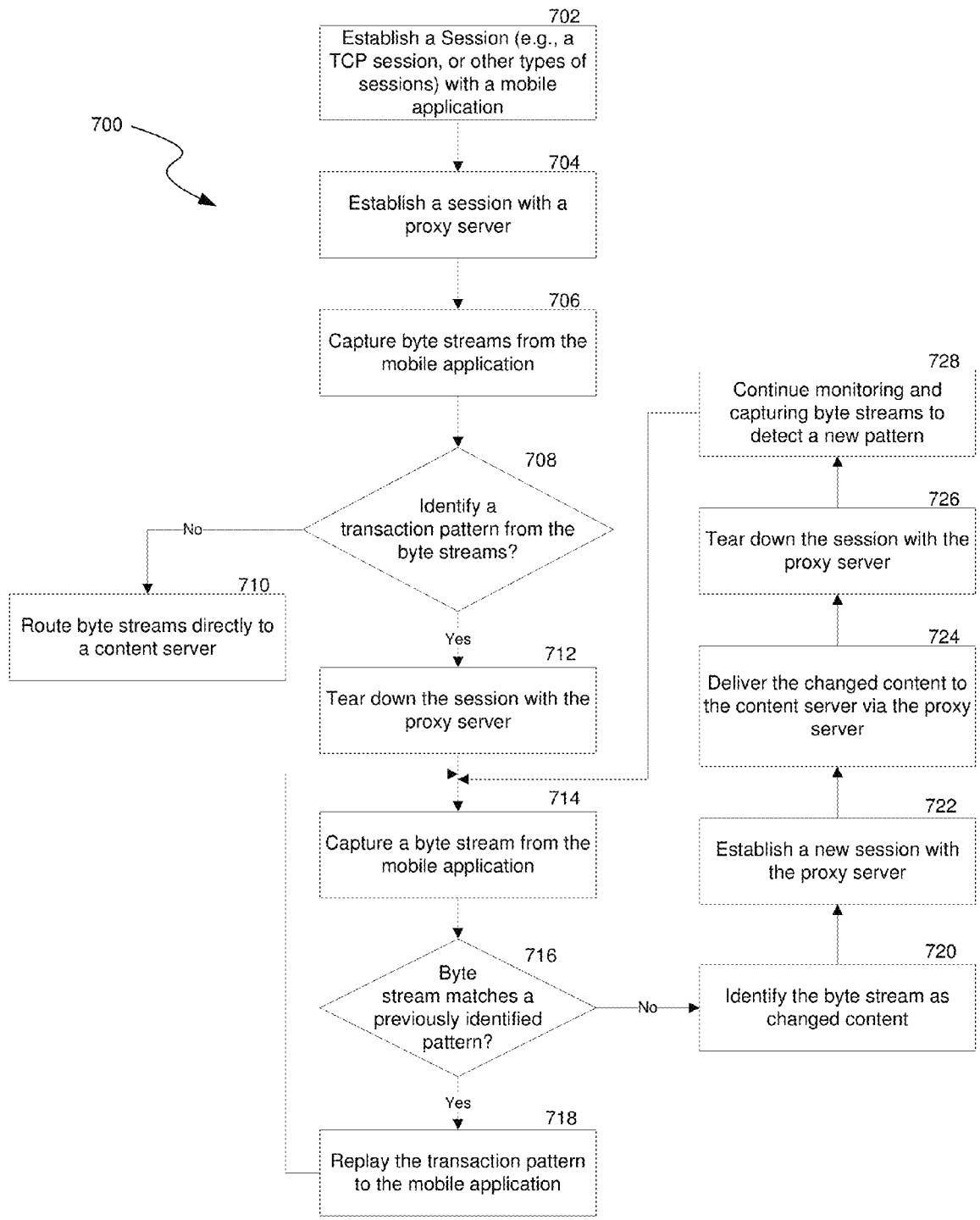
FIG. 7 depicts a logic flow diagram illustrating an example method implemented on a mobile device for optimizing signaling in a wireless network for traffic utilizing proprietary (non-standard) and non-proprietary (standard) protocols according to a first embodiment.

FIG. 7 depicts a logic flow diagram illustrating an example method implemented on a mobile device for optimizing signaling in a wireless network for traffic utilizing proprietary (non-standard) and non-proprietary (standard) protocols according to a first embodiment. In the embodiment illustrated in FIG. 7, the process 700 starts at step 702 with the establishment of a session with a mobile application. At step 704, a session with a proxy server is established, and at step 706, byte streams from the mobile application are captured. At step 708, the method includes attempting to identify a transaction pattern from the byte streams. If a pattern is not detected, the process goes to step 710, in which byte streams are routed directly to a content server, and the process ends. If, at step 708, a pattern is detected, the process goes to step 712, in which the session with the proxy server is torn down. At step 714, a byte stream from the mobile application is captured. At step 716, the byte stream is checked to see if it matches a previously identified pattern. If so, at step 718 the transaction pattern to the mobile application is replayed, and the process returns to step 714, where it waits for another byte stream from the mobile application. If, at step 716, the byte stream is not a previously identified pattern, the byte stream is identified as changed content (step 720), a new session is established with the proxy server (step 722), the changed content is delivered to the content server via the proxy server (step 724), the session with the proxy server is torn down again (step 726), and monitoring and capturing of byte streams to detect a new pattern continues (step 728.)

Figure 8:
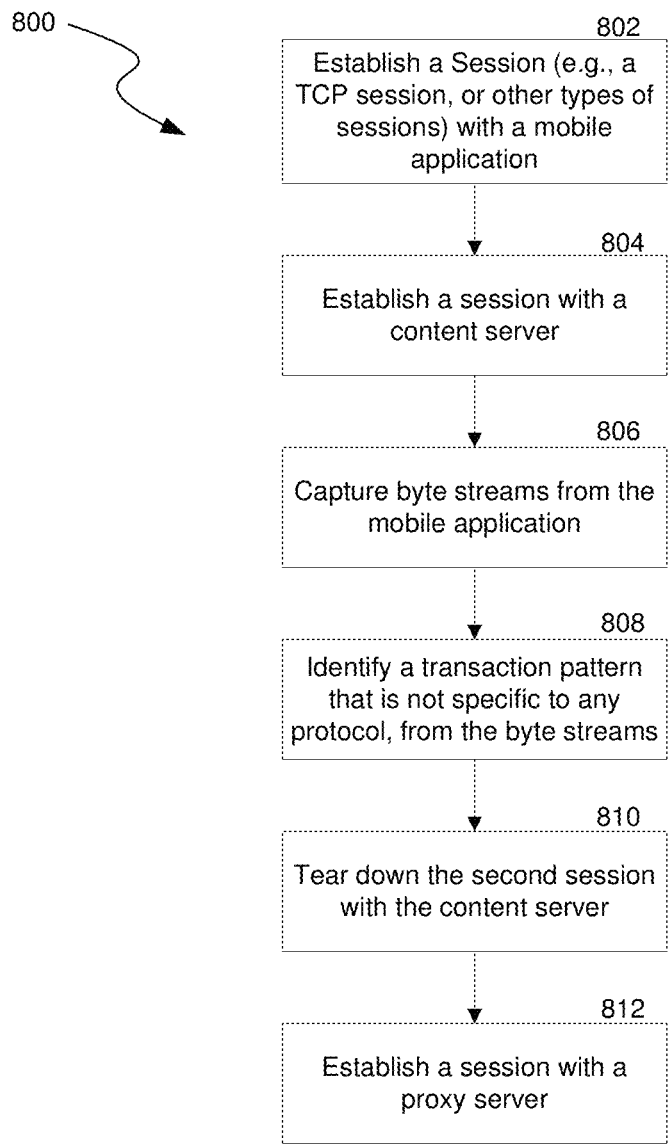
FIG. 8 depicts a logic flow diagram illustrating an example method implemented on a mobile device for optimizing signaling in a wireless network for traffic utilizing proprietary (non-standard) and non-proprietary (standard) protocols according to a second embodiment.

FIG. 8 depicts a logic flow diagram illustrating an example method implemented on a mobile device for optimizing signaling in a wireless network for traffic utilizing proprietary (non-standard) and non-proprietary (standard) protocols according to a second embodiment. In the embodiment illustrated in FIG. 8, process 800 includes establishing a first session with a mobile application (step 802), establishing a second session with a content server (step 804), and capturing byte streams from the mobile application (step 806.) At step 808, a transaction pattern that is not specific to any protocol is identified from the byte streams. At step 810, the second session with the content server is torn down, and at step 812 a session is established with a proxy server.

Figure 9:
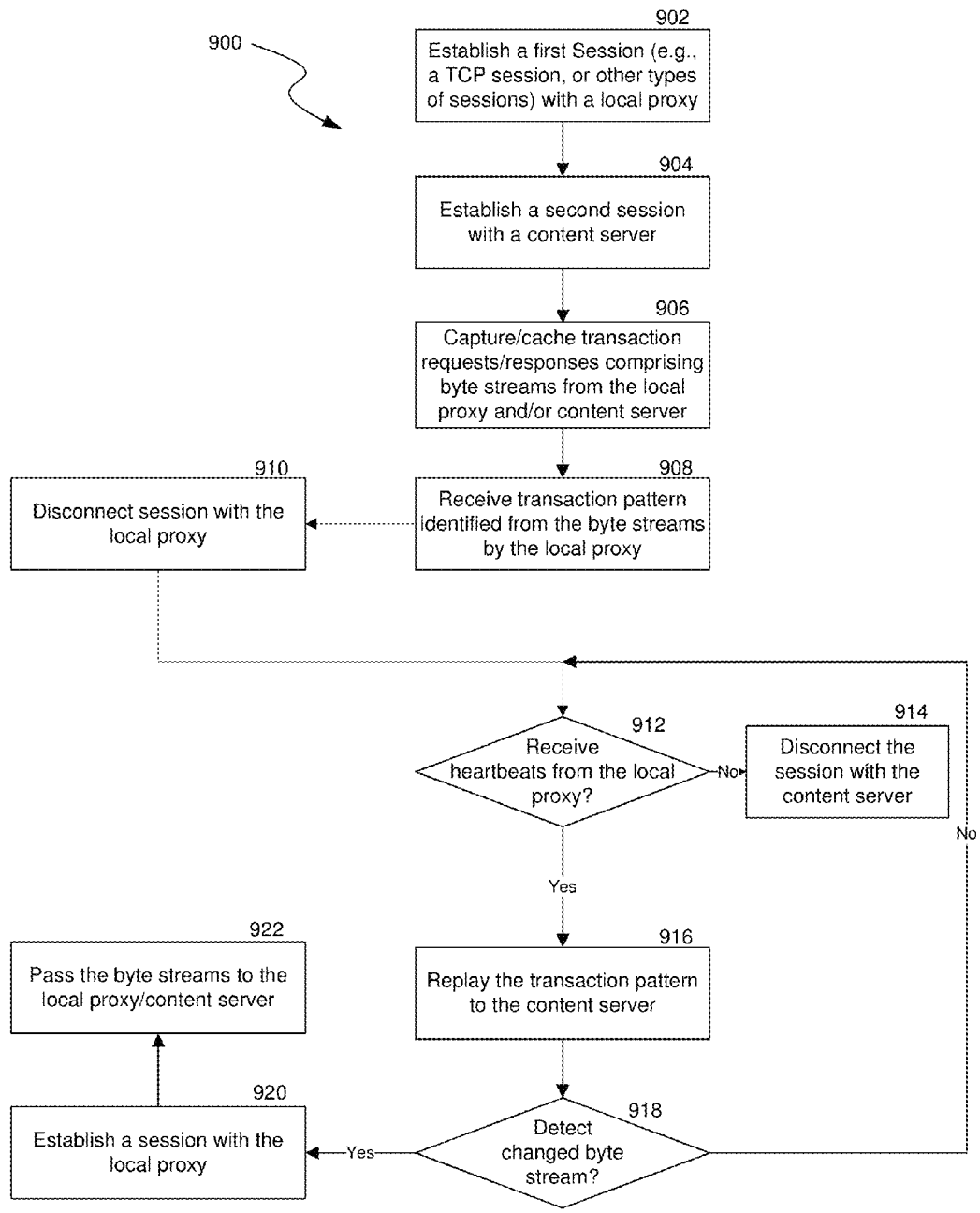
FIG. 9 depicts a logic flow diagram illustrating an example method implemented on a proxy server for optimizing signaling in a wireless network for traffic utilizing proprietary (non-standard) and non-proprietary (standard) protocols according to an embodiment of the subject matter described herein.

FIG. 9 depicts a logic flow diagram illustrating an example method implemented on a proxy server for optimizing signaling in a wireless network for traffic utilizing proprietary (non-standard) and non-proprietary (standard) protocols according to an embodiment of the subject matter described herein. In the embodiment illustrated in FIG. 9, process 900 includes establishing a first session with a local proxy (step 902), establishing a second session with a content server (step 904), and capturing/caching transaction requests/responses comprising byte streams from the local proxy and/or content server (step 906.) Step 908 includes receiving a transaction pattern that was identified from the byte streams by the local proxy. In response, the session with the local proxy is disconnected (step 910), and the process moves to step 912.

At step 912, if heartbeats are received from the local proxy, the process moves to step 914, in which the session with the content server is disconnected and the process ends. If, at step 912, heartbeats are received from the local proxy, the transaction pattern is replayed to the content server (step 916) and the process moves to step 918.

At step 918, if a changed byte stream is detected, the session with the local proxy is established (step 920), and the byte streams are passed to the local proxy/content server (step 922). In one embodiment, the process returns to step 906 and continues from there. If, at step 918, a changed byte stream is not detected, the process returns to step 912 and continues from there.

Figure 10A:
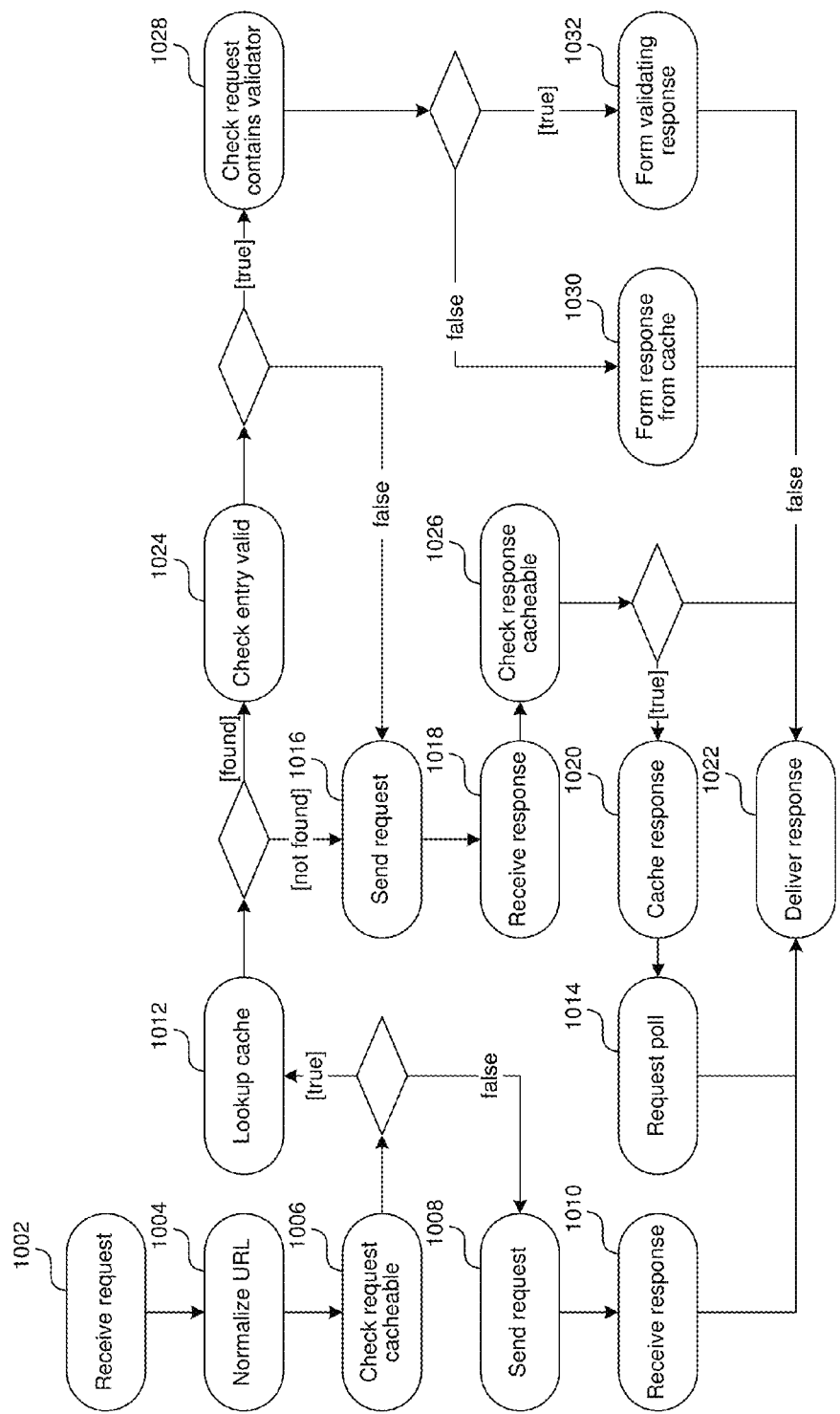
FIG. 10A depicts a flow diagram illustrating an example process for distributed content caching between a mobile device (e.g., any wireless device) and remote proxy and the distributed management of content caching according to an embodiment of the subject matter described herein.

FIG. 10A depicts a flow diagram illustrating an example process for distributed content caching between a mobile device (e.g., any wireless device) and remote proxy and the distributed management of content caching according to an embodiment of the subject matter described herein. In the embodiment illustrated in FIG. 10A, the process starts when a request is received (step 1002). The URL is normalized (step 1004), and the request is checked to determine whether it is cacheable (step 1006.) If, at step 1006, the request is not cacheable, the request is sent (step 1008), a response to the request is received (step 1010), and the response is delivered (step 1022.) If, at step 1006, the request is determined to be cacheable, a cache lookup is performed to see if the request has been cached (step 1012).

If, at step 1012, the request is not found in the cache, the request is sent (step 1016.) When a response to the request is received (step 1018), the response is checked to determine whether it is cacheable (step 1026.) If, at step 1026, the response is not cacheable, the response is delivered (step 1022.) If the response is cacheable, the response is cached (step 1020), the request is polled (step 1014), and the response is delivered (step 1022.)

If, at step 1012, the request is found in the cache, the cache entry is checked for validity (step 1024.) If, at step 1024, the request is determined to be invalid, the process goes to step 1016 and continues from there. If, at step 1024, the request is determined to be valid, the process checks that the request contains a validator (step 1028.) If, at step 1028, the request contains a validator, then a validating response is formed (step 1032) and delivered (step 1022). If, at step 1028, the request does not contain a validator, a response is formed from the cache (step 1030) and delivered (step 1022.)

Figure 10B:
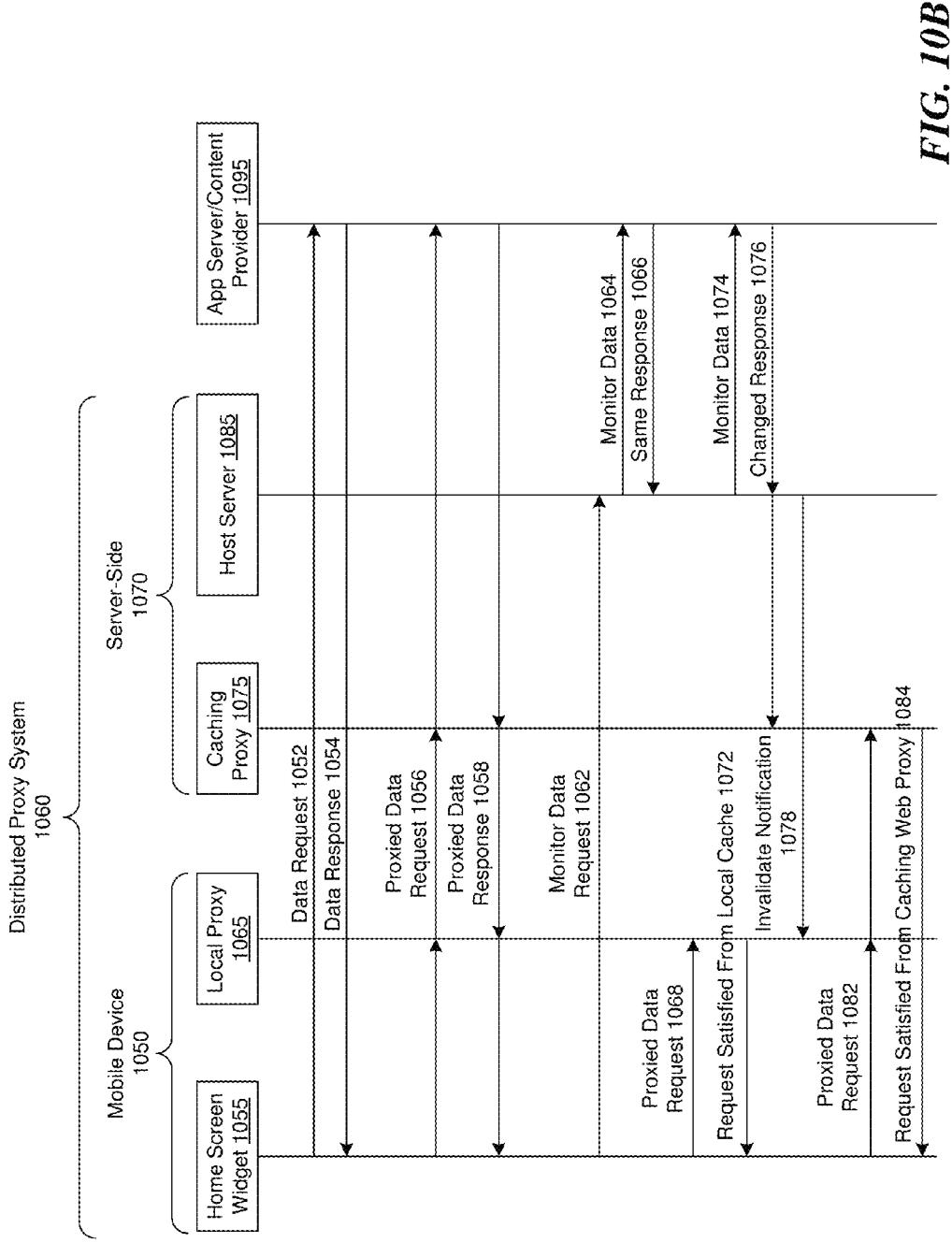
FIG. 10B depicts a timing diagram showing how data requests from a mobile device (e.g., any wireless device) to an application server/content provider in a wireless network (or broadband network) can be coordinated by a distributed proxy system in a manner such that network and battery resources are conserved through using content caching and monitoring performed by the distributed proxy system according to an embodiment of the subject matter described herein.

FIG. 10B depicts a timing diagram showing how data requests from a mobile device (e.g., any wireless device) to an application server/content provider in a wireless network (or broadband network) can be coordinated by a distributed proxy system in a manner such that network and battery resources are conserved through using content caching and monitoring performed by the distributed proxy system. In the embodiment illustrated in FIG. 10B, a distributed proxy system 1060 includes a mobile device 1050, a server-side component 1070, and an application server/content provider (AS/CP) 1095. In the embodiment illustrated in FIG. 10B, mobile device 1050 includes a home screen widget 1055 and a local proxy 1065, and server-side components 1070 include a caching proxy 1075 and a host server 1085.

In the embodiment illustrated in FIG. 10B, home screen widget 1055 issues a data request 1052 to AS/CP 1095, and AS/CP 1095 sends a data response 1054 to home screen widget 1055. In one embodiment, both the data request and the data response travel through at least one of the local proxy 1065, caching proxy 1075, and host server 1085. Local proxy 1065 may then issue a proxied data request 1056 to caching proxy 1075, which may respond with a proxied data response 1058.

In the embodiment illustrated in FIG. 10B, home screen widget 1055 may then issue a monitor data request 1062, which is received by host server 1085 and forwarded or reissued as monitor data request 1064 to AS/CP 1095. AS/CP 1095 may then issue the same response 1066. If home screen widget 1055 issues a proxied data request 1068, local proxy 1065 may satisfy that request by issuing a response from local cache 1072 and thus avoid traffic between mobile device 1050 and server-side components 1070. Meanwhile, host server 1085 may continue to issue periodic monitor data requests 1074. If AS/CP 1095 issues a changed response 1076 (i.e., a response that is different from the previous response 1066), host server 1085 forwards the changed response 1076 Thus, when home screen widget issues the next proxied data request 1082, local proxy 1065 will not respond from its local cache 1072 but will instead forward the data request 1082 to caching proxy 1075, and caching proxy 1075 will satisfy that request from its cache.

FIG. 11 depicts a table showing examples of different traffic or application category types which can be used in implementing network access and content delivery policies according to an embodiment of the subject matter described herein. In the embodiment illustrated in FIG. 11, traffic category/application category table 1100 includes a number of categories, including, but not limited to, interactive traffic versus background traffic, applications where the user is waiting for a response versus not waiting for a response, applications that are in the foreground versus in the background, and device states where the backlight is on or off. As will be described in more detail below, in one embodiment, if a device backlight is off, that may be taken as a sign that the user is not actively using that device and therefore maximum signaling optimization, including blocking, may be appropriate. Likewise, if the device backlight is on, that may be an indication that the user is actively using the device and therefore signaling optimization and/or blocking may be curtailed or stopped completely.

FIG. 12 depicts a table showing examples of different content category types which can be used in implementing network access and content delivery policies according to an embodiment of the subject matter described herein. In the embodiment illustrated in FIG. 12, content category table 1200 includes a number of categories, including, but not limited to, high priority content, low priority content, time critical content, and non-time critical content. In one embodiment, some or all of these factors may be taken into account when determining whether optimization and/or blocking should or should not be enabled.

FIG. 13 depicts an interaction diagram showing how polls having data requests from a mobile device (e.g., any wireless device) to an application server/content provider over a wireless network (or broadband network) can be can be cached on the local proxy and managed by the distributed caching system according to an embodiment of the subject matter described herein. In the embodiment illustrated in FIG. 13, at step 1332, Mobile application/widget 1355 polls application server/content provider 1395. At step 1334, local proxy 1365 intercepts the poll. At step 1336, local proxy 1365 detects that cache content is available for the polled content and is valid and thus retrieves a response to satisfy the poll. At step 1338, mobile application/widget 1355 receives a response to the poll from a cache entry, provided by local proxy 1365.

At step 1340, mobile application/widget 1355 again polls application server/content provider 1395. At step 1342, local proxy 1365 intercepts the poll. At step 1344, local proxy 1365 detects that cache content is unavailable and decides to set up the polled source for caching. At step 1346, local proxy 1365 forwards the poll request to the source. At step 1348, application server/content provider 1395 receives the poll request from the mobile application/widget 1355 and provides a response to satisfy the current request. At step 1350, mobile application/widget 1355 receives the response to satisfy the request from the application server/content provider 1395.

At step 1352, local proxy 1365 tracks polling frequency of the application and sets up a polling schedule for the server-side entity. Server side entities include, but are not limited to, a host server 1385, a server cache 1335, and a caching proxy 1375. At step 1354, local proxy 1365 sends the cache setup to the server-side entity. At step 1356, the server-side entity receives the cache setup including an identification of the application server/content provider 1395 to be polled and a polling schedule. At step 1358, the server-side entity polls the application server/content provider 1395 to monitor the response to the request. At step 1360, application server/content provider 1395 receives the poll from the server-side entity and sends the response. At step 1362, the server-side entity receives the same response and then polls the application server/content provider 1395 again based on the polling schedule. At step 1364, application server/content provider 1395 receives poll from the server-side entity and sends the response. At step 1366, the server-side entity detects changed or new response and notifies the local proxy 1365 that the response has changed since the last time. At step 1368, the server-side entity stores the new or changed response in the server-side entity. At step 1370, local proxy 1365 receives notification that new or changed data is available, and in response, invalidates the relevant cache entries.

At step 1372, mobile application/widget 1355 polls application server/content provider 1395. At step 1374, local proxy 1365 determines that no valid cache entry is available and requests a response from the server-side entity. At step 1376, the server-side entity receives the request for the new response and sends the response to the local proxy 1365. At step 1378, the request is satisfied from the server-side entity, e.g., the server side entity sends the response to mobile application/widget 1355.

At step 1380, mobile application/widget 1355 polls application server/content provider 1395. At step 1382, local proxy 1365 determines that no valid cache entry is available and forwards the poll to the application server/content provider 1395. At step 1384, application server/content provider 1395 receives the poll from local proxy 1365 and sends the response. At step 1386, the request from mobile application/widget 1355 is satisfied by the application server/content provider 1395.

FIG. 14 depicts an interaction diagram showing how polls for content from an application server/content provider which employs cache-defeating mechanisms in identifiers (e.g., identifiers intended to defeat caching) over a wireless network (or broadband network) can be detected and locally cached according to an embodiment of the subject matter described herein. In the embodiment illustrated in FIG. 14, at step 1432, Mobile application/widget 1455 polls application server/content provider 1495. At step 1434, local proxy 1465 intercepts the poll and determines that a cache defeating mechanism is being employed by server/content provider 1495. At step 1436, local proxy 1465 detects that cache content is available for the polled content and decides to retrieve a response to satisfy the poll. At step 1438, mobile application/widget 1455 receives a response to the poll from a cache entry within local proxy 1465.

At step 1440, mobile application/widget 1455 polls application server/content provider 1495. At step 1442, local proxy 1465 intercepts poll and proxy determines that a cache defeating mechanism is being employed by application server/content provider 1495. At step 1444, local proxy 1465 detects that cache content is unavailable and decides to setup the polled source for caching. At step 1446, local proxy 1465 extracts a pattern of an identifier of the request and tracks polling frequency of mobile application/widget 1455 and sets up a polling schedule for the server-side entity, which may be a host server 1485, a server cache 1435, or a caching proxy 1475, for example. At step 1448, local proxy 1465 forwards the poll request to the source. At step 1450, application server/content provider 1495 receives the poll request and provides a response to satisfy the current request. At step 1452, mobile application/widget 1455 receives from the application server/content provider 1495 the response to satisfy the request.

At step 1454, local proxy 1465 caches the response and stores a normalized version of the identifier in association with the received response for future identification and retrieval. At step 1456, local proxy 1465 sends the cache setup to the server-side entity, including the identifier or a normalized version of the identifier. At step 1458, the server-side entity receives the cache setup including an identification of application server/content provider 1495 to be polled and a polling schedule. At step 1460, the server-side entity polls application server/content provider 1495 to monitor the response to the request. At step 1462, application server/content provider 1495 receives the poll from server-side entity and sends the response. At step 1464, the server-side entity receives the same response and pulls the application based on the polling schedule. At step 1466, application server/content provider 1495 receives the poll from the server-side entity and sends the response. At step 1468, the server-side entity detects new or changed response and notifies local proxy 1465. At step 1470, the server-side entity stores new or changed response in the server-side entity. At step 1472, local proxy 1465 receives notification that new or changed date is available and invalidates the relevant cache entries.

At step 1474, mobile application/widget 1455 polls application server/content provider 1495. At step 1476, local proxy 1465 determines that no valid cache entry is available and retrieves the response from the server-side entity. At step 1478, the server-side entity receives request for the new response and sends the response to the local proxy 1465. At step 1480, the request from mobile application/widget 1455 is satisfied by the server-side entity.

At step 1482, mobile application/widget 1455 polls application server/content provider 1495. At step 1484, local proxy 1465 determines that no valid cache entry is available and forwards the poll to application server/content provider 1495. At step 1486, application server/content provider 1495 receives the poll from local proxy 1465 and sends the response. At step 1488, the request from mobile application/widget 1455 is satisfied by the application server/content provider 1495.

Figure 15:
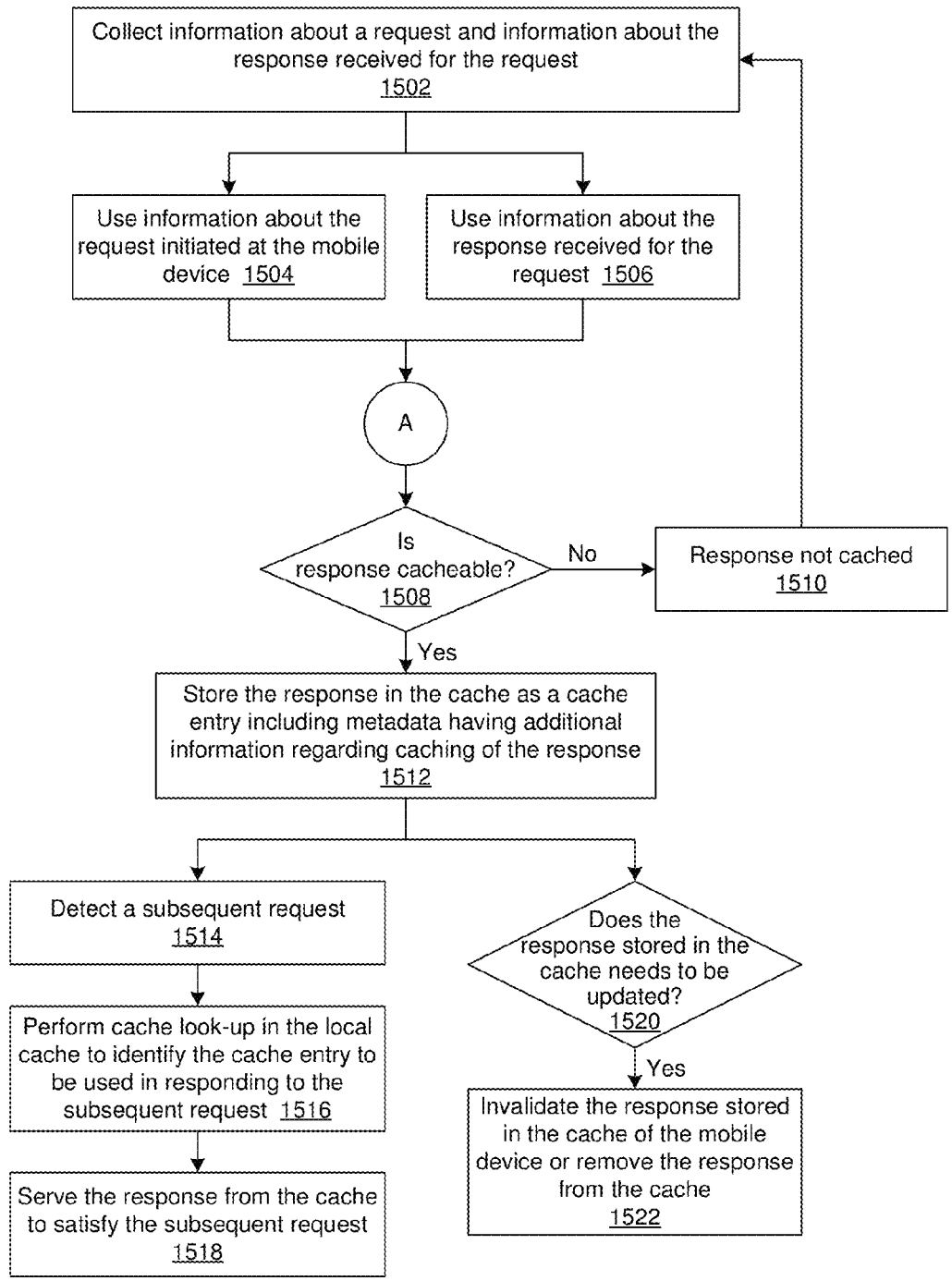
FIG. 15 depicts a flow chart illustrating an example process for collecting information about a request and the associated response to identify cacheability and caching the response according to an embodiment of the subject matter described herein.

FIG. 15 depicts a flow chart illustrating an example process for collecting information about a request and the associated response to identify cacheability and caching the response according to an embodiment of the subject matter described herein. In the embodiment illustrated in FIG. 15, a process for determining whether a response is cacheable includes collecting information about a request and information about the response received for the request (step 1502) and then using the information about either the request initiated (step 1504) or the response received (step 1506) to determine whether or not the request is cacheable (sub-process "A", described in more detail in FIG. 16, below.) At step 1508, it is determined whether the request is cacheable. If not, the response is not cached (step 1510), and the process returns to step 1502. If the request is cacheable, the response is stored in the cache as a cache entry, including metadata having additional information regarding caching of the response (step 1512.)

Once the response has been cached, at least two events can occur. The first event is the detection of a subsequent request (step 1514.) When this happens, a cache look-up is performed in the local cache to identify the cache entry to be used when responding to the subsequent request (step 1516), and the response is served from the cache to satisfy the subsequent request (step 1518.) The second event is an invalidation event, in which case it is determined whether the response currently stored in the cache needs to be updated (step 1520.) If so, the response stored in the cache of the mobile device is invalidated and/or removed from the cache (step 1522.)

Figure 16:
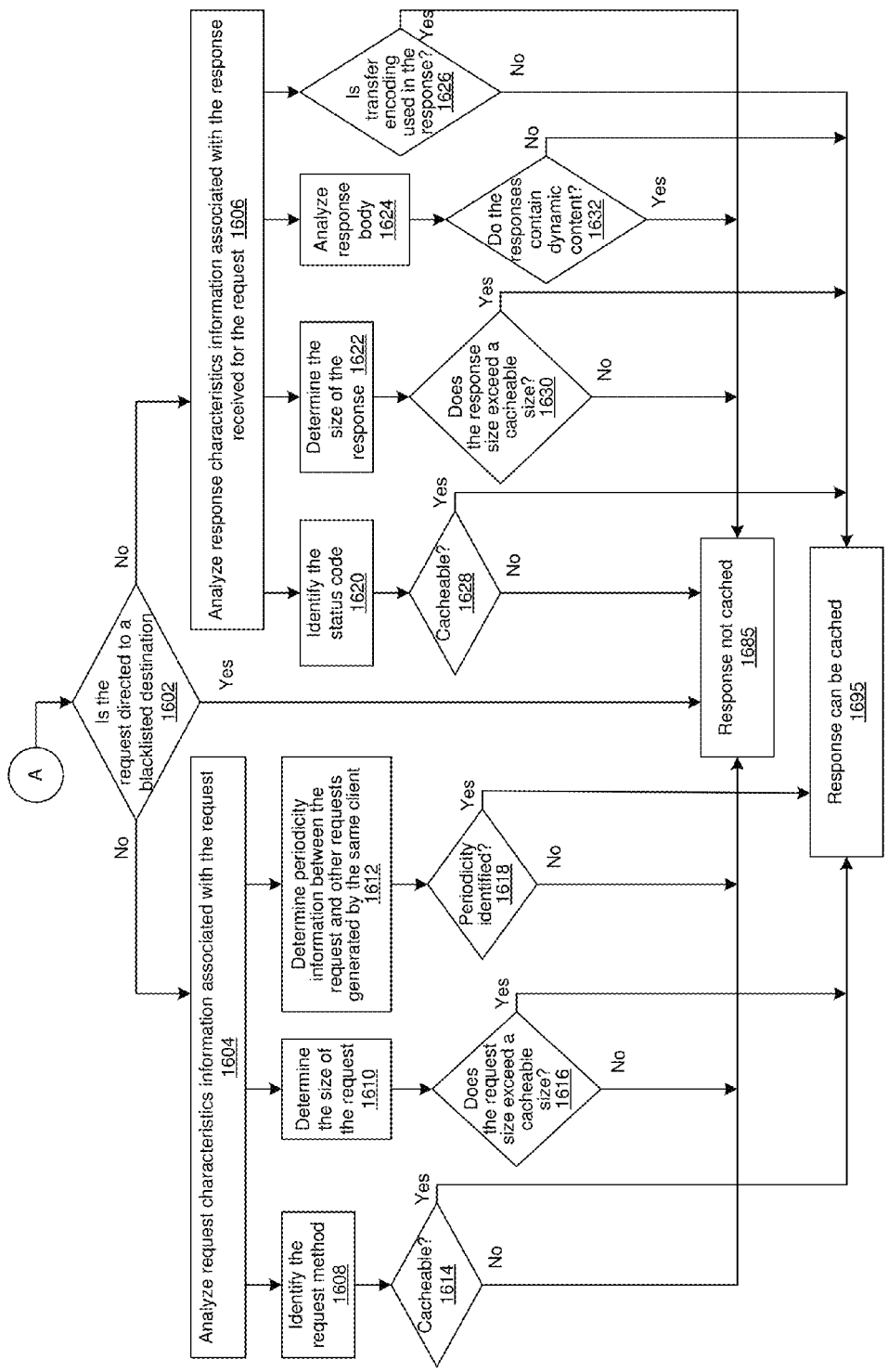
FIG. 16 depicts a flow chart illustrating an example process showing decision flows to determine whether a response to a request can be cached according to an embodiment of the subject matter described herein.

FIG. 16 depicts a flow chart illustrating an example process showing decision flows to determine whether a response to a request can be cached according to an embodiment of the subject matter described herein. The flow chart in FIG. 16 illustrates in more detail the sub-process "A" referred to in FIG. 15. In the embodiment illustrated in FIG. 16, sub-process "A" starts with a determination whether the request is directed to a black-listed destination (step 1602.) If yes, the response is not cached (step 1685.) If the request is not directed to a black-listed destination, then the process can include analyzing the request characteristics information associated with the request (step 1604), analyzing the response characteristics information associated with the response received for the request (step 1606), or both.

In the embodiment illustrated in FIG. 16, request analysis 1604 can include a number of tests. For example, the request method may be identified (step 1608) and the request may be deemed cacheable or not cacheable based on the method (step 1614.) The size of the request may be checked (step 1610) and a request may be cached if the request doesn't exceed a threshold size (step 1616.) In one embodiment, the periodicity of information between the request and other requests generated by the same client may be determined (step 1612), and requests that are identified as periodic are cached while non-periodic requests are not cached (step 1618.) In one embodiment, requests that satisfy a caching requirement may be cached (step 1695) while those that do not satisfy any caching requirements are not cached (step 1685.) In an alternative embodiment, requests that fail any caching requirement are not cached, i.e., they must meet all caching requirements before they are cached.

In the embodiment illustrated in FIG. 16, response analysis 1606 can also include a number of tests to determine cacheability. For example, a response may be identified as cacheable or not cacheable based on its status code (steps 1620 and 1628), based on the size of the response (steps 1622 and 1630), based on whether the response body includes dynamic content (steps 1624 and 1632), and/or whether or not transfer encoding is used in the response (step 1626.)

Figure 17:
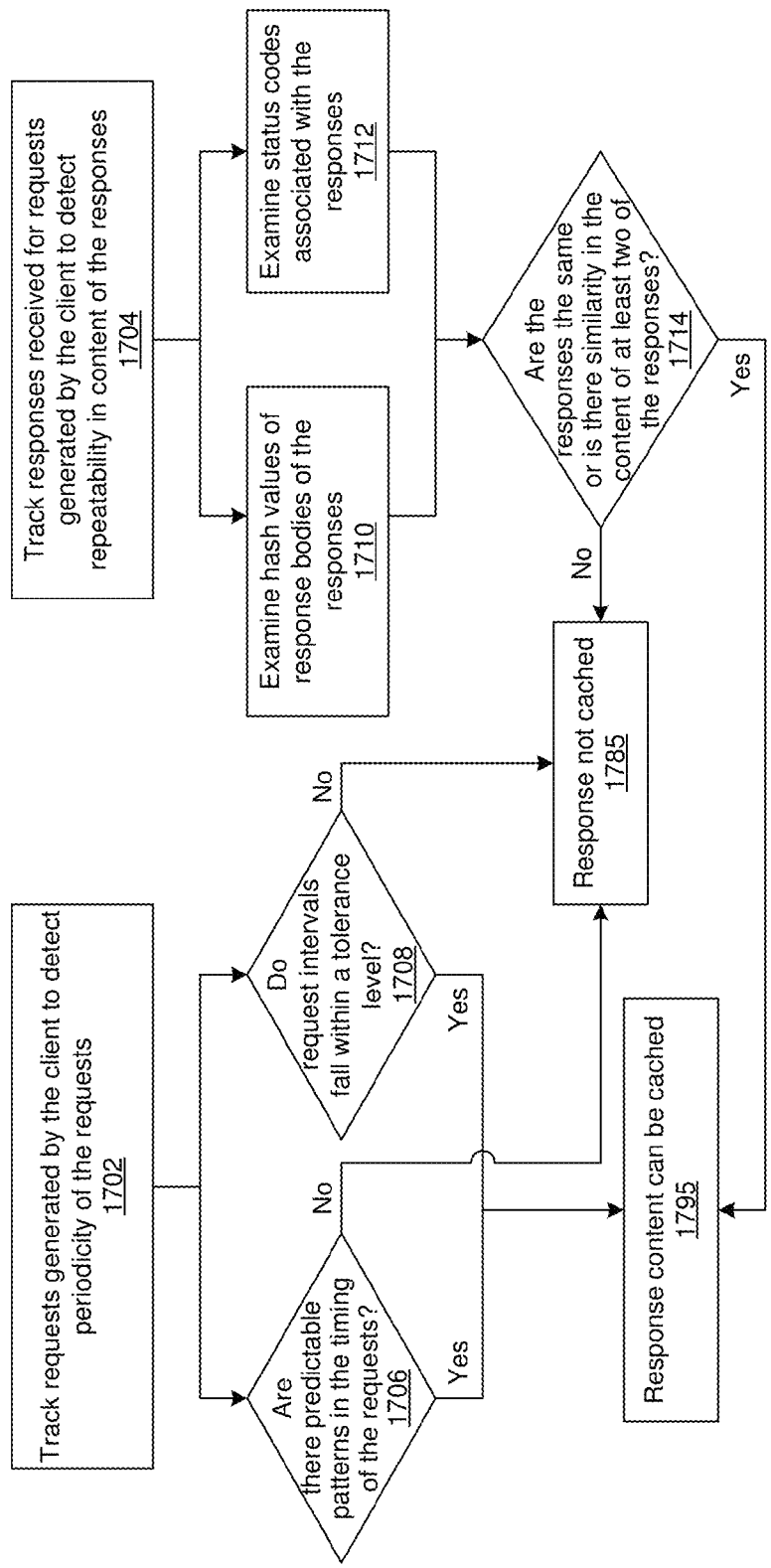
FIG. 17 depicts a flow chart illustrating an example process for determining potential for cacheability based on request periodicity and/or response repeatability according to an embodiment of the subject matter described herein.

FIG. 17 depicts a flow chart illustrating an example process for determining potential for cacheability based on request periodicity and/or response repeatability according to an embodiment of the subject matter described herein. In the embodiment illustrated in FIG. 17, the process for determining potential cacheability includes both tracking requests generated by the client to detect periodicity of the requests (step 1702) and tracking responses received for requests generated by the client to detect repeatability in content of the responses (step 1704.)

In the embodiment illustrated in FIG. 17, request tracking 1702 may include determining if there are predictable patterns in the timing of the request (step 1706) and/or determining whether request intervals fall within a tolerance level (step 1708.) If either test returns "true", the response content can be cached (step 1795); otherwise, the response is not cached (step 1785.)

In the embodiment illustrated in FIG. 17, response tracking 1704 may include examining hash values generated from the response bodies of the responses (step 1710) and/or examining status codes associated with the responses (step 1712.) If either test indicates that the responses are the same or that there is a similarity in the content of at least two of the responses (step 1714), the response content can be cached (step 1795); otherwise, the response is not cached (step 1785.)

Figure 18:
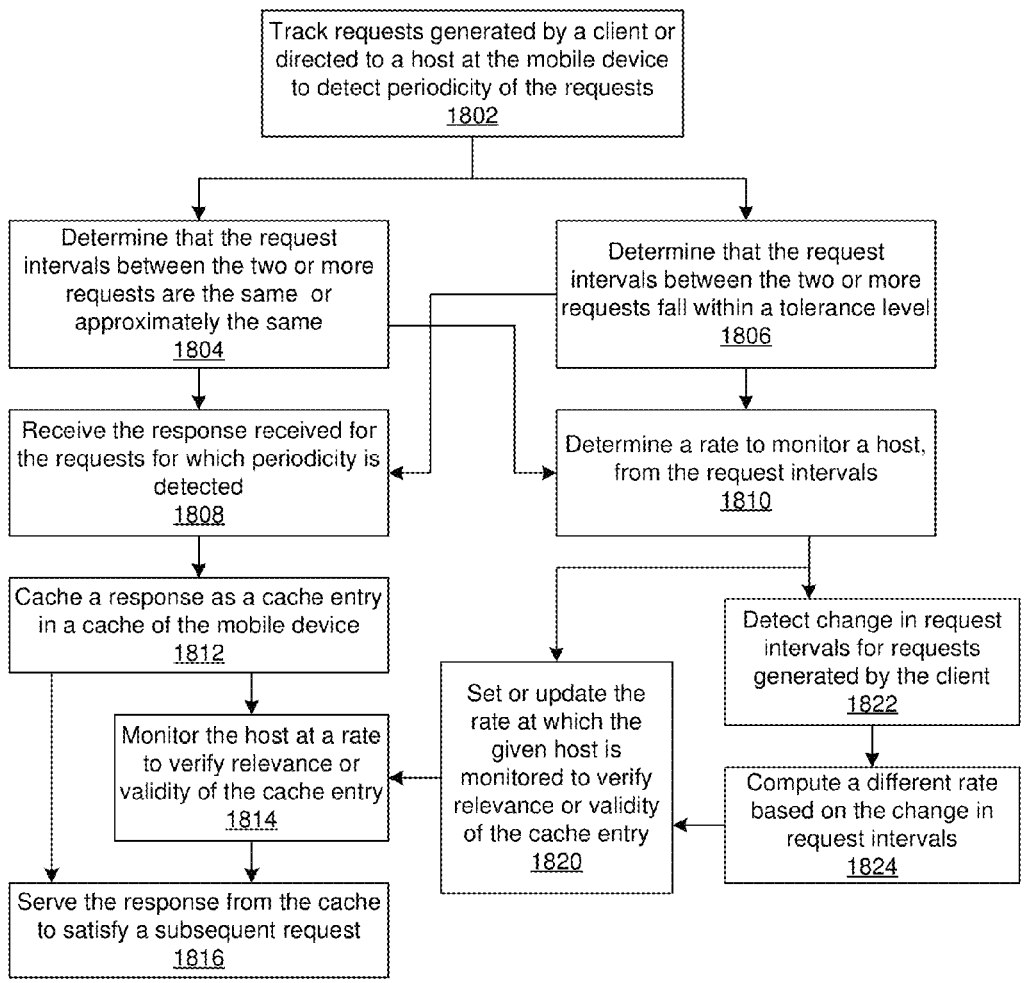
FIG. 18 depicts a flow chart illustrating an example process for dynamically adjusting caching parameters for a given request or client according to an embodiment of the subject matter described herein.

FIG. 18 depicts a flow chart illustrating an example process for dynamically adjusting caching parameters for a given request or client according to an embodiment of the subject matter described herein. In the embodiment illustrated in FIG. 18, the process for dynamically adjusting caching parameters includes tracking requests generated by a client or directed to a host at the mobile device to detect periodicity of the requests (step 1802.) If it is determined that the request intervals between two or more requests are the same or approximately the same (step 1804) or that the request intervals between two more requests fall within a tolerance level (step 1806), those requests may be identified as being periodic, and the process may take one or more of a number of actions.

For example, in the embodiment illustrated in FIG. 18, if a response is received for a request that has been identified as being periodic (step 1808), that response may be cached as a cache entry in a cache of the mobile device (step 1812.) The host may be monitored at a rate to verify relevance or validity of the cache entry (step 1814), after which the response may be served from the cache to satisfy a subsequent request (step 1816.) In one embodiment, step 1814 may be skipped.

Alternatively or in addition, a rate to monitor a host may be determined from the request intervals (step 1810.) After this, the rate at which the given host is monitored to verify relevance or validity of the cache entry may be set or updated (step 1820). This value may be used by step 1814. Alternatively, after step 1810, a change in request intervals for requests generated by the client may be detected (step 1822), which triggers computation of a different rate based on the change in request intervals (step 1824.)

Figure 19:
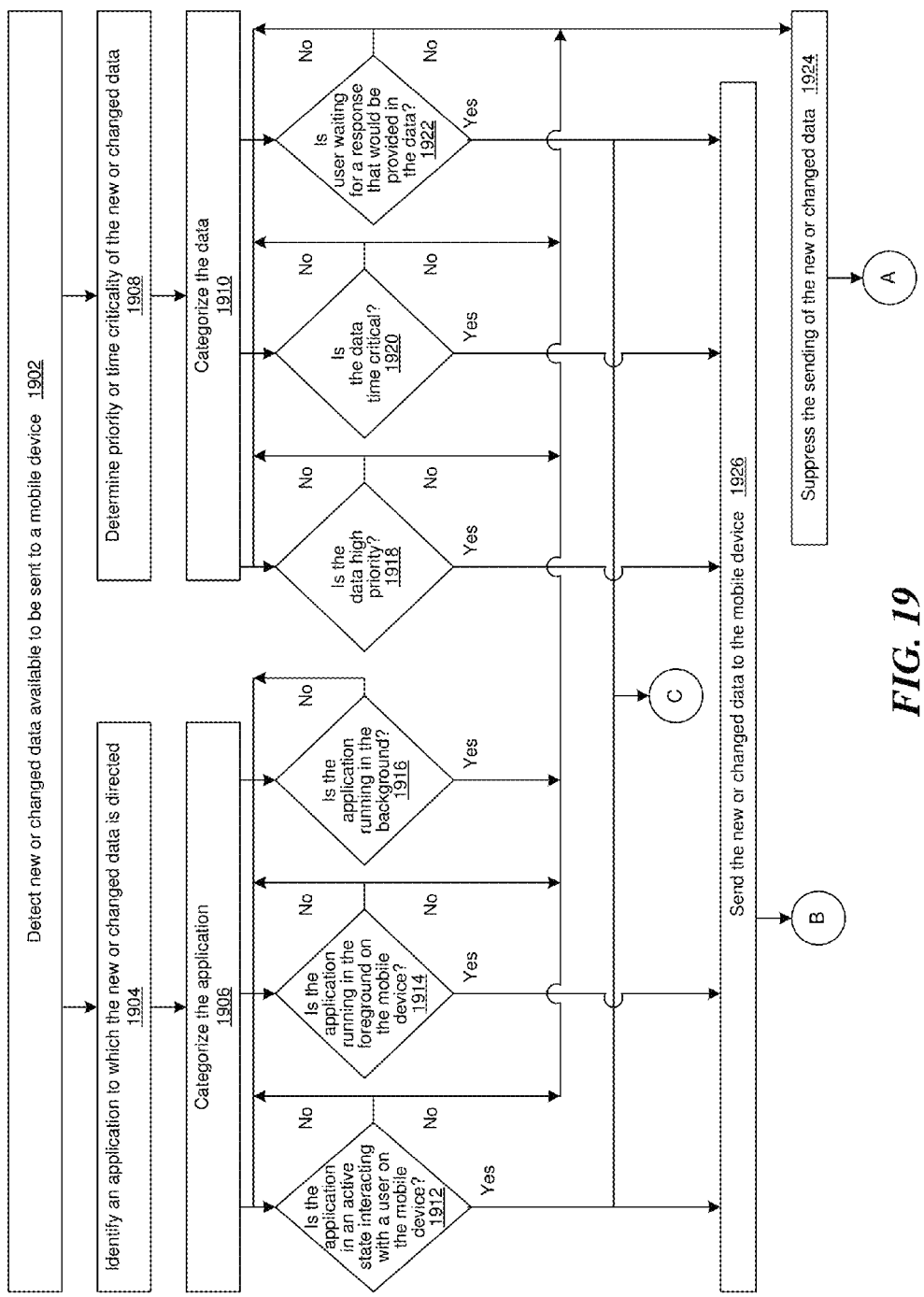
FIG. 19 depicts a flow chart illustrating example processes for application and/or traffic (data) categorization while factoring in user activity and expectations for implementation of network access and content delivery policies according to an embodiment of the subject matter described herein.

FIG. 19 depicts a flow chart illustrating example processes for application and/or traffic (data) categorization while factoring in user activity and expectations for implementation of network access and content delivery policies according to an embodiment of the subject matter described herein. In the embodiment illustrated in FIG. 19, a process for application and/or traffic categorization includes detecting new or changed data available to be sent to a mobile device (step 1902), and, in response, either identifying an application to which the new or changed data is directed (step 1904), determining the priority or time criticality of the new or changed data (step 1906), or both.

Figure 20A:
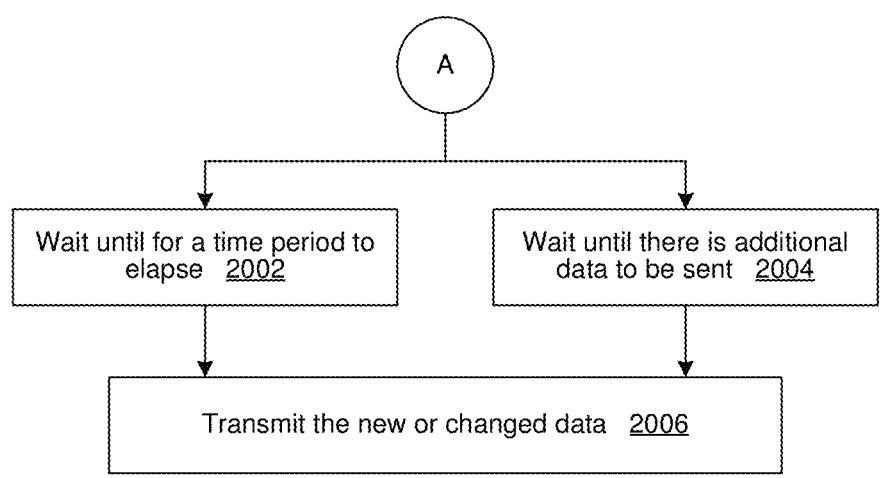
FIG. 20A depicts a flow chart illustrating example processes for handling traffic which is to be suppressed at least temporarily determined from application/traffic categorization according to an embodiment of the subject matter described herein.
Figure 20B:
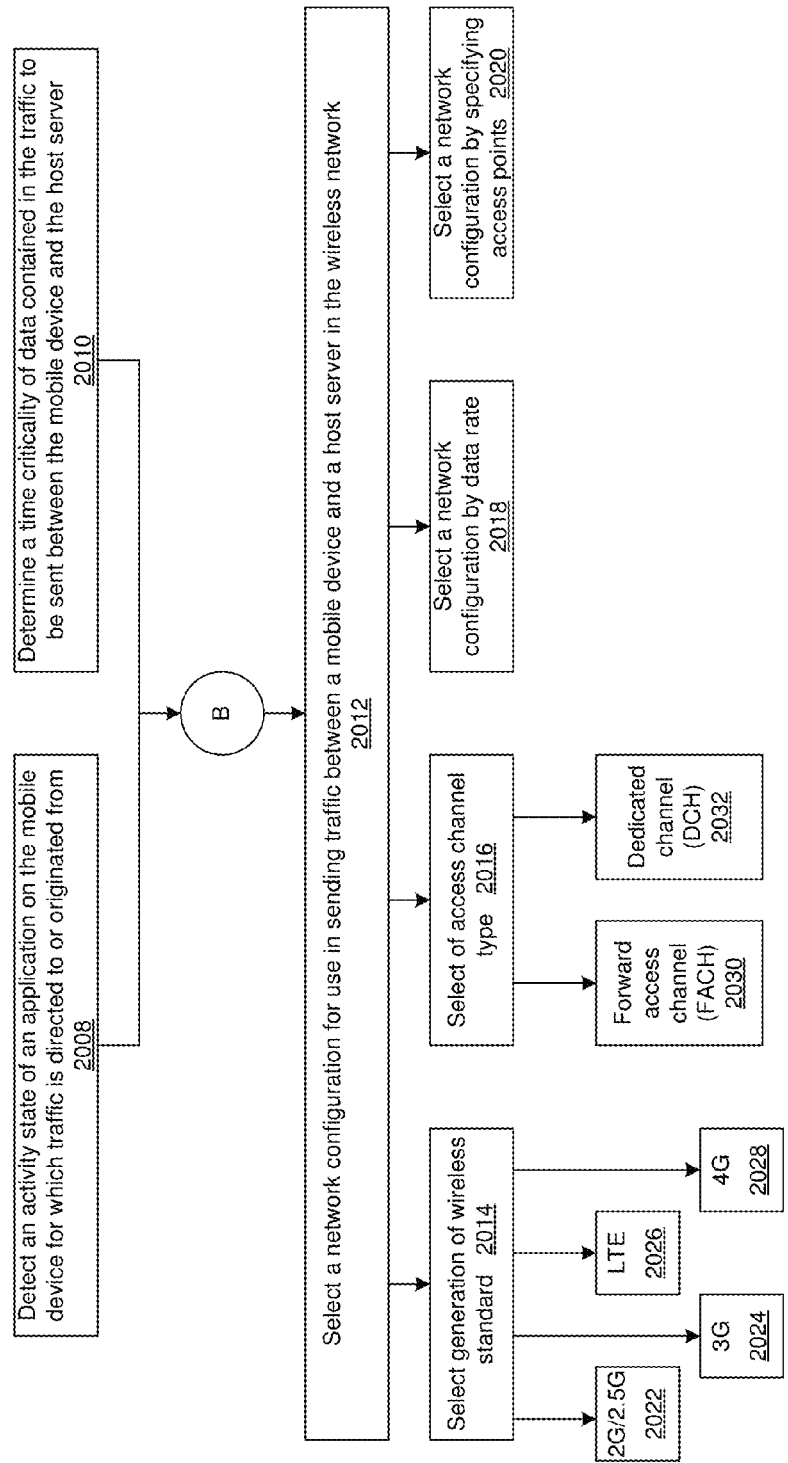
FIG. 20B depicts a flow chart illustrating an example process for selection of a network configuration for use in sending traffic based on application and/or traffic (data) categorization according to an embodiment of the subject matter described herein.

In the embodiment illustrated in FIG. 19, identification of the application 1904 is followed by categorizing the application (step 1906) and then applying one or more tests to determine whether the new or changed data should be sent to the mobile device (step 1926 followed by sub-flow "B", which is shown in more detail in FIG. 20B) or suppressed, i.e., not sent to the mobile device (step 1924 followed by sub-flow "A", which is shown in more detail in FIG. 20A.) For example, the new or changed data may be sent to the mobile device if the application is in an active state and interacting with a user on the mobile device (step 1912) or if the application is running in the foreground on the mobile device (step 1914), while an application running in the background would be have its new or changed data suppressed (step 1916.)

In the embodiment illustrated in FIG. 19, the determination of priority or time criticality 1908 is followed by categorizing the data (step 1910) and then applying one or more tests to determine whether the new or changed data should be sent to the mobile device (step 1926) or suppressed (step 1924.) For example, data may be sent if the data is high priority (step 1918), if the data is time critical (step 1920), or if the user is waiting for a response that would be provided in the data (step 1922)—otherwise, the data would be suppressed.

In the embodiment illustrated in FIG. 19, if an application is in an active state interacting with a user on the mobile device (step 1912) or the user is waiting for a response that would be provided in data (step 1922), an additional sub-flow "C" may be performed. Sub-flow "C" is shown in more detail in FIG. 20C.

FIG. 20A depicts a flow chart illustrating sub-flow "A" in more detail. In the embodiment illustrated in FIG. 20A, data to be suppressed may be held for a period of time (step 2002) or until there is additional data to be sent (step 2004) before transmitting the new or changed data (step 2006.)

FIG. 20B depicts a flow chart illustrating sub-flow "B" in more detail. In the embodiment illustrated in FIG. 20B, other events may trigger the selection process. For example, detection of an activity state of an application on the mobile device for which traffic is directed to or from (step 2008) may trigger a selection process, as may determining a time criticality of data contained in the traffic to be sent between the mobile device and the host server (step 2010.) In the embodiment illustrated in FIG. 20B, sub-flow "B" includes selecting a network configuration for use in sending traffic b between a mobile device and a host server in the wireless network (step 2012.) Selection may include selection of a wireless standard (step 2014), such as 2G/2.5G 2022, 3G 2024, LTE 2026, or 4G 2028. Selection may also include selection of an access channel type (step 2016), such as a forward access channel (FACH) 2030 or a dedicated channel (DCH) 2032. Selection may include selection of a network configuration by data rate (step 2018) or by specifying data access points (step 2020.)

Figure 20C:
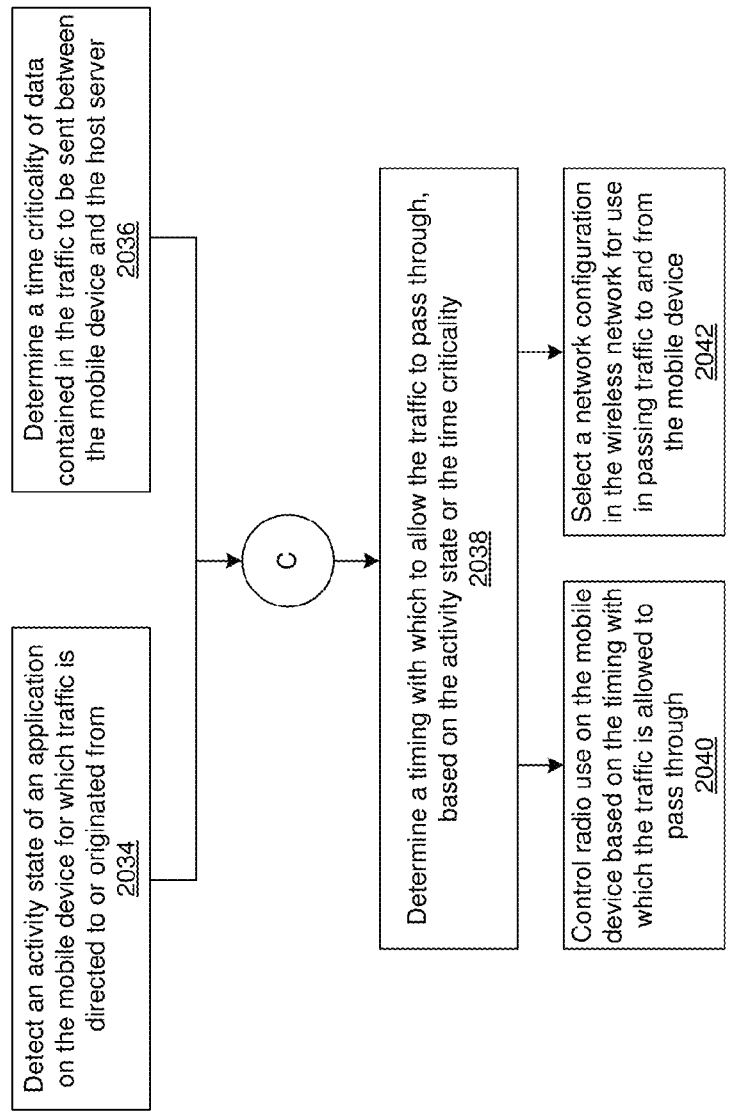
FIG. 20C depicts a flow chart illustrating an example process for implementing network access and content delivery policies based on application and/or traffic (data) categorization according to an embodiment of the subject matter described herein.

FIG. 20C depicts a flow chart illustrating sub-flow "C" in more detail. In the embodiment illustrated in FIG. 20C, the process for implementing network access and content delivery policies based on application and/or traffic (data) categorization may be triggered by detecting an activity state of an application on the mobile device for which traffic is directed to or originated from (step 2034) and/or determination of a time criticality of data contained in the traffic to be sent between the mobile device and the host server (step 2036.) In the embodiment illustrated in FIG. 20C, sub-flow "C"

includes determining a timing with which to allow the traffic to pass through, based on the activity state or the time criticality (step 2038), followed by controlling radio use on the mobile device based on the timing with which the traffic is allowed to pass through (step 2040) and/or selecting a network configuration in a wireless network for use in passing traffic to and from the mobile device (step 2042.)

Figure 21:
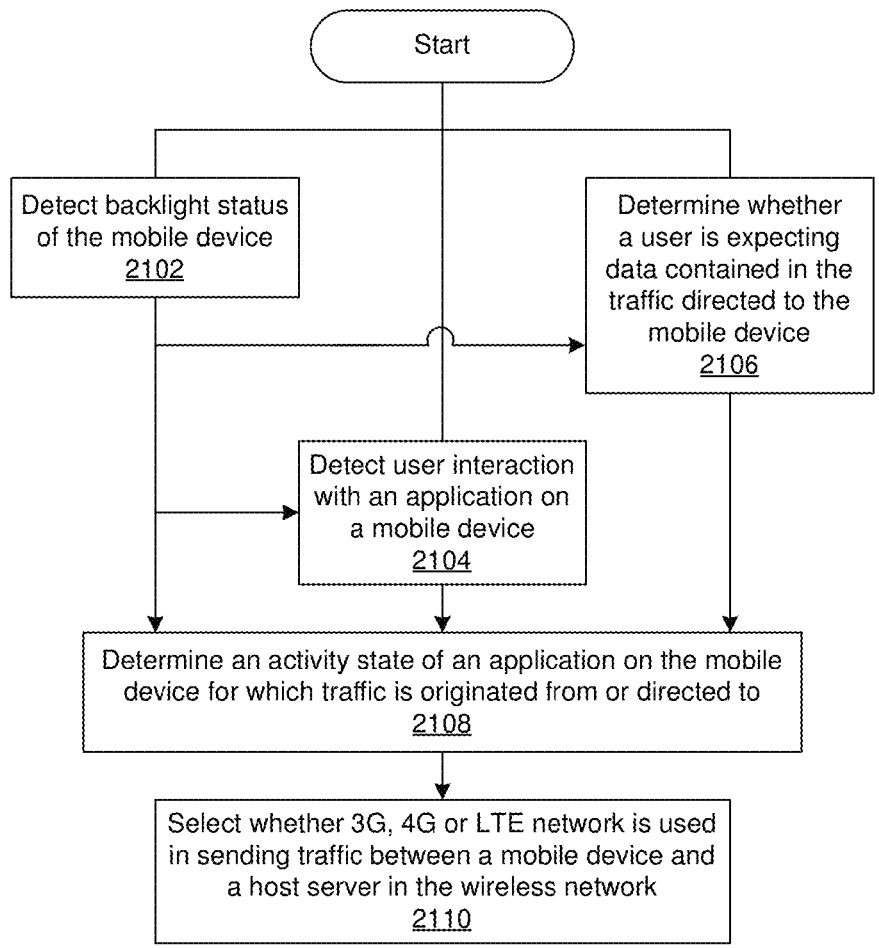
FIG. 21 depicts a flow chart illustrating an example process for network selection based on mobile user activity or user expectations according to an embodiment of the subject matter described herein.

FIG. 21 depicts a flow chart illustrating an example process for network selection based on mobile user activity or user expectations according to an embodiment of the subject matter described herein. In the embodiment illustrated in FIG. 21, the process for network selection includes detection of backlight status of the mobile device (step 2102), detection of user interaction with an application on a mobile device (step 2104), and/or determining whether a user is expecting data contained in the traffic directed to the mobile device (step 2106.) From any of these, the process may go to step 2108, which includes determining an activity state of an application on the mobile device for which traffic is originated from or directed to, and then to step 2110, which includes selecting whether a 3G, 4G, or LTE network is used in sending traffic between a mobile device and a host server in the wireless network.

Figure 22:
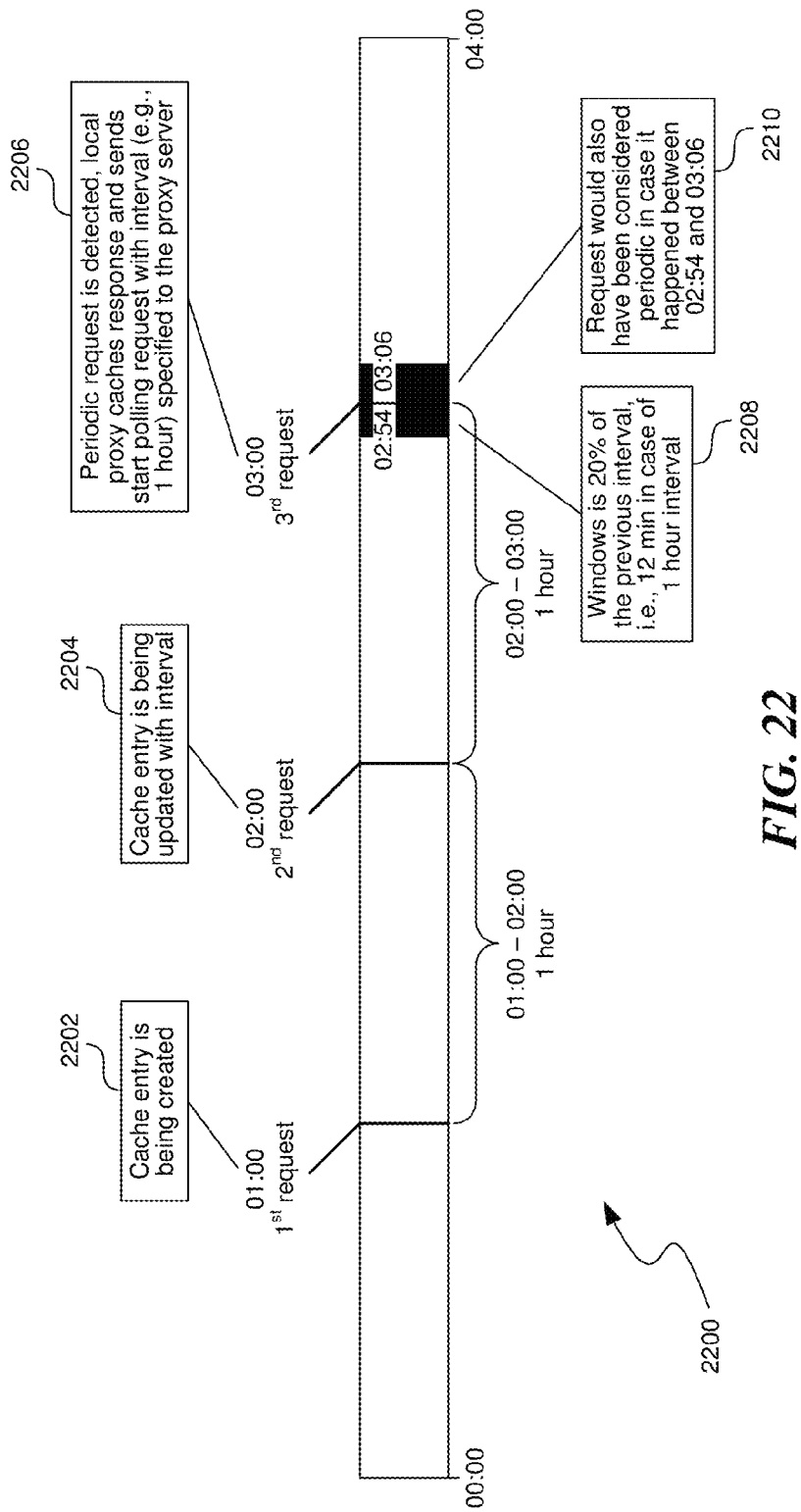
FIG. 22 depicts a data timing diagram showing an example of detection of periodic request which may be suitable for caching according to an embodiment of the subject matter described herein.

FIG. 22 depicts a data timing diagram showing an example of detection of periodic request which may be suitable for caching according to an embodiment of the subject matter described herein. In the embodiment illustrated in FIG. 22, timeline 2200 shows the detection of a first request at time 01:00. This triggers generation of a cache entry 2202. At time 02:00, one hour later, a second request is detected. In response to detection of the second request, the cache entry is updated to list the detected interval, i.e., one hour. From this point on, the system will look for a third request at the next interval, e.g., at time 03:00. In the example shown in FIG. 22, the third request arrives a time 03:00. In response to detecting the third request, the local proxy cache may cache the response and notify the proxy server to start sending polling requests with the detected interval, e.g., every one hour in this example. In one embodiment, the next request may be allowed some amount of variability or jitter and still be detected as a periodic signal (block 2208.) For example, the system may look for the next periodic event plus or minus 20% of the previous interval, e.g., one hour plus or minus 6 minutes (block 2210.) Thus, in the embodiment illustrated in FIG. 22, the third request could arrive between 02:54 and 03:06 and still be considered periodic.

Figure 23:
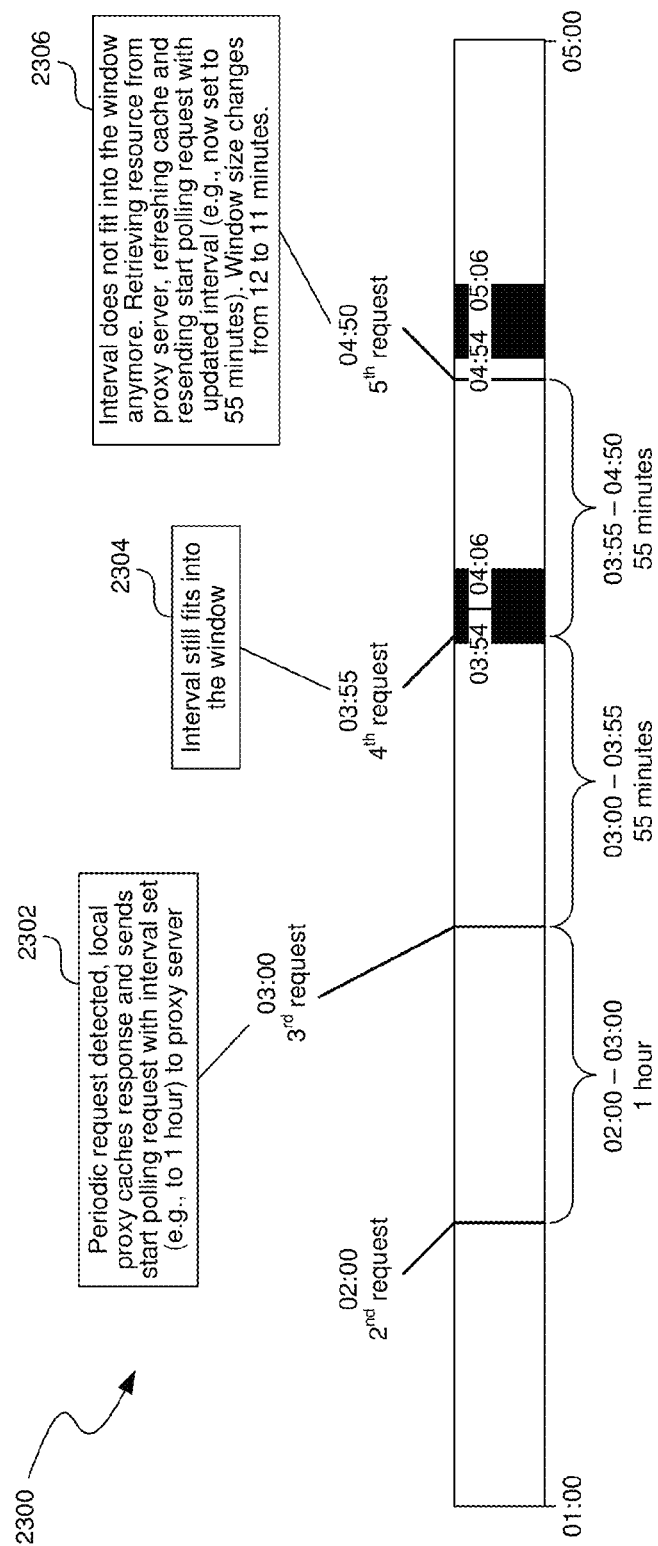
FIG. 23 depicts a data timing diagram showing an example of detection of change in request intervals and updating of server polling rate in response thereto according to an embodiment of the subject matter described herein.

FIG. 23 depicts a data timing diagram showing an example of detection of change in request intervals and updating of server polling rate in response thereto according to an embodiment of the subject matter described herein. In the embodiment illustrated in FIG. 23, timeline 2300 shows an example in which a periodic request is detected and the local proxy caches the response and requests the proxy server to start sending polling requests at the detected interval, e.g., every hour (block 2302.) The $4^{th}$ request, however, arrives earlier than expected, i.e., 55 minutes after the $3^{rd}$ request rather than the expected 60 minutes. The interval still fits within the hour window, so the window is not adjusted (block 2304.) The $5^{th}$ request is also 55 minutes after the $4^{th}$ request, which results in the $5^{th}$ request failing to arrive within the allowable window. As a result, the resource is retrieved from the proxy server, the cache is refreshed, and a start polling request is resent with an updated interval, i.e., 55 minutes rather than 60 minutes. Window jitter also changes from +/−6 minutes to +/−5 minutes (block 2306.)

Figure 24:
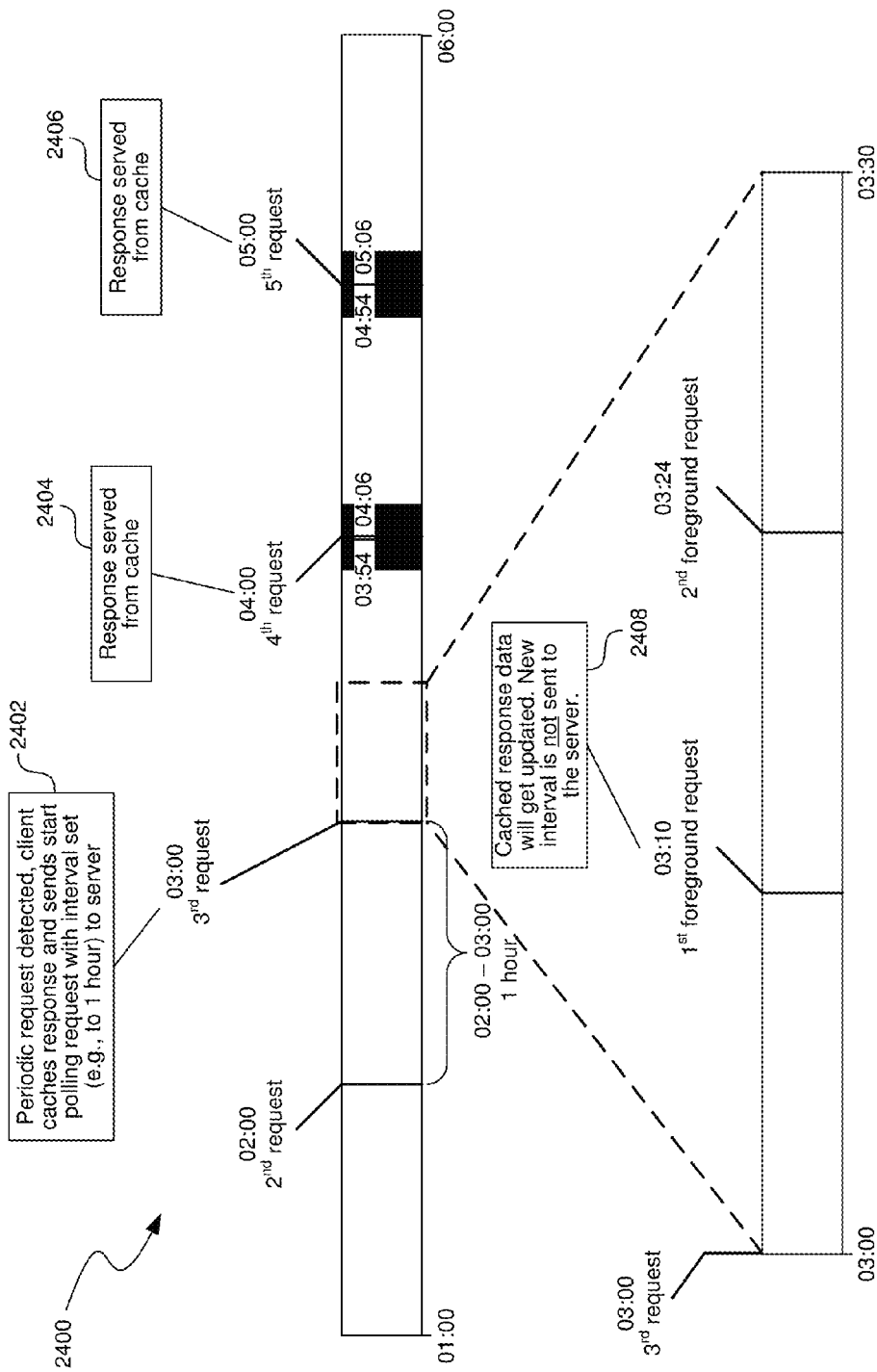
FIG. 24 depicts a data timing diagram showing an example of serving foreground requests with cached entries according to an embodiment of the subject matter described herein.

FIG. 24 depicts a data timing diagram showing an example of serving foreground requests with cached entries according to an embodiment of the subject matter described herein. In the embodiment illustrated in FIG. 24, timeline 2400 shows that upon the detection of a $3^{rd}$ request at time 03:00, a periodic request is detected. The client caches the response and sends a start polling request with a request interval=1 hour (block 2402.) From that point on, a response will be served from the cache every hour, i.e., in response to the $4^{th}$ request received at time 04:00 (block 2404) and the $5^{th}$ request received at time 05:00 (block 2406.) In the embodiment illustrated in FIG. 24, a pair of foreground requests also occurs: the first at time 03:10 and the second at time 03:24. In one embodiment, the cached response data is updated but the new interval is not sent to the server (block 2408.)

Figure 25:
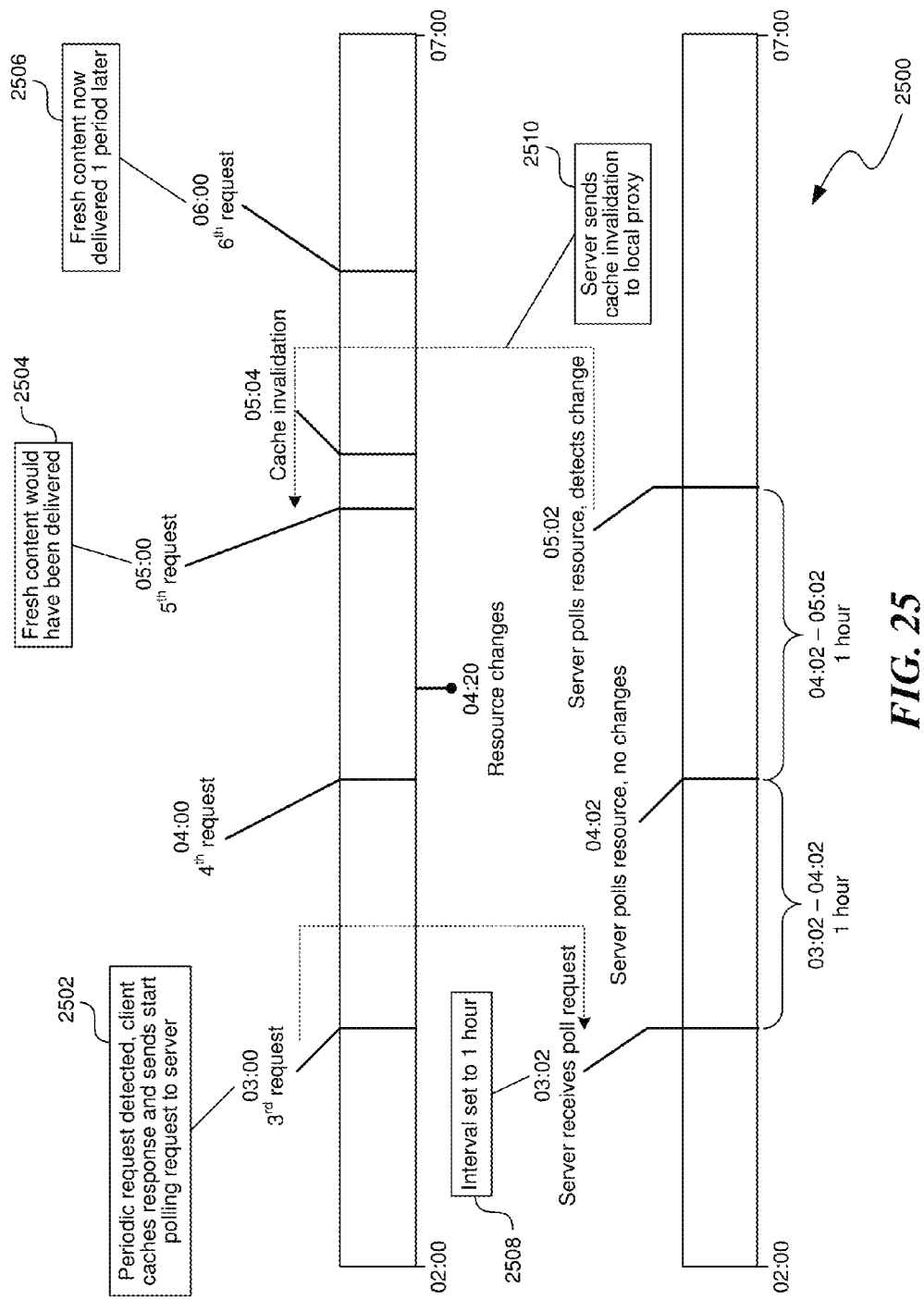
FIG. 25 depicts a data timing diagram showing an example of the possible effect of cache invalidation that occurs after outdated content has been served once again to a requesting application according to an embodiment of the subject matter described herein.

FIG. 25 depicts a data timing diagram showing an example of the possible effect of cache invalidation that occurs after outdated content has been served once again to a requesting application according to an embodiment of the subject matter described herein. In the embodiment illustrated in FIG. 25, timeline 2500 shows that upon the detection of a $3^{rd}$ request at time 03:00, a periodic request is detected. The client caches the response and sends a start polling request with a request interval=1 hour (block 2502.) At 03:02, the server receives the poll request and sets the polling interval to one hour (block 2508.) A $4^{th}$ request arrives at time 04:00. At time 04:02, the server polls the resource and receives the same response as last time, i.e., no change. At time 04:20, the resource changes. The $5^{th}$ request arrives at time 05:00, at which time fresh content would have been delivered by the server (block 2504.) At 05:02, the server polls the resource and detects the change in content. In response, the server sends a cache invalidation notification to the local proxy (block 2510), which causes the local proxy to invalidate its cache at time 05:04. The fresh content is then delivered at the $6^{th}$ request at time 06:00.

Figure 26:
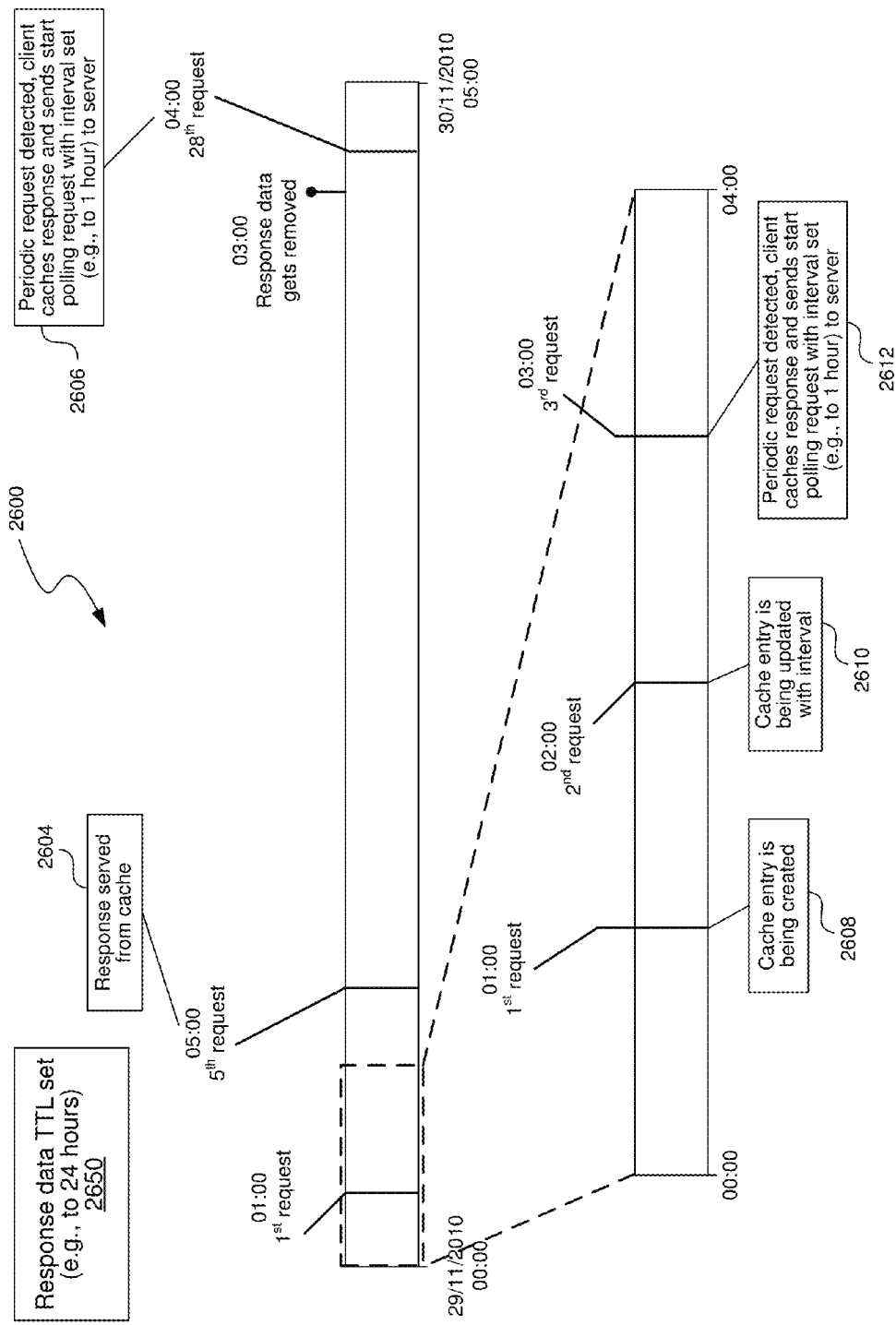
FIG. 26 depicts a data timing diagram showing cache management and response taking into account the time-to-live (TTL) set for cache entries according to an embodiment of the subject matter described herein.

FIG. 26 depicts a data timing diagram showing cache management and response taking into account the time-to-live (TTL) set for cache entries according to an embodiment of the subject matter described herein. In the embodiment illustrated in FIG. 26, timeline 2600 shows the response to a series of requests, including creating a cache entry in response to receiving the first request (block 2608), updating the cache entry in response to receiving the second request (block 2610), and identifying the request as periodic, caching the response by the client, and sending a start polling request with a one hour interval (block 2612.) In the example illustrated in FIG. 26, the response data TTL value is set to 24 hours (block 2650), which expires at 03:00 the next day. Timeline 2600 shows the response to the $5^{th}$ request being served from the cache (block 2604.) This will continue until the TTL period expires, at which time the response data is removed from the cache. The next request is request 28, at 04:00 the next day, one hour after the response data was removed from the cache. The period request will again be detected, the client caches the response and sends another start polling request with a one hour interval to the server (block 2606.)

Figure 27:
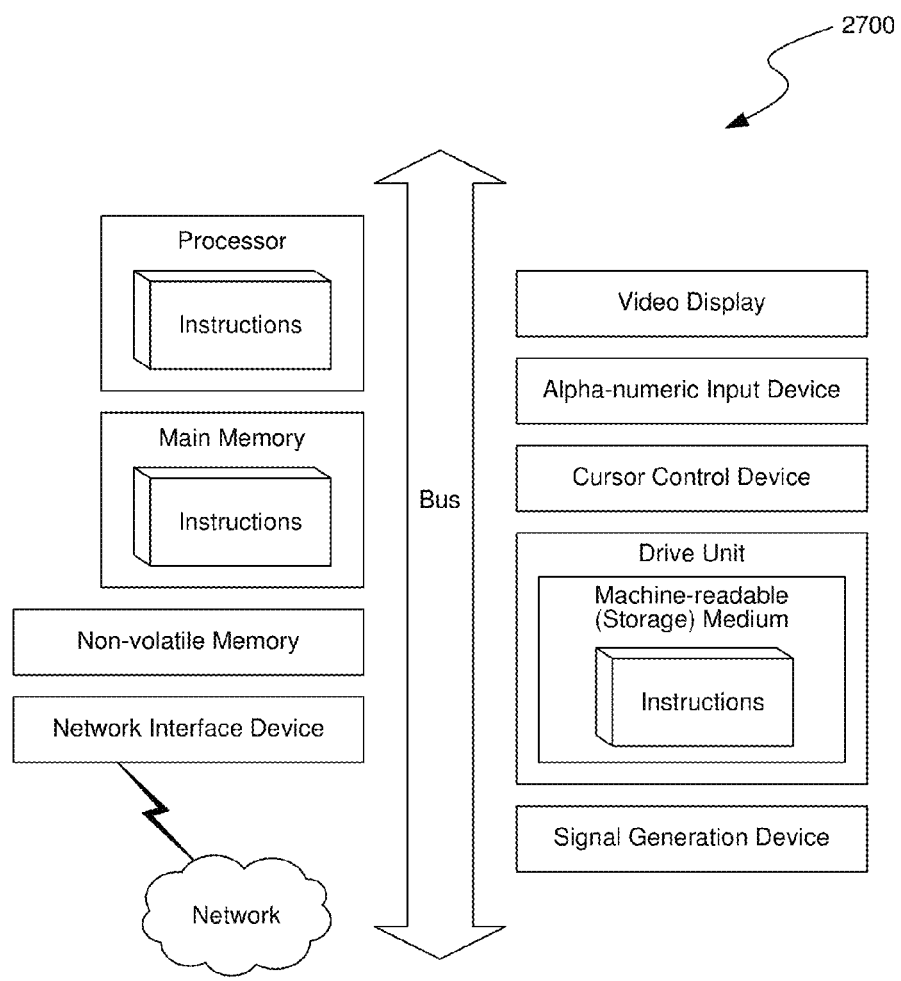
FIG. 27 shows a diagrammatic representation of a machine in the example form of a computer system within which a set of instructions, for causing the machine to perform any one or more of the methodologies discussed herein, may be executed.

FIG. 27 shows a diagrammatic representation of a machine in the example form of a computer system within which a set of instructions, for causing the machine to perform any one or more of the methodologies discussed herein, may be executed according to an embodiment of the subject matter described herein. In the embodiment illustrated in FIG. 27, system 2700 includes a processor 2702, a main memory 2704, a nonvolatile memory 2706, a network interface device 2708 for connecting to a network 2710, a video display 2712, an alpha-numeric input device 2714, a cursor control device 2716, a drive unit 2718, and a signal generation device 2720, some or all of which communicate via a system bus 2722. In the embodiment illustrated in FIG. 27, processor 2702 and main memory 2704 include memory for storing machine readable instructions. Drive unit 2718 includes a machine-readable storage medium 2724 for storing machine-readable instructions.

The operation of systems and methods according to embodiments of the subject matter described herein will now be described in detail.

Blocking Applications that are Keepalive Intensive

In one embodiment, the local proxy identifies keepalives (e.g., heartbeats) based on a combination of parameters, including, by way of example: periodicity, size thresholds, similar/repeating content, and/or based on knowledge of the actual application level protocol and/or applications that are keepalive heavy (e.g., applications that send keep alives frequently). The local proxy can then block applications that are keepalive heavy or (any application that exhibits certain keepalive behavior) for a given percent of keepalive periods (e.g., via the application blocking/unblocking module 470 depicted in FIG. 2B). In one implementation, blocking the applications, which blocks keepalive (non-interactive traffic) and other traffic, can include blocking specific ports for the given percent of keepalive periods. The blocking strategy can be managed via a policy enforcement module. This blocking strategy may have a user-impact, cause additional bytes, and/or cause impacts beyond keepalives. However, the blocking strategy can be refined using some of the other keepalive optimization algorithms described below.

In one implementation, the application can be blocked cyclically during the screen off period. In other words, the application can be given access for limited periods during the screen off period.

Least-Complaint Blocking

In one embodiment, applications that are inactive (not much happening) are identified and blocked. If, for example, a user is running Skype, but the user has never received/initiated a voice over Internet Protocol (VOIP) call, and all his or her instant messages are clustered, then the application can be selected for blocking when the screen is off. The user impact is minimized by this strategy since the blocking is based on the usage history/behavior which indicates that the user has never depended on arrival of a call or IM when the screen is off. In addition to the probability of application use based on recent or historical behavior, the blocking can be further based on delay time after screen is off, cost of the application, state of the mobile device resources, and the like. In a further embodiment, the least-complaint blocking (e.g., via the least complaint blocking/unblocking module 474 depicted in FIG. 2B) can be designed or customized to define a level of optimization desired. For example, the local proxy can start with polling offload optimization, perform smart connection alignment (i.e., aligning transactions from different applications on the same radio connection) and then add least-complaint blocking to get the level of optimization desired.

Blocking User Datagram Protocol (UDP) Traffic

In one embodiment, signaling due to applications such as Skype that utilize the UDP protocol can be reduced or optimized by implementing a blocking strategy that blocks all UDP traffic entirely when the screen is off (immediately or after a configurable delay) (e.g., via the UDP traffic blocking/unblocking module 476 depicted in FIG. 2B). In one implementation, a configuration option that blocks UDP (e.g., Skype UDP traffic) entirely without regard to the screen state can be provided to further reduce signaling due to applications with UDP traffic.

The UDP traffic can be blocked by using iptables rule. For example, UDP traffic with the Skype app UID can be dropped. To block the UDP, the iptables rule that was added in blocking period can be deleted.

In one implementation, UDP traffic can be blocked when certain conditions are satisfied. For example, when the user is in optimization mode, when the application (e.g., Skype) is detected or available for optimization, when the screen is off, and/or a grace period (since turning off of the screen) is reached, the UDP traffic can be blocked. To unblock the UDP traffic, one or more conditions may need to be satisfied. Conditions for unblocking can include, screen turn on, application optimization off, optimization mode off, application uninstall or upgrade, and/or a combination thereof.

Blocking Application Client Generated Traffic

In one embodiment, signaling due to certain applications (e.g., Spotify) can be reduced by blocking application client generated packets when the application is completely idle or not active or performing its function (e.g., when Spotify is not actively playing audio) (e.g., via the idle application traffic blocking/unblocking module 478 depicted in FIG. 2B). The application client generated traffic can be unblocked when the application moves to the foreground, or starts performing its function (e.g., Spotify starts playing audio). In one implementation, the complete idle state can be detected based on keepalive pattern (e.g., 10 successive keepalives detected when screen is off, when typically the client sends a keepalive every one minute). The application traffic can be blocked using iptables rule and unblocked by removing iptables rules. The blocking can be triggered when the optimization mode is on, the application blocking is on and when the screen is off, for example. The unblocking can be triggered when one or more conditions including screen on, optimization off, application blocking off or application uninstalled or upgraded is true.

In one implementation, the signaling optimization of an application (e.g., the Spotify application) can be enabled or disabled by using the Policy Management System (PMS configuration). In some cases, the heartbeat or keepalive pattern from the application side may vary. For example the interval of heartbeats from the application side would be increased if there were multiple server side initialized heartbeats, though they are 11 bytes also. The complete idle state can then be detected using time threshold. For example, if continuous 11 bytes heartbeat either in 10 times or 10 minutes in screen off is observed, block the traffic. Or b) if continuous 11 bytes heartbeat either in 12 times or 12 minutes regarding the screen status is observed, flag it as blocking and start to block it immediately if it enters into screen off. The logic may be applied in the Wi-Fi network and/or the mobile network. An example logic for detecting a new pattern of the application (e.g., Spotify) in every configurable duration (e.g., 2 min to a default of 5 min) may include:

1. PMS enabled and not transparent mode
2. Got application packet (client or server side)
3. All 11 bytes length (client or server side) in this duration, if one packet's length is not 11, restart the whole detecting flow
4. Screen is off (if screen is on at some time during the 5 minutes, restart the detecting flow)
5. No music playing on the phone (detecting when receiving 11 length packet)

For mobile platforms such as the Android platform which provide a service to monitor the status of an audio playback, the heartbeats can be monitored and a timer (grace period timer) can be started only when audio playback is inactive. In some embodiments, the playback service status can be used to detect whether a media or any other application such as the Spotify application is in an idle state. While blocking of application client generated traffic has been described with Spotify as an example, the disclosed technology may be generalized, and may be applicable to various other applications.

Triggering Application's Reconnect

In some applications (e.g. Twitter), users may not expect notification while the screen of their wireless devices is off. The disclosed innovation can identify such applications, and block data access while the screen is off (i.e., user presence is not observed). When the screen is on, or user presence is detected, the application can be unblocked, and an intent (in Android based systems) can be sent to the application or broadcast to cause the application to reconnect and sync (e.g., via the application reconnect trigger module 479 depicted in FIG. 2B). In one implementation, the connectivity intent can be sent or broadcast on a radio up event.

To reduce signaling due to certain applications (e.g., WhatsApp, Viber), a blocking strategy can be implemented, where, when the application moves to the background, all client generated traffic can be blocked and all server connections can be closed. The application can be unblocked when either the application moves to the foreground or a push message (e.g., Google Cloud Messaging (GCM) push message) is received. When unblocking, a timer can be started. If the application stays in the background beyond a configurable timeout value, the blocking of the application can be resumed.

In one embodiment, applications such as Viber and Whatsapp can be blocked whenever the screen is off (or after grace off period of 10 seconds). In one implementation, any existing connection initiated by the applications can be terminated when screen is switched off to ensure that they do not keep using existing socket connections.

In a further implementation, to further optimize signaling, an application that has been blocked can be unblocked when a GCM push message targeted for that application (e.g., WhatsApp, Viber) is detected or received. In one embodiment, whenever there is incoming traffic for Google GCM (port 5228), network traffic for the applications (e.g., Whatsapp, Viber, etc.) is allowed for a grace off period (e.g., 10 seconds, 20 seconds or other configurable period) even when the screen is off, thus allowing them to fetch any incoming data if they receive GCM notification. When the screen is on, traffic for the applications (e.g., Viber and Whatsapp) can be allowed.

The application blocking/unblocking can be illustrated with an example use case, where a user is using a phone actively, the screen is on, and Viber keeps TCP socket open. When the user stops using phone, screen goes off. The disclosed system (after grace off period): (a) sets firewall rule to block any socket connection by either Viber or Whatsapp; (b) terminates any existing socket connection initiated by either Viber or Whatsapp. When there is some incoming traffic (e.g., for Viber), the disclosed system: (a) detects that there is incoming traffic for Google GCM connection (port 5228); (b) allows traffic (removed firewall rule to block traffic) for Viber and Whatsapp for short period of time; (c) Viber is able to connect and receive incoming traffic during this time window; (d) Viber and Whatsapp connections are terminated and firewall rules are re-enabled until either screen goes on or there is incoming traffic at GCM connection (port 5228).

In one embodiment, the distributed proxy (or the local proxy) can be configured to allow traffic on GCM notifications for particular applications only instead of any incoming GCM traffic. The local proxy, for example, can react only to notification to the particular apps being optimized by decoding the GCM traffic. Opening the window for traffic when there is GCM traffic should not cause any additional connections (radio is up anyways) and actually the application does not necessarily use the window.

In one embodiment, a generic application handlers framework can be created to optimize signaling behavior of applications such as Viber, Whatsapp, etc. The framework can be implemented on the client side, with limited, or no server dependencies. For example, on the server side Policy Management System (PMS) and PCF can be configured. The framework can be application-agnostic, configurable and/or extendable. Scripts, defined by entrance conditions and actions, and optional exit condition(s) and action(s) can be used. Various conditions may be supported, and all of the conditions (or in some cases, some of the conditions) may need to be met for an action trigger. Example conditions include timer (initiated for entrance by the exit event and vice versa), radio_timer (same as timer+radio-aware); screen_state (on/off), traffic (triggered by interception of TCP data meeting the defined filter), media_state (on/off), heartbeat_state (on/off), or the like. Actions may include activate/deactivate the rule group(s) by given name(s) and drop sessions meeting the defined filter.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method for signaling optimization in a wireless network utilizing proprietary and non-proprietary protocols, the method comprising:
   establishing a first session between an application on a mobile device and a local proxy on the mobile device, establishing a second session between the local proxy and a proxy server not located on the mobile device, and establishing a third session between the proxy server and a content server; and
   monitoring a byte stream present within the first and second sessions to identify patterns within the byte stream, wherein identifying a pattern within the byte stream comprises identifying a repeated transaction between the application and the content server and wherein the identified pattern includes a request in one direction between the application and the content server and a response in the opposite direction from the request, and, in response to identifying a pattern within the byte stream:
   determining a behavior of the application based on the pattern;
   determining whether the behavior of the application is a candidate behavior for optimization based on observed traffic to and from the application on the mobile device; and
   in response to determining that the behavior of the application is a candidate behavior for optimization, performing signaling optimization between the application and the content server, wherein performing signaling optimization includes dismantling the second session, replaying the pattern to the application via the first session, and replaying the pattern to the content server via the third session, wherein replaying the pattern to the application includes detecting a request from the application and replaying a cached response and wherein replaying the pattern to the content server via the third session includes replaying a cached request to the content server and receiving from the content server a response to the replayed request.

2. The method of claim 1 wherein the candidate behavior for optimization includes generation of keepalive messages at a rate greater than a target rate.

3. The method of claim 1 wherein the candidate behavior for optimization includes generation of UDP traffic at a rate greater than a target rate.

4. The method of claim 1 wherein the candidate behavior for optimization includes generation of UDP traffic while the mobile device is in a target state.

5. The method of claim 1 wherein the candidate behavior for optimization includes generation of traffic while the application is in a target state.

6. The method of claim 1 wherein the candidate behavior for optimization includes network inactivity for longer than a target duration.

7. The method of claim 1 wherein the candidate behavior for optimization includes detection of a change in the pattern to the application or the pattern to the content server.

8. The method of claim 7 comprising, in response to detecting the change, re-establishing the second session and suspending the signaling optimization.

9. The method of claim 7 comprising detecting a change in the pattern interval, and, in response to detecting a change in the pattern interval, dynamically adjusting the pattern interval.

10. The method of claim 1 wherein the candidate for behavior for optimization is identified based on usage history.

11. The method of claim 1 wherein the candidate for behavior for optimization is identified based on identification of the application's use of data for non-functional purposes.

12. The method of claim 1 wherein replaying the pattern to the content server via the third session continues so long as heartbeat messages are received by the proxy server from the local proxy.

13. The method of claim 1 wherein the patterns are replayed periodically according to a defined interval.

14. The method of claim 1 wherein identifying patterns within the byte stream includes identifying traffic to or from an application and wherein performing optimization includes at least one of: blocking traffic to or from the application, unblocking traffic to or from the application, and triggering reconnection with the application.

15. The method of claim 1 wherein identifying patterns within the byte stream includes identifying traffic having a threshold priority or time criticality and wherein performing optimization includes at least one of: delaying the identified traffic, allowing the identified traffic, and discarding the identified traffic.

16. A system for signaling optimization in a wireless network utilizing proprietary and non-proprietary protocols, the system comprising:
   a mobile device that includes an application and a local proxy;
   a proxy server not located on the mobile device; and
   a content server,
   wherein the mobile device establishes a first session between the application and the local proxy, wherein the local proxy establishes a second session between the local proxy and the proxy server, wherein the proxy server establishes a third session between the proxy server and the content server, and
   wherein the local proxy monitors a byte stream present within the first and second sessions to identify patterns within the byte stream, wherein identifying a pattern within the byte stream comprises identifying a repeated transaction between the application and the content server and wherein the identified pattern includes a request in one direction between the application and the content server and a response in the opposite direction from the request, and, in response to identifying a pattern within the byte stream:
      determining a behavior of the application based on the pattern;
      determining whether the behavior of the application is a candidate behavior for optimization based on observed traffic to and from the application on the mobile device; and
      in response to determining that the behavior of the application is a candidate behavior for optimization, performing signaling optimization between the application and the content server, wherein performing signaling optimization includes dismantling the second session, replaying the pattern to the application via the first session, and replaying the pattern to the content server via the third session, wherein replaying the pattern to the application includes detecting a request from the application and replaying a cached response and wherein replaying the pattern to the content server via the third session includes replaying a cached request to the content server and receiving from the content server a response to the replayed request.

17. The system of claim 16 wherein the local proxy is configured to receive a rule set and use the received rule set to at least one of:
   identify the patterns within the byte stream;
   determine the behavior of the application based on the pattern;
   determine whether the behavior of the application is a candidate for optimization; and
   perform the signaling optimization.

18. The system of claim 16 wherein the local proxy dismantles the second session by at least one of:
   modifying routing tables;
   terminating existing connections; and
   discarding messages that associated with a non-functional channel.

19. A computer program product for signaling optimization in a wireless network utilizing proprietary and non-proprietary protocols, the computer program product comprising:
   a non-transitory computer readable storage medium having computer readable code embodied therewith, the computer readable code comprising: computer readable program code configured for:
   establishing a first session between an application on a mobile device and a local proxy on the mobile device;
   establishing a second session between the local proxy and a proxy server not located on the mobile device;
   establishing a third session between the proxy server and a content server;
   monitoring a byte stream present within the first and second sessions to identify patterns within the byte stream, wherein identifying a pattern within the byte stream comprises identifying a repeated transaction between the application and the content server and wherein the identified pattern includes a request in one direction between the application and the content server and a response in the opposite direction from the request; and,
   in response to identifying a pattern within the byte stream:
      determining a behavior of the application based on the pattern;
      determining whether the behavior of the application is a candidate behavior for optimization based on observed traffic to and from the application on the mobile device; and
      in response to determining that the behavior of the application is a candidate behavior for optimization, performing signaling optimization between the application and the content server, wherein performing signaling optimization includes dismantling the second session, replaying the pattern to the application via the first session, and replaying the pattern to the content server via the third session, wherein replaying the pattern to the application includes detecting a request from the application and replaying a cached response and wherein replaying the pattern to the content server via the third session includes replaying a cached request to the content server and receiving from the content server a response to the replayed request.

* * * * *